US008275105B2

(12) United States Patent
Chida et al.

(10) Patent No.: US 8,275,105 B2
(45) Date of Patent: Sep. 25, 2012

(54) IP TELEPHONE TERMINAL

(75) Inventors: Susumu Chida, Ichinomiya (JP);
Satoshi Tanimoto, Nagoya (JP);
Tokunori Kato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 846 days.

(21) Appl. No.: 12/415,796

(22) Filed: Mar. 31, 2009

(65) Prior Publication Data
US 2009/0245144 A1 Oct. 1, 2009

(30) Foreign Application Priority Data

Mar. 31, 2008 (JP) .................. 2008-093817
Mar. 31, 2008 (JP) .................. 2008-093838
Mar. 31, 2008 (JP) .................. 2008-093848

(51) Int. Cl.
*H04M 3/42* (2006.01)
(52) U.S. Cl. ............... 379/201.01; 379/387.01
(58) Field of Classification Search ............. 379/201.01, 379/387.01
See application file for complete search history.

(56) References Cited

U.S. PATENT DOCUMENTS

| 6,437,873 | B1 | 8/2002 | Maeda |
| 7,333,225 | B2 | 2/2008 | Ohara |
| 2003/0026244 | A1* | 2/2003 | Pietrowicz et al. ........... 370/352 |
| 2004/0013247 | A1 | 1/2004 | Kurokawa |
| 2004/0139052 | A1 | 7/2004 | Kazushige et al. |
| 2005/0031101 | A1* | 2/2005 | Renton et al. ................. 379/111 |
| 2005/0141529 | A1 | 6/2005 | Miyajima et al. |
| 2005/0220082 | A1 | 10/2005 | Toyoda |
| 2006/0007486 | A1 | 1/2006 | Tanimoto |
| 2006/0136596 | A1 | 6/2006 | Izumi |
| 2006/0155864 | A1 | 7/2006 | Izumi |
| 2007/0189266 | A1 | 8/2007 | Izumi et al. |
| 2007/0280254 | A1 | 12/2007 | Milstein et al. |

(Continued)

FOREIGN PATENT DOCUMENTS

JP H04-124968 A 4/1992

(Continued)

OTHER PUBLICATIONS

Japan Patent Office; Office Action in Japanese Patent Application No. 2008-093848 (counterpart to the above-captioned U.S. patent application) mailed Apr. 27, 2010.

(Continued)

*Primary Examiner* — Quynh Nguyen
(74) *Attorney, Agent, or Firm* — Baker Botts L.L.P.

(57) ABSTRACT

In an IP telephone terminal, a function implementation controlling unit is configured so as to be capable of controlling implementation of a function instructed by a file received via IP telephone communications when the communicating unit receives the file. The configuration data storing unit stores configuration data that is used by the function implementation controlling unit to implement the function. The configuration data acquisition controlling unit performs control to acquire configuration data from the configuration data storing unit when a communicating unit receives a read file that is transmitted from an external IP telephone terminal. The response file generation controlling unit performs control to generate a response file including the configuration data. The response file transmission controlling unit controls a communicating unit to transmit the response file to the external IP telephone terminal that has transmitted the read file. The update controlling unit performs, when the communicating unit receives a write file, control to update the configuration data based on the write file that is transmitted from the external IP telephone terminal that has received the response file.

22 Claims, 34 Drawing Sheets

U.S. PATENT DOCUMENTS

| | | |
|---|---|---|
| 2009/0003323 A1 | 1/2009 | Ishibashi |
| 2009/0092128 A1 | 4/2009 | Ishibashi |
| 2009/0262661 A1 | 10/2009 | Ueda et al. |

FOREIGN PATENT DOCUMENTS

| | | | |
|---|---|---|---|
| JP | H08-274893 A | 10/1996 |
| JP | H09-163058 A | 6/1997 |
| JP | H09-321970 A | 12/1997 |
| JP | H11-261628 A | 9/1999 |
| JP | 2001-211302 A | 8/2001 |
| JP | 2001-292159 A | 10/2001 |
| JP | 2002-283634 A | 10/2002 |
| JP | 2002-344920 A | 11/2002 |
| JP | 2002-369110 A | 12/2002 |
| JP | 2003-067308 A | 3/2003 |
| JP | 2003-186646 A | 7/2003 |
| JP | 2004-038864 A | 2/2004 |
| JP | 2004-040141 A | 2/2004 |
| JP | 2004-056235 A | 2/2004 |
| JP | 2004-187262 A | 7/2004 |
| JP | 2004-221842 A | 8/2004 |
| JP | 2005-057729 A | 3/2005 |
| JP | 2005-072957 A | 3/2005 |
| JP | 2005-080025 A | 3/2005 |
| JP | 2005-192086 A | 7/2005 |
| JP | 2005-286856 A | 10/2005 |
| JP | 2005-333515 A | 12/2005 |
| JP | 2006-025178 A | 1/2006 |
| JP | 2006-067400 A | 3/2006 |
| JP | 2006-202149 A | 8/2006 |
| JP | 2006-254311 A | 9/2006 |
| JP | 2006-340039 A | 12/2006 |
| JP | 2006-345542 A | 12/2006 |
| JP | 2007-036443 A | 2/2007 |
| JP | 2007-065783 A | 3/2007 |
| JP | 2007-088891 A | 4/2007 |
| JP | 2007-235328 A | 9/2007 |
| JP | 2009-539313 T | 12/2007 |
| JP | 2009-033708 A | 2/2009 |
| JP | 2009-105870 A | 5/2009 |
| JP | 2009-246879 A | 10/2009 |
| WO | 2007-055326 A1 | 5/2007 |
| WO | 2007-139635 A1 | 12/2007 |

OTHER PUBLICATIONS

Japan Patent Office; Office Action in Japanese Patent Application No. 2008-093817 (counterpart to the above-captioned U.S. patent application) mailed May 25, 2010.

Japan Patent Office; Office Action for Patent Application No. JP2008-093838, mailed Sep. 28, 2010. (counterpart to above-captioned U.S. patent application).

Japan Patent Office; Office Action for Patent Application No. JP2008-093848, mailed Oct. 12, 2010. (counterpart to above-captioned U.S. patent application).

\* cited by examiner

FIG.1(b)

| | |
|---|---|
| HDD | —14 (34, 54) |
| INTERMEDIARY APPLICATION | —14a (34a, 54a) |
| IP TELEPHONE APPLICATION | —14b (34b, 54b) |
| PC-SIDE CONFIGURATION DATA STORAGE AREA | —14c (34c, 54c) |
| CALL CENTER DATA STORAGE AREA | —14d (34d, 54d) |
| DEVICE DATA STORAGE AREA | —14e (34e, 54e) |
| VERIFICATION RESULTS STORAGE AREA | —14f (34f, 54f) |
| TRANSMISSION JOB HISTORY STORAGE AREA | —(14g (34g, 54g)) |
| RECEPTION JOB HISTORY STORAGE AREA | —(14h (34h, 54h)) |
| TRANSMISSION TYPE TABLE STORAGE AREA | —(14i (34i, 54i)) |
| EXECUTION POSSIBLE CHARACTER STRING STORAGE AREA | —(14j (34j, 54j)) |
| EXECUTION IMPOSSIBLE CHARACTER STRING STORAGE AREA | —(14k (34k, 54k)) |
| DRIVER | —14m (34m, 54m) |

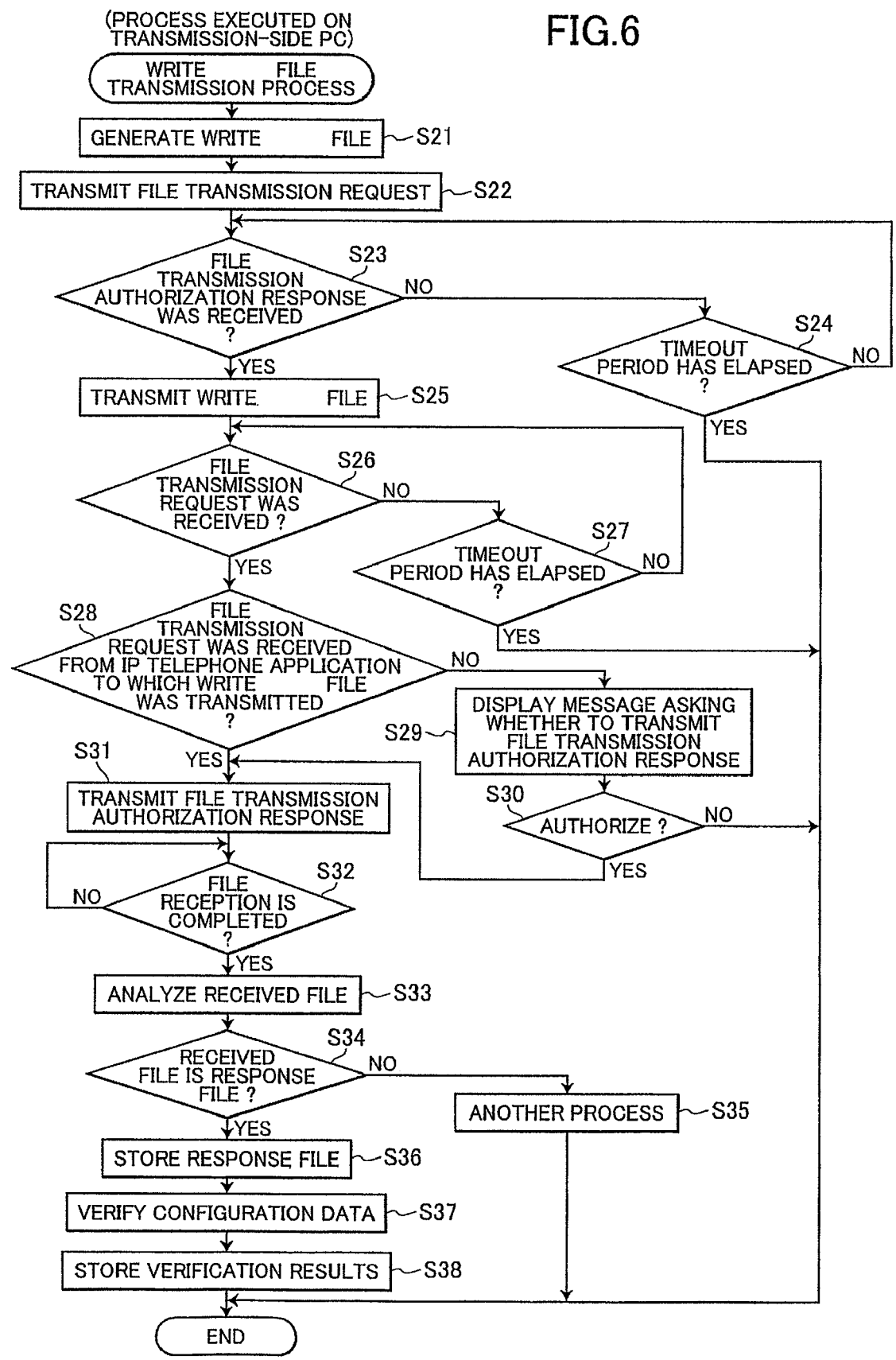

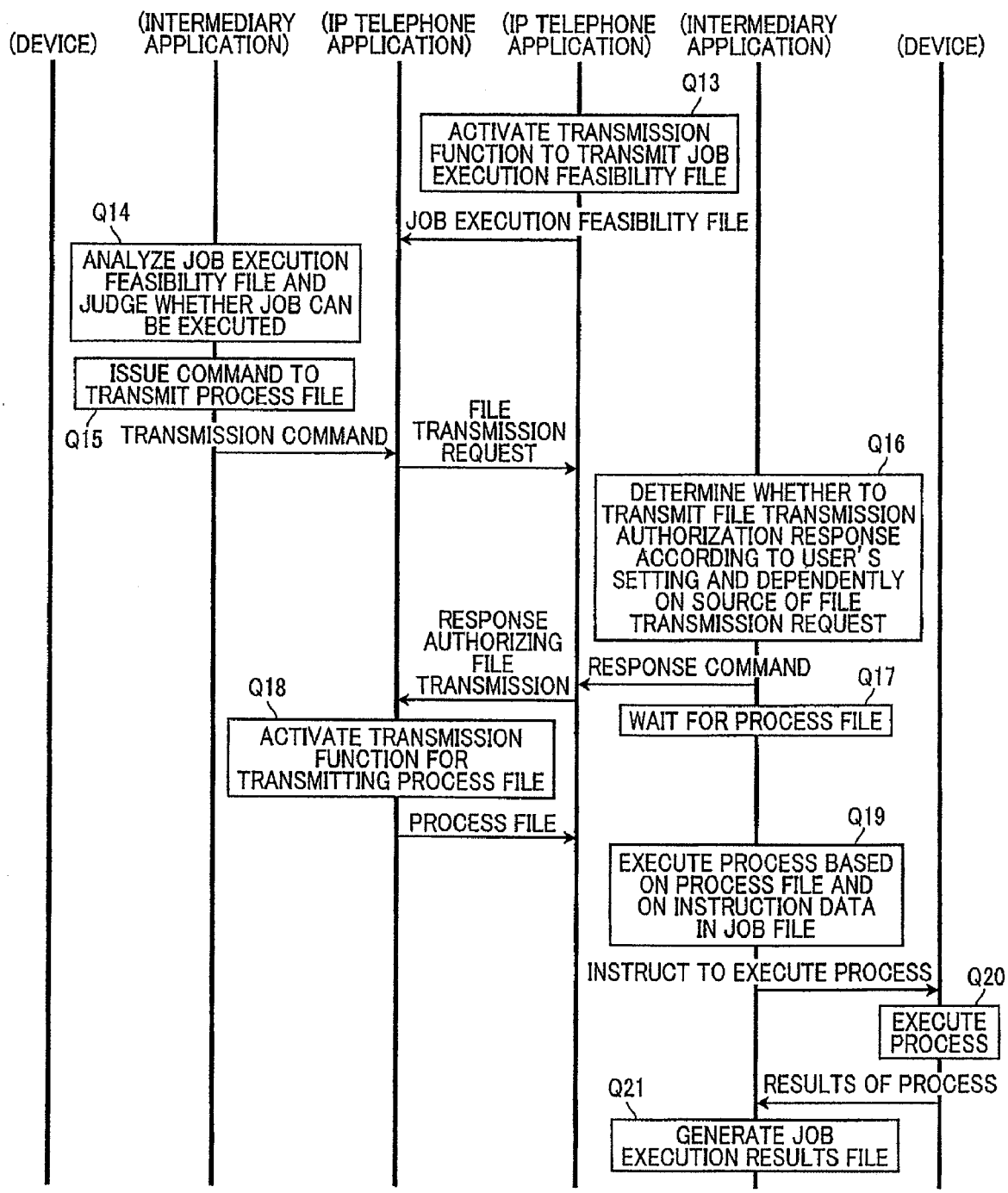

FIG.13

EXAMPLE OF SCREEN PROMPTING
USER WHETHER TO TRANSFER JOB

| TRANSFER PRINT JOB | |
|---|---|
| Image File | Read By Scanner |
| Paper Size | A4 |
| Monochrome/Color | Color |
| Resolution | 300 dpi |
| Pages | 1 |
| Copies | 1 |
| Cancel | Send |

SAMPLE JOB FILE

FIG.14(a)
```
[File Type]=jobfile
//This file is a file inquiring whether the following process
//can be executed by your IP telephone terminal when
//your IP telephone terminal supports a printer function.
//No action is taken when the printer function is not
//supported.
[JOBID]="Taro2008_01_25_12_30_44"
[Function]="Color Printing"
[File Format]="JPG"
[File Size]="123,456 bytes"
[Paper Size]="A4"
[Resolution]="300 dpi"
[Number of Pages]="1"
[Number of Copies]="1"
*******************
********************************************
********************************************
********************************************
********************************************
```

SAMPLE JOB EXECUTION FEASIBILITY FILE FOR
A CASE IN WHICH THE JOB CAN BE EXECUTED

FIG.14(b)
```
[File Type]="Job Execution Feasibility"
[JOBID]="Taro2008_01_25_12_30_44"
[Response]="Execution Possible"
//The following function can be executed.
[Function]="Color Printing"
[File Format]="JPG"
[File Size]="123,456 bytes"
[Paper Size]="A4"
[Resolution]="300 dpi"
[Number of Pages]="1"
[Number of Copies]="1"
*******************
********************************************
********************************************
********************************************
********************************************
```

SAMPLE JOB EXECUTION FEASIBILITY FILE
WHEN THE JOB CANNOT BE EXECUTED

FIG.14(c)
```
[File Type]="Job Execution Feasibility"
[JOBID]="Taro2008_01_25_12_30_44"
[Response]="Execution Not Possible"
//The job cannot be executed for the following reason.
[Printing Function]="Monochrome Printing"
*******************
********************************************
********************************************
********************************************
********************************************
```

SAMPLE JOB EXECUTION RESULTS FILE
WHEN THE EXECUTION WAS A SUCCESS

FIG.15(a)

```
[File Type]="Job Execution Results"
[JOBID]="Taro2008_01_25_12_30_44"
[Response]="Success"
//Execution of the following function was successful.
[Function]="Color Printing"
[File Format]="JPG"
[Paper Size]="A4"
[Resolution]="300 dpi"
[Number of Pages]="1"
[Number of Copies]="1"
*******************
***********************************************
***********************************************
***********************************************
***********************************************
```

SAMPLE JOB EXECUTION RESULTS
FILE WHEN THE EXECUTION FAILED

FIG.15(b)

```
[File Type]="Job Execution Results"
[JOBID]="Taro2008_01_25_12_30_44"
[Response]="Failure"
//Execution failed due to the following reason.
[Printing Status]="Paper Jam"
*******************
***********************************************
***********************************************
***********************************************
***********************************************
```

FIG.16 SAMPLE TRANSMISSION TYPE TABLE

| TRANSMISSION TYPE | DETAILS IN METHOD OF SELECTING FUNCTION | PROCESS AT DESTINATION PC OR DEVICE ||||||
| --- | --- | --- | --- | --- | --- | --- | --- |
| | | PRINT | LCD | MEMORY CARD | DEVICE RAM | PLAYBACK | TRANSFER TO OTHER DEVICE |
| SCANNED DOCUMENT | SPECIFY SCANNED SIZE, RESOLUTION, NUMBER OF PAGES, COLOR/MONOCHROME SETTING, AND THE LIKE | ○※ | ○ | ○ | ○ | × | ○ |
| RECEIVED FAX | SELECT FROM VIEW ONLY RECEPTION DATA THROUGH GUI | ○※ | ○ | ○ | ○ | × | ○ |
| EXTERNAL DEVICE | TEMPORARILY SAVE DATA FROM DIGITAL CAMERA OR THE LIKE AND TRANSFER THE DATA | ○※ | ○ | ○ | ○ | × | ○ |
| MEMORY CARD | SELECT FILE ON MEMORY CARD THROUGH GUI | ○※ | ○ | ○ | ○ | × | ○ |
| VOICE | SPECIFY START AND STOP TIMINGS OF VOICE RECORDATION THROUGH GUI AND CONVERT VOICE DATA | △ RECOGNIZE VOICE AND PRINT TEXT | △ RECOGNIZE VOICE AND DISPLAY TEXT | ○ | ○※ | ○ | ○ |
| RECORDED VOICE | SELECT RECORDED VOICE DATA THROUGH GUI | △ RECOGNIZE VOICE AND PRINT TEXT | △ RECOGNIZE VOICE AND DISPLAY TEXT | ○ | ○※ | ○ | ○ |

※ SET AS DEFAULT FUNCTION

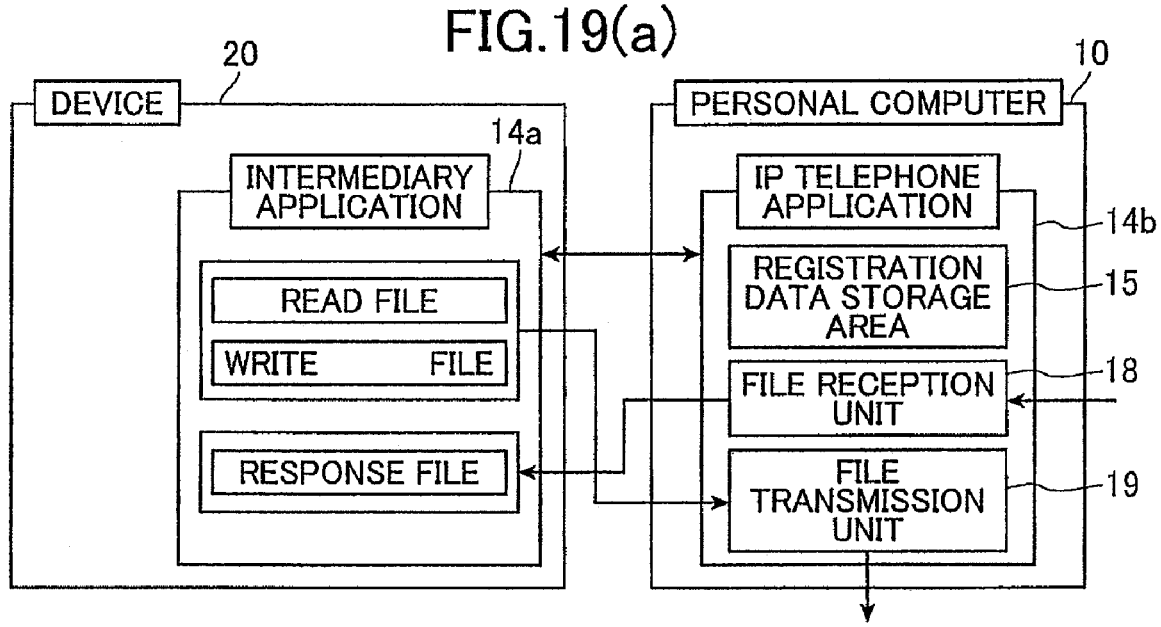
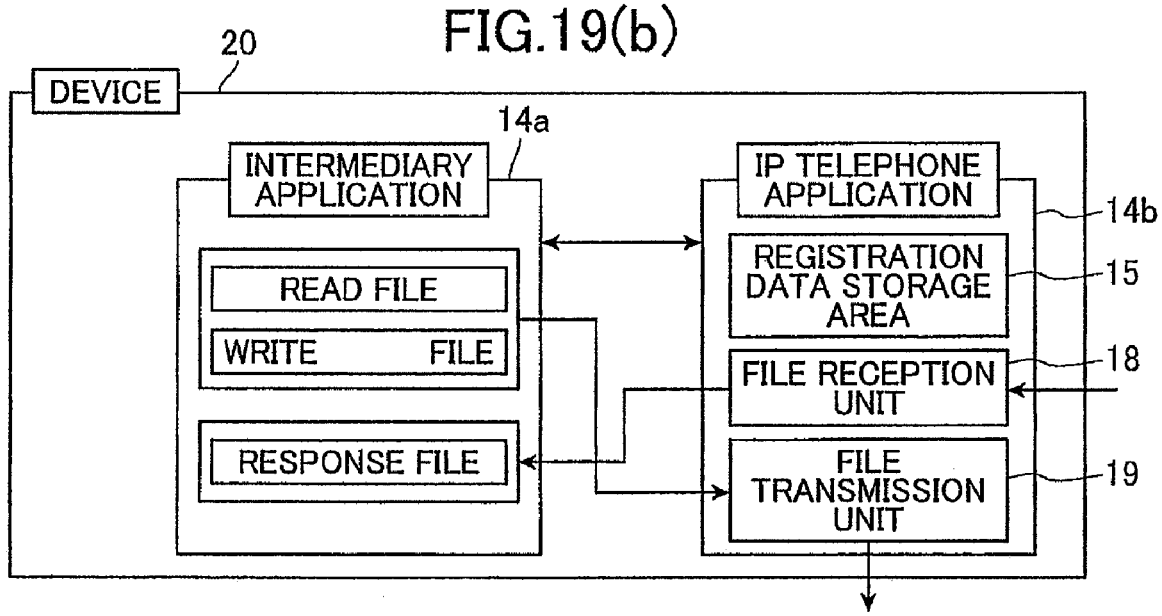

IP TELEPHONE TERMINAL

CROSS REFERENCE TO RELATED APPLICATIONS

This application claims priority from Japanese Patent Application Nos. 2008-93817 filed Mar. 31, 2008, 2008-93838 filed Mar. 31, 2008, and 2008-93848 filed Mar. 31, 2008. The entire content of each of these priority applications is incorporated herein by reference.

TECHNICAL FIELD

The present invention relates to an IP telephone terminal.

BACKGROUND

Internet Protocol (IP) telephone systems such as Skype have become commonplace in recent years. The IP telephone system can be used simply by installing software on a network terminal or the like, where the software is developed by the IP telephone provider for originating and receiving calls and implementing voice communications. Skype, which offers a free IP telephone application and free calls, has particularly enjoyed much popularity. One factor enabling Skype to offer free calls may be its peer-to-peer communications, which eliminate the need for a server.

United States Patent Application Publication Nos. US2005/141529A1 (Document 1) and US2007/189266A1 (Document 2) also disclose the IP telephone systems. Document 1 merely describes a communication system which can execute a function not supported by a communication apparatus itself but possessed by another device. Document 2 describes that a transmitting device transmitting images and a receiving device receiving the images can identify which communication method is supported by both parties using SDP media stream descriptions expanded by an SIP message.

SUMMARY

The IP telephone system not only has a communication function for implementing voice communications between network terminals (IP telephone terminals) running the IP telephone software, but also file transmission and reception functions for transmitting and receiving files while voice communications are implemented simultaneously.

It is an object of the invention to provide an IP telephone terminal that can make good use of file transmission and reception functions on an IP telephone system and that can effectively utilize the resources of the IP telephone system other than voice communications.

In order to attain the above and other objects, the invention provides an IP telephone terminal including: a communicating unit; an IP telephone function controlling unit; a function implementation controlling unit; a configuration data storing unit; a configuration data acquisition controlling unit; a response file generation controlling unit; a response file transmission controlling unit; and an update controlling unit. The communicating unit is configured so as to be capable of being connected to an Internet, performing IP telephone communications with an external IP telephone terminal via the Internet, and receiving identification data assigned to an external IP telephone terminal from the Internet. The IP telephone function controlling unit controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response. The function implementation controlling unit is configured so as to be capable of controlling implementation of a function instructed by a file received via IP telephone communications when the communicating unit receives the file. The configuration data storing unit stores configuration data that is used by the function implementation controlling unit to implement the function. The configuration data acquisition controlling unit performs control to acquire configuration data from the configuration data storing unit when the communicating unit receives a read file that is transmitted from the external IP telephone terminal. The response file generation controlling unit performs control to generate a response file including the configuration data acquired by the configuration data acquisition controlling unit. The response file transmission controlling unit controls the communicating unit to transmit the response file generated by the response file generation controlling unit to the external IP telephone terminal that has transmitted the read file. The update controlling unit performs, when the communicating unit receives a write file, control to update the configuration data stored in the configuration data storing unit based on the write file that is transmitted from the external IP telephone terminal that has received the response file.

According to another aspect, the invention provides a method for controlling an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; a function implementation controlling unit that is configured so as to be capable of controlling implementation of a function instructed by a file received via IP telephone communications when the communicating unit receives the file; and a configuration data storing unit that stores configuration data that is used by the function implementation controlling unit to implement the function, the method including: acquiring configuration data from a configuration data storing unit when the communicating unit receives a read file that is transmitted from the external IP telephone terminal; generating a response file including the configuration data and outputting the response file; controlling the communicating unit to transmit the response file to the external IP telephone terminal that has transmitted the read file; and updating, when the communicating unit receives a write file, the configuration data stored in the configuration data storing unit based on the write file that is transmitted from the external IP telephone terminal that has received the response file.

According to another aspect, the invention provides a computer readable medium storing a set of program instructions executable on an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; a function implementation controlling unit that is configured so as to be capable of controlling implementation of a function instructed by a file received via IP telephone communications when the communicating unit receives the file; and a configuration data storing unit that stores configuration data that is used by the function implementation controlling unit to implement the function, the instructions including: acquiring configuration data from a configuration data storing unit when the communicating unit receives a read file that is transmitted from the external IP telephone terminal; generating a response file including the configuration data and outputting the response file; controlling the communicating unit to transmit the response file to the external IP telephone terminal that has transmitted the read file; and updating, when the communicating unit receives a write file, the configuration data stored in the configuration data storing unit based on the write file that is transmitted from the external IP telephone terminal that has received the response file.

According to another aspect, the invention provides an IP telephone terminal including: a function implementation controlling unit; a configuration data storing unit; a configuration data acquisition controlling unit; a response file generation controlling unit; and an update controlling unit. The function implementation controlling unit is configured so as to be capable of controlling implementation of a function instructed by a file received via IP telephone communications when the communicating unit receives the file. The configuration data storing unit stores configuration data that is used by the function implementation controlling unit to implement the function. The configuration data acquisition controlling unit performs control to acquire configuration data from the configuration data storing unit upon receipt of a read file that is transmitted from an external IP telephone terminal. The response file generation controlling unit performs control to generate a response file including the configuration data acquired by the configuration data acquisition controlling unit and to output the response file. The update controlling unit performs, upon receipt of a write file, control to update the configuration data stored in the configuration data storing unit based on the write file that is transmitted from the external IP telephone terminal that has received the response file.

According to another aspect, the invention provides an IP telephone terminal including: a communicating unit; an IP telephone function controlling unit; a read file generation controlling unit; a read file transmission controlling unit; and a configuration data acquisition controlling unit. The communicating unit is configured so as to be capable of being connected to an Internet, performing IP telephone communications with an external IP telephone terminal via the Internet, and receiving identification data assigned to an external IP telephone terminal from the Internet. The IP telephone function controlling unit controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response. The read file generation controlling unit performs control to generate a read file including instructions to read configuration data used for implementing a function on the external IP telephone terminal. The read file transmission controlling unit controls the communicating unit to transmit the read file generated by the read file generation controlling unit to the external IP telephone terminal. The configuration data acquisition controlling unit performs control to acquire configuration data, which is included in a response file that has been transmitted from the external IP telephone terminal in response to the read file, when the communicating unit receives the response file.

According to another aspect, the invention provides a method for controlling an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; and an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; the method including: generating a read file including instructions to read configuration data used for implementing a function on an external IP telephone terminal and outputting the read file; controlling a communicating unit to transmit the read file to the external IP telephone terminal; and acquiring configuration data which is included in a response file, upon receipt of the response file that has been transmitted from the external IP telephone terminal in response to the read file.

According to another aspect, the invention provides a computer readable medium storing a set of program instructions executable on an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; and an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; the instructions including: generating a read file including instructions to read configuration data used for implementing a function on an external IP telephone terminal and outputting the read file; controlling a communicating unit to transmit the read file to the external IP telephone terminal; and acquiring configuration data which is included in a response file, upon receipt of the response file that has been transmitted from the external IP telephone terminal in response to the read file.

According to another aspect, the invention provides an IP telephone terminal including: a read file generation controlling unit that performs control to generate a read file including instructions to read configuration data used for implementing a function on an external IP telephone terminal and to output the read file; and a configuration data acquisition controlling unit that performs, upon receipt of a response file, control to acquire configuration data, which is included in the response file that has been transmitted from the external IP telephone terminal in response to the read file.

BRIEF DESCRIPTION OF THE DRAWINGS

The particular features and advantages of the invention as well as other objects will become apparent from the following description taken in connection with the accompanying drawings, in which:

FIG. 1(b) is a block diagram showing a hard disk drive in a PC of each IP telephone terminal provided in the IP telephone system of FIG. 1(a);

FIG. 6 is a flowchart illustrating steps in a write file transmission process executed on the transmission-side PC;

FIG. 11(b) is a second part of the sequence chart showing steps of the process according to the second modification of the first embodiment;

FIG. 13 shows a sample display screen on the transmission-side PC;

FIG. 14(a) shows a sample job file;

FIG. 14(b) shows a sample job execution feasibility file;

FIG. 14(c) shows another sample job execution feasibility file;

FIG. 15(a) shows a sample job execution results file;

FIG. 15(b) shows another sample job execution results file;

FIG. 16 conceptually illustrates a sample transmission type table according to a third modification of the first embodiment;

FIG. 19(a) conceptually illustrates the structure of a PC and a device according to a fourth modification of the first embodiment;

FIG. 19(b) conceptually illustrates the structure of a device according to a fifth modification of the first embodiment;

DETAILED DESCRIPTION

Figure 1A:
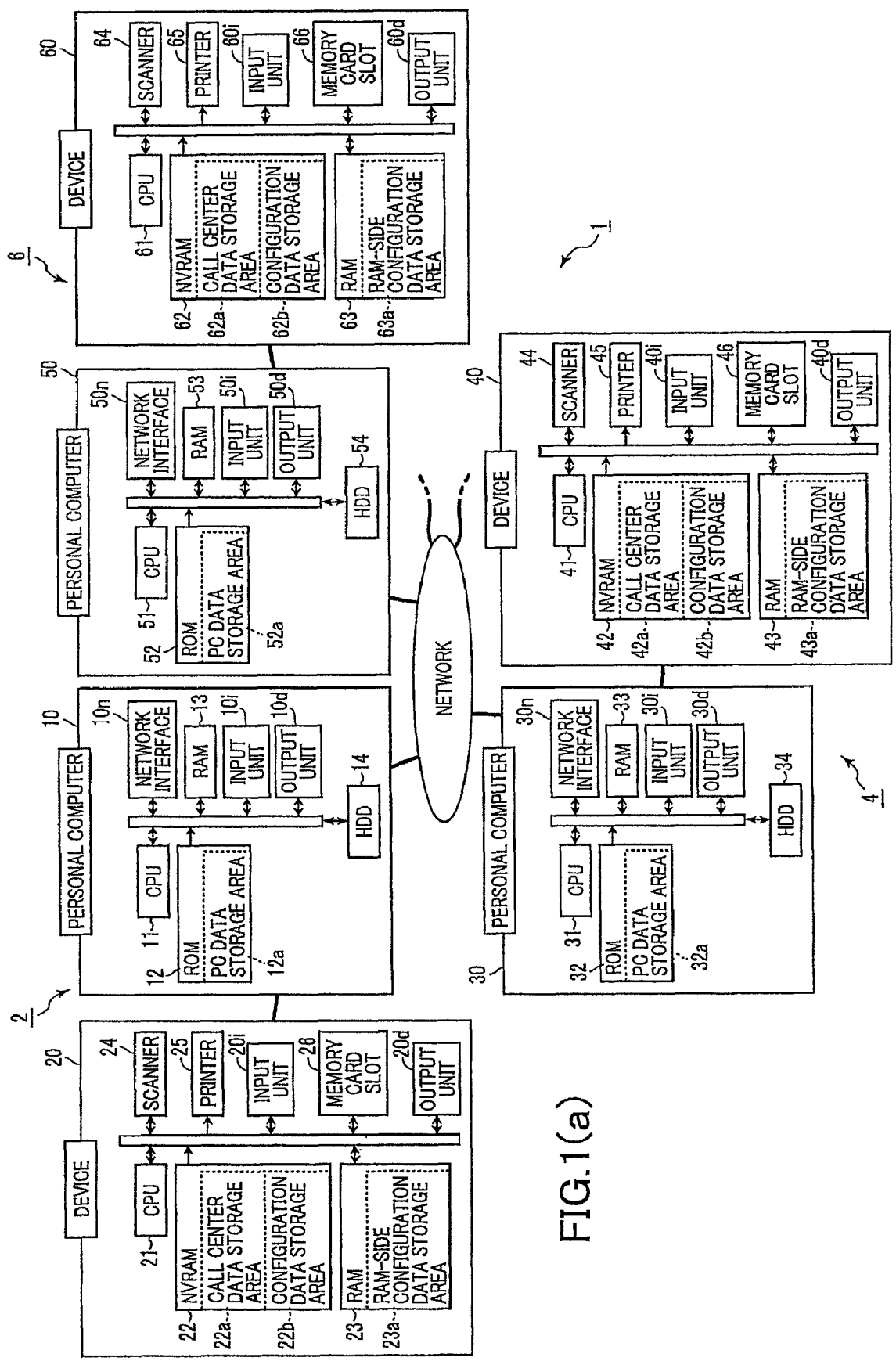
FIG. 1(a) is a block diagram showing the structure of an IP telephone system according to a first embodiment of the present invention.

An IP telephone system according to embodiments of the invention will be described while referring to the accompanying drawings wherein like parts and components are designated by the same reference numerals to avoid duplicating description.

<First Embodiment>

An IP telephone system 1 according to a first embodiment of the present invention will be described with reference to FIGS. 1(a) to 8(d).

In the IP telephone system 1 of the present embodiment, one IP telephone terminal can update configuration data for a device connected to another IP telephone terminal through file transmission and reception between the IP telephone terminals.

The structure of the IP telephone system 1 including IP telephone terminals 2, 4, and 6 according to the first embodiment will be described with reference to FIGS. 1(a) and 1(b).

FIG. 1(a) is a block diagram showing the structure of the IP telephone system 1 according to the first embodiment.

As shown in FIG. 1(a), the IP telephone system 1 is primarily configured of IP telephone terminals 2, 4, and 6 interconnected via a network (the Internet). The IP telephone terminal 2 has a personal computer (hereinafter referred to as "PC") 10; and a device 20 connected to the PC 10. The IP telephone terminal 4 has a PC 30; and a device 40 connected to the PC 30. The IP telephone terminal 6 has a PC 50; and a device 40 connected to the PC 60. While not shown in the drawing, a plurality of other IP telephone terminals, each having a PC and a devices connected to the PC, are connected to the IP telephone terminals 2, 4, and 6 via the network.

The device 20 is a multifunction peripheral in this example. The device 20 primarily includes a CPU 21, an NVRAM 22, a RAM 23, a scanner 24, a printer 25, a memory card slot 26, an input unit 20i, and an output unit 20d.

The CPU 21 is a central processing unit that controls the device 20 based on fixed values and programs stored in the NVRAM 22. The NVRAM 22 is a non-volatile memory storing various control programs executed on the device 20 and fixed values. The NVRAM 22 retains data and programs stored therein even after the device 20 is turned off. The RAM 23 is a writable memory for temporarily storing various data. The scanner 24 functions to generate image data by scanning an image. The printer 25 prints images on paper or another recording medium. The memory card slot 26 is a unit in which memory cards are inserted and functions to read data from and write data to the memory cards. The scanner 24, printer 25, and memory card slot 26 of the device 20 are devices well known in the art and, thus, a detailed description of these devices will not be given here.

The NVRAM 22 is provided with a call center data storage area 22a and a configuration data storage area 22b.

Information on a call center for the device 20 (contact list of the call center) is stored in the call center data storage area 22a when the device 20 is manufactured. The information on the call center includes: address information of the call center; and a display name indicative of the call center. The address information of the call center is address information of an IP telephone application provided in the call center, and is used for communicating with the call center. The call center is a manufacturer of the devices 20, 40, and 60. In this example, the PC 10 serves as the call center. The information on the call center therefore includes: address information of an IP telephone application 14b (to be described later) which is provided in the PC 10; and the display name indicative of the call center.

Various configuration data, such as the paper size, printing orientation, and method of communicating with the PC 10, is stored as default settings in the configuration data storage area 22b.

The RAM 23 is provided with a RAM-side configuration data storage area 23a. The configuration data is read from the configuration data storage area 22b in the NVRAM 22 and stored in the RAM-side configuration data storage area 23a at a particular timing, such as when the power of the device 20 is turned on and when the configuration data in the configuration data storage area 22b is updated.

The input device 20i is for receiving operations by a user, and may include a visual input device (a button and a keyboard, for example) and an audio input unit (microphone, for example).

The output device 20d is for outputting data to the user, and includes a visual output unit or display unit (LCD, for example) and an audio output unit (speakers, for example).

The PC 10 primarily includes a CPU 11, a ROM 12, a RAM 13, a hard disk drive (hereinafter referred to as "HDD") 14, a network interface 10n, an input unit 10, and an output unit 10d. Although not shown in the drawing, the PC 10 also has a memory card slot.

The CPU 11 is a central processing unit that performs control of the PC 10 according to fixed values and programs stored in the ROM 12 and HDD 14.

The ROM 12 is a non-writable memory for storing various control programs executed by the PC 10 and fixed values. The ROM 12 has a PC data storage area 12a for storing PC data indicative of functions that can be implemented on the PC 10.

More specifically, the PC data storage area 12a includes the registry of the ROM 12, ini files, and the like, and stores therein the OS version on the PC 10 and data for installed applications. The functions possessed by the PC 10 can be identified from the OS version, types of installed applications, and the like.

The RAM 13 is a writable memory for temporarily storing various data.

The HDD 14 is a storage device storing various control programs executed by the PC 10 and fixed values and is capable of preserving stored content after the power supply is turned off.

The input device 10i is for receiving operations by a user, and includes a visual input device (a keyboard and a mouse, for example) and an audio input unit (microphone, for example).

The output device 10d is for outputting data to the user, and includes a visual output unit or display unit (LCD, for example) and an audio output unit (speakers, for example).

The network interface 10n is for performing IP telephone communication with other IP telephone terminals via the network (Internet).

A driver program 14m for the device 20 is stored in the HDD 14. When the user inputs an instruction in the input unit 10i to execute his/her desired function on the device 20, the CPU 11 executes the driver program 14m to execute the desired function on the device 20 by using the configuration data stored in the RAM-side configuration data storage area 23a. It is noted that the user of the PC 10 can change the configuration data in the RAM-side configuration data storage area 23a in the RAM 23 by operating the input unit 10i. Similarly, the user of the PC 10 can also change the configuration data in the configuration data storage area 22b in the NVRAM 22 by operating the input unit 10i, whereupon the CPU 11 copies the thus newly changed configuration data in the configuration data storage area 22b into the RAM-side configuration data storage area 23a.

As shown in FIG. 1(b), an intermediary application 14a and an IP telephone application 14b are installed on the HDD 14.

The intermediary application 14a is software for relaying signals between the IP telephone application 14b and the device 20, functioning as a collaborative program to provide liaison between the IP telephone application 14b and the device 20. The intermediary application 14a can also control the device 20 to implement a function of the device 20 in accordance with the configuration data stored in the RAM-side configuration data storage area 23a and in accordance with a function-execution file that is transmitted from a remote IP telephone terminal and that includes instructions to execute a desired function and data desired to be subjected to the function.

The IP telephone application 14b implements voice communications with another IP telephone application (IP telephone applications 34b and 54b, for example) via the network. An example of an IP telephone application is Skype's communication software.

The HDD 14 is also provided with a PC-side configuration data storage area 14c, a call center data storage area 14d, a device data storage area 14e, and a verification results storage area 14f.

The PC-side configuration data storage area 14c stores the configuration data acquired from the RAM-side configuration data storage area 23a of the device 20.

The call center data storage area 14d stores identification data for the manufacturer of the device 20 (vendor ID data) acquired from the call center data storage area 22a of the device 20.

The vendor ID data is stored in the call center data storage area 14d when the driver 14m for the device 20 is installed in the HDD 14.

The device data storage area 14e stores model data indicating functions that can be implemented on the device 20. Functions may include a printer function, scanner function, facsimile function, color printing/monochrome printing function, and inkjet/laser printing function. Model data is stored in the device data storage area 14e when the driver 14m for the device 20 is installed in the HDD 14.

The verification results storage area 14f stores results of updating configuration data for an external PC, such as the PC 30 or 50. Specifically, the verification results data stored in the verification results storage area 14f is data correlating updated external PCs with updated configuration data that is obtained in the external PCs through update operations that the external PCs executes in response to update instructions (write file to be described later) that the PC 10 has transmitted to the external PCs.

The PCs 30 and 50 have a construction identical to the PC 10, and the devices 40 and 60 have a construction identical to the device 20. Therefore, a detailed description of these PCs and devices will not be repeated.

Next, the configuration for transferring files or data between the PCs 10, 30, and 50 and the configuration for transferring data between the devices 20, 40, and 60 and the PCs 10, 30, and 50 will be described with reference to FIG. 2.

Figure 2:
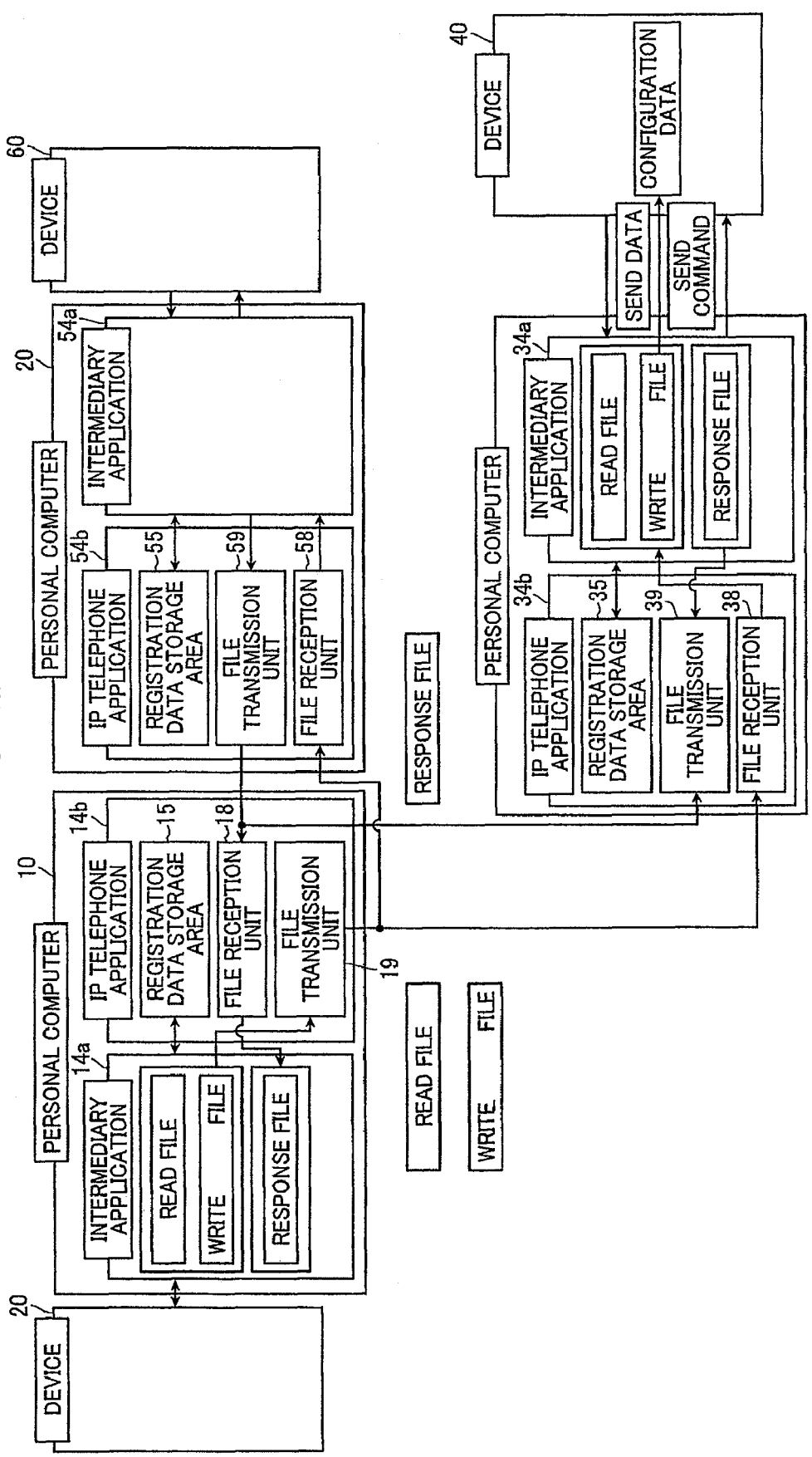
FIG. 2 conceptually illustrates file and data transmission paths between PCs in the IP telephone terminals and between the PC and device in each IP telephone terminal.

FIG. 2 conceptually illustrates file and data transmission paths between the PCs 10, 30, and 50 and between the PCs 10, 30, and 50 and the devices 20, 40, and 60.

As shown in FIG. 2, the intermediary application 14a and IP telephone application 14b have been installed on the PC 10 as described earlier. The intermediary application 14a is configured to exchange data with the device 20.

The intermediary application 14a is capable of transmitting commands to the device 20 for the acquisition of data and receiving data transmitted from the device 20.

The intermediary application 14a can also exchange data with an external PC, such as the PCs 30 and 50, via the IP telephone application 14b.

Specifically, the device 20 is equipped with an audio I/O function configured of a speaker (output unit 20d), microphone (input unit 20i), and the like and may be capable of implementing an IP telephone for voice communications using this function.

In this case, the IP telephone application 14b is configured to output voice data received from another IP telephone terminal 4 or 6, for example, from the speaker (output unit 20d) of the device 20 and to transmit voice data inputted through the microphone (input unit 20i) of the device 20 to the other IP telephone terminal.

The IP telephone application 14b and the device 20 transmit event messages to the intermediary application 14a. Upon receiving an event message, the intermediary application 14a relays the message. For example, the intermediary application 14a relays messages received from the IP telephone application 14b to the device 20 and relays messages received from the device 20 to the IP telephone application 14b.

When the IP telephone application 14b receives a call request from another IP telephone terminal 4 or 6, for example, the IP telephone application 14b transfers an event indicating this call request to the device 20 via the intermediary application 14a. If the user of the PC 10 then inputs an instruction through operations on the device 20 to allow the telephone call, an event indicating this call authorization is transferred to the IP telephone application 14b, and the call is initiated.

On the other hand, if the user of the PC 10 inputs an instruction via the device 20 to search for user devices, then an event indicating this search instruction is transferred to the IP telephone application 14b via the intermediary application 14a, and the IP telephone application 14b transmits a search request to the network to search for user devices. Upon receiving search results, the IP telephone application 14b transmits these results to the device 20 via the intermediary application 14a. The search results include information of IP telephone terminals that are obtained as a result of the search. The information of each IP telephone terminal includes: address information of the IP telephone terminal, that is, address information of an IP telephone application provided in the IP telephone terminal; and display names and profiles (to be described later) of user devices which are provided in the IP telephone terminal. For example, the information of the IP telephone terminal 4 includes: the address information of the IP telephone application 34b; and display names and profiles of the PC 30 and the device 40. Upon receiving the search results, the device 20 displays a contact list on the display (output unit 20d). The contact list lists up the display names of the user devices included in the search results.

At this time, the user can operate the device 20 to select, from the contact list, the display name of a user device (contact), with which the user desires to communicate. After selecting the contact and issuing a call command, the device 20 transfers a call request to the IP telephone application 14b via the intermediary application 14a. The IP telephone application 14b uses the address information of an IP telephone terminal that includes the contact, to transmit a call request to the IP telephone terminal, and waits for authorization to implement the call.

In the present embodiment, the intermediary application 14a generates a read file instructing the reading of configuration data for a device connected to an external PC, such as the device 40 or 60, and a write file instructing the writing or updating of configuration data for the device connected to the external PC and the reading of the updated configuration data, and instructs the IP telephone application 14b to transmit the generated files.

The intermediary application 14a also acquires, from the IP telephone application 14b, files that have been transmitted from an external PC, analyzes the acquired files, and executes a process based on the results of this analysis.

For example, if the acquired file is a read file, the intermediary application 14a reads configuration data from the RAM-side configuration data storage area 23a or the configuration data storage area 22b, and generates a response file including the read configuration data.

If the acquired file is a write file, the intermediary application 14a updates configuration data in the configuration data storage area 22b in the device 20 and copies the configuration data from the configuration data storage area 22b to the RAM-side configuration data storage area 23a, reads the updated configuration data obtained in the configuration data storage area 22b or the RAM-side configuration data storage area 23a, and generates a response file including the read updated configuration data.

If the acquired file is a function-execution file that includes an instruction to execute a desired function of the device 20 (printing, for example) and data desired to be subjected to the function of the device 20 (image data, for example), the intermediary application 14a controls the device 20 to execute the function of the device 20 (printing, for example) specified by the function-execution file by using the data to be subjected to the function and by using the configuration data stored in the RAM-side configuration data storage area 23a. It is noted that the function-execution file may include various settings, by which the desired function is desired to be executed. In such a case, the intermediary application 14a changes the configuration data in the RAM-side configuration data storage area 23a into the desired settings, while retaining the configuration data in the configuration data storage area 22b to be unchanged.

The intermediary application 14a also acquires registration data from a registration data storage area 15 in the IP telephone application 14b described later, generates a contact list of external PCs and devices based on the acquired registration data, and designate an external IP telephone application (34b or 54b, for example), with which the IP telephone application 14b should connect.

As shown in FIG. 2, the IP telephone application 14b is provided with the registration data storage area 15; a file reception unit 18; and a file transmission unit 19. The registration data storage area 15 is for storing registration data that includes: function identification data identifying functions possessed by the device 20; and function identification data identifying functions possessed by external PCs or devices. The file reception unit 18 is for receiving files or data from an external PC or device. The file transmission unit 19 is for transmitting files or data to an external PC or device.

The IP telephone application 14b can also implement voice communications with an IP telephone application installed on an external PC (the IP telephone application 34b or 54b of the PCs 30 or 50, for example) and can transmit and receive files by using the file reception unit 18 and file transmission unit 19.

FIG. 2 indicates paths via which the PC 10 transmits a read file and a write file to the PC 30 and receives response files to the read file and to the write file from the PC 30.

Specifically, the intermediary application 14a of the PC 10 generates a read file and write file, and the IP telephone application 14b transmits the generated files to the PC 30. An intermediary application 34a of the PC 30 receives the files via the IP telephone application 34b and transmits data and commands to the device 40 in a process based on the received files. The intermediary application 34a also generates a response file based on data acquired from the device 40, and the IP telephone application 34b transmits the response file to the intermediary application 14a. This process will be described later in greater detail with reference to FIGS. 4(a) through 8(d).

Next, registration data storage areas 15, 35, and 55 provided in the IP telephone applications 14b, 34b, and 54b will be described with reference to FIG. 3. These areas will be described collectively focusing on the registration data storage area 35 shown in FIG. 3.

Figure 3:
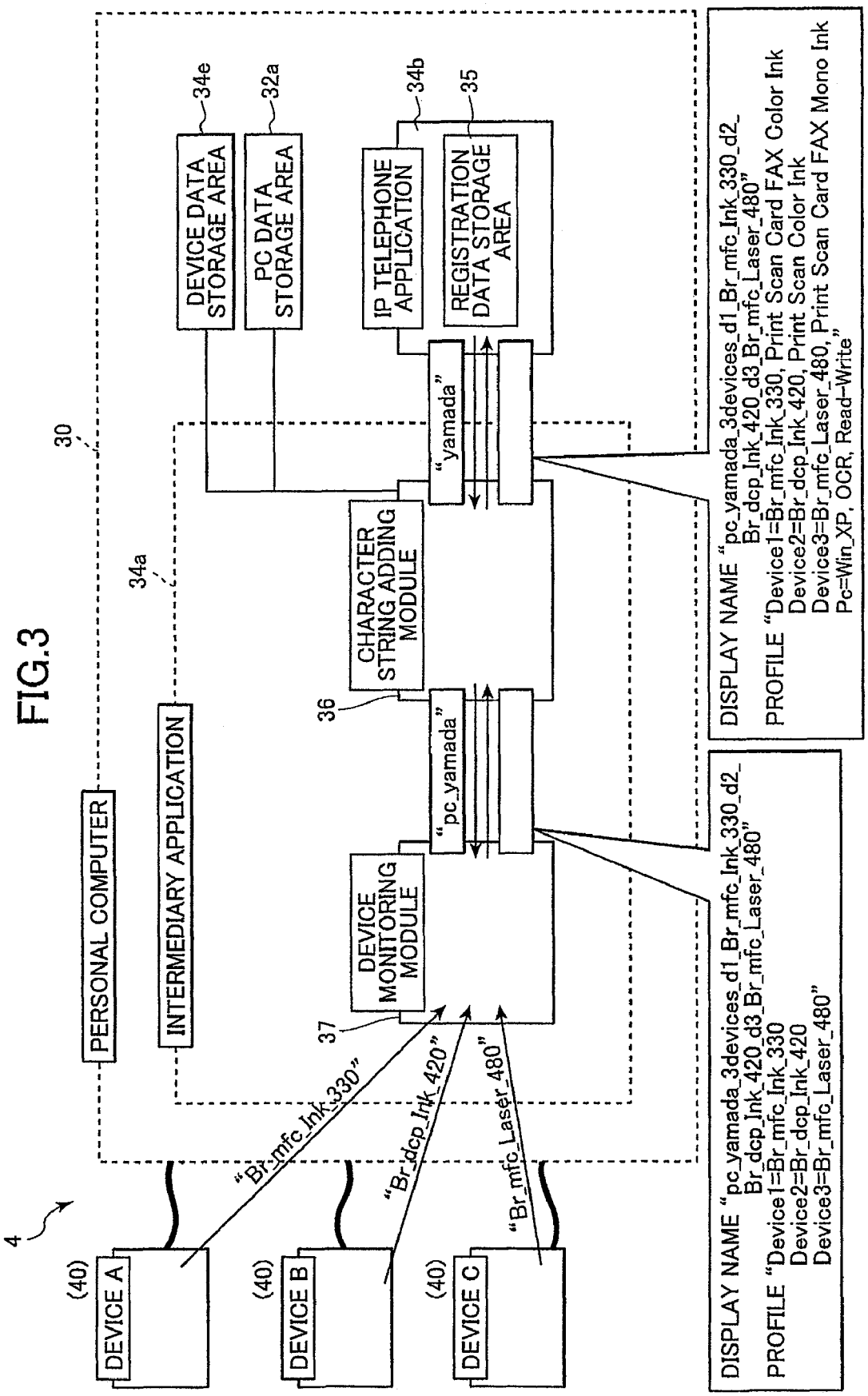
FIG. 3 illustrates the flow of steps in a process for recording registration data of an IP telephone terminal in its own registration data storage area.

FIG. 3 illustrates the flow of steps in a process for recording, in the registration data storage area 35 of the PC 30 in the IP telephone terminal 4, registration data for the IP telephone terminal 4 itself.

As shown in FIG. 3, the intermediary application 34a is provided with a character string adding module 36, and a device monitoring module 37. The PC 30 is capable of acquiring device data stored in a device data storage area 34e, and PC data pre-stored in a PC data storage area 32a of a ROM 32.

Registration data including function identification data specifying functions possessed by the device 40 and PC 30 is stored in the registration data storage area 35 of the IP telephone application 34b. For example, if the device 40 possesses a printer function, scanner function, and function for saving data on a memory card, registration data associating the device 40 with each of these functions is recorded in the registration data storage area 35. The method of recording registration data in the registration data storage area 35 will be described below.

When the intermediary application 34a is started, the character string adding module 36 acquires the display name "yamada" from the IP telephone application 34b, acquires the PC name "pc" from the PC data storage area 32a of the PC 30 as PC data, generates the character string "pc_yamada," and transmits this character string to the device monitoring module 37. In order to handle changes in the PC name or display name, this process may be performed periodically or whenever the PC name or display name is changed.

The device monitoring module 37 stores a character string received from the character string adding module 36 each time the device monitoring module 37 receives the character string from character string adding module 36. The device monitoring module 37 also monitors devices connected to the PC 30 to determine whether the device environment (connected status of devices A-C shown in FIG. 3) of the PC 30 has changed and whether the devices connected to the PC 30 support an IP telephone. Based on the monitoring results, the device monitoring module 37 generates a display name and profile based on the monitored devices and transmits this data to the character string adding module 36.

In the example of FIG. 3, the device monitoring module 37 acquires the device names "Br_mfc_Ink_330," "Br_d-cp_Ink_420," and "Br mfc_laser_480" for devices A, B, and C, respectively, as results of monitoring these devices.

The device monitoring module 37 generates a display name and profile based on the device names and transfers this data to the character string adding module 36. In this example, the display name "pc_yamada__3devices_d1_Br_mfc_Ink__330_d2_Br_dcp_Ink__420_d3_B r_mfc_laser__480" indicates that three devices connected to the PC 30 support an IP telephone. In this display name, "pc_yamada__3devices" indicates that three devices connected to pc_yamada have been detected. Further, the string "_dn_" (where n=1-3) is inserted before each device name.

Further, the device monitoring module 37 generates the profile "Device1=Br_mfc_Ink__330 Device2=Br_dcp_Ink__420 Device3=Br_mfc_laser__480".

Since each device name is also recorded as a profile, it is possible to omit the character string indicating the device name from the display name.

Subsequently, the character string adding module 36 references the device data storage area 34e to acquire functions possessed by the device corresponding to each device name received from the device monitoring module 37 and appends a character string indicating the acquired functions for each device to the corresponding profile received from the device monitoring module 37.

The character string adding module 36 also acquires functions possessed by the PC 30 from the PC data storage area 32a as PC data and appends a character string indicating these acquired functions to the profile. Specifically, the character string adding module 36 generates the profile "Device1=Br_mfc_Ink__330, Print Scan Card FAX Color Ink Device2=Br_dcp_Ink__420, Print Scan Card Color Ink Device3=Br_mfc_laser__480, Print Scan FAX Mono Laser Pc=Win_XP, OCR, Read-Write."

In this profile, "Print" indicates a printer function, "Scan" indicates a scanner function, "FAX" indicates a facsimile function, "Card" indicates a memory card slot function, "Color" and "Mono" indicate color printing and monochromatic printing functions, "Ink" and "Laser" indicate an inkjet system and laser system, "Win_XP" indicates that the OS on the personal computer is Windows (registered trademark) XP, and "OCR" indicates an optical character recognition function.

"Read-Write" indicates whether the PC 30 can modify configuration data for the device 40 (configuration data in the configuration data storage area 22b) based on remote read and write instructions. Hence, when the PC 10 acquires registration data from the PC 30, the PC 10 can recognize whether the PC 30 can modify configuration data for the device 40 based on remote read and write instructions. Consequently, the PC 10 can avoid issuing unnecessary read and write instructions to PCs or devices that cannot modify configuration data for the device 40 based on remote read and write instructions.

On the other hand, the character string adding module 36 uses the same display name generated by the device monitoring module 37, that is, "pc_yamada__3devices_d1_Br_mfc_Ink__330_d2_Br_dcp_Ink__420_d3_B r_mfc_laser__480."

The character string adding module 36 stores the display name and profile generated according to the method described above as registration data in the registration data storage area 35 of the IP telephone application 34b, in association with the address information of the IP telephone application 34b.

In this example, data "yamada" and the address information of the IP telephone application 34b serves as identification data (ID) identifying the present IP telephone terminal 4, which is configured from the PC 30 and the devices 40 (A, B, and C). Data included in the display name and the profile, other than the data "yamada", serves as terminal data indicative of functions that can be attained by the present IP telephone terminal 4.

The intermediary application 34a may be configured to record, in the registration data storage area 35, registration data (display name and profile) only for such a device that is being presently engaged in a telephone call among all the PC 30 and the devices 40 (A, B, and C) connected to the PC 30. Specifically, when obtaining a call authorization command from a device, the intermediary application 34a may record, in the IP telephone application 34b, registration data (display name and profile) only for the source of the call authorization command. Further, when obtaining a call request command from a device, the intermediary application 34a may record, in the IP telephone application 34b, registration data (display name and profile) only for the source of the call request command.

Next, the process for acquiring registration data from the registration data storage area of an external PC will be described.

The following description is for a case in which the PC 10 acquires registration data from the registration data storage area 35 of the PC 30.

First, the intermediary application 14a issues a search command to the IP telephone application 14b to search for user devices. In response, the IP telephone application 14b performs a user device search on the network. Assume that when the IP telephone application 14b performs the user device search on the network, the PCs 30 and 50 are being turned on among all the external PCs that are connectable to the network and the IP telephone applications 34b and 54b are being executed. In such a case, the IP telephone applications 34b and 54b transmit registration data stored in the registration data storage areas 35 and 55 (combinations of display name and profile) and the address information of the IP telephone applications 34b and 54b, to the IP telephone application 14b. The IP telephone application 14b stores the received registration data (display name and profile) in the registration data storage area 15 in association with the received address information of the IP telephone applications 34b and 54b.

Or, the intermediary application 14a may issue such a search command that searches user devices having "yamada" included in the display names. In such a case, the IP telephone application 34b transmits its own registration data that is stored in the registration data storage area 35 to the intermediary application 14a.

Some systems may be provided with a special user device called a supernode for managing registration data of all IP telephone applications. In this case, the supernode returns the registration data and the address information for all the IP telephone applications in response to a search performed on the IP telephone application 34b.

The intermediary application 14a can acquire a contact list based on the display name data in the registration data for external terminals thus recorded in the registration data storage area 15. In this way, the intermediary application 14a can acquire the contact list for external terminals recorded on the IP telephone application 14b. The contact list lists up display names of the devices in the external terminals representing candidates that can be called from the IP telephone application 14b. The intermediary application 14a can further acquire a function data list indicative of functions of the external devices based on the profile data in the registration data for external terminals thus recorded in the registration data storage area 15.

By analyzing the contact list and the function data list, the intermediary application 14a can recognize the functions that can be used by the PCs and devices in the external IP telephone terminals, can select desired functions, and can control the implementation of the desired functions on the PCs and devices in the external IP telephone terminals.

According to the present embodiment, the IP telephone system 1 can perform a configuration data updating process, in which one PC can issue a read instruction to another PC to read configuration data for a device connected to the other PC and then issue a write/read instruction to the other PC to write or update the configuration data for the device and subsequently to read the updated configuration data.

Next will be described, with reference to FIGS. 4(a) and 4(b), a sequence of steps in the configuration data updating process.

Figure 4A:
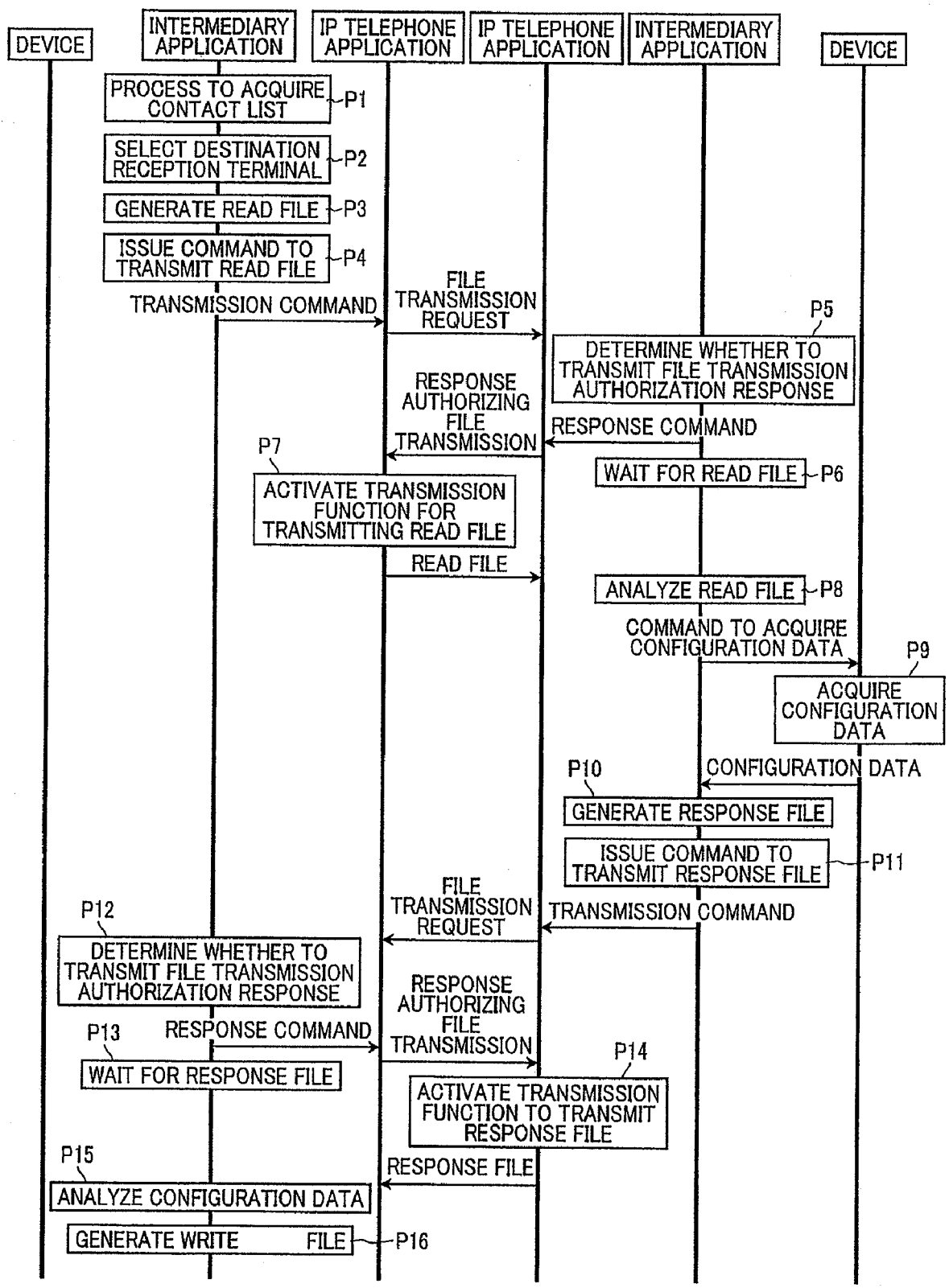
FIG. 4(a) is a part of a sequence chart showing steps of a configuration data updating process implemented by intermediary applications and IP telephone applications running on IP telephone terminals in the IP telephone system.
Figure 4B:
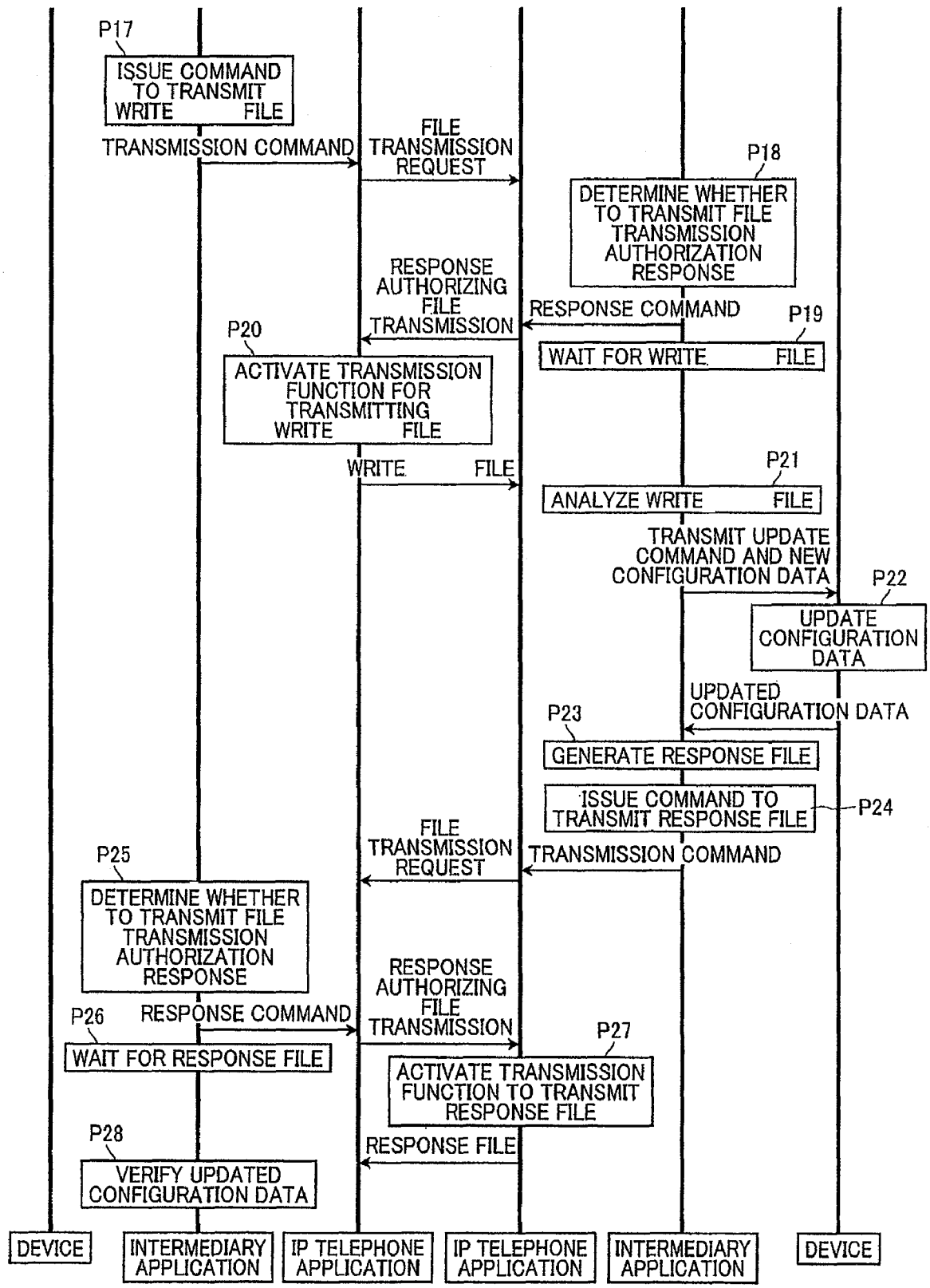
FIG. 4(b) is a remaining part of the sequence chart showing steps of the configuration data updating process.

FIGS. 4(a) and 4(b) show a sequence chart showing steps of the configuration data updating process implemented by programs of the intermediary application and the IP telephone application running on IP telephone terminals (the PCs 10, 30, and 50 and the devices 20, 40, and 60) of the IP telephone system 1. In the following description, the PC 10 issues read instructions and write/read instructions to the PC 30.

If the user of the PC 30 and the device 40 has difficulty in modifying the configuration data (default settings) stored in the configuration data storage area 42b for the device 40, it is conceivable that the user may call the PC 10, serving as the call center, through IP communications implemented via the IP telephone applications 34b and 14b. If the user of the PC 30 and the device 40 requests a modification of the configuration data for the device 40, the call center may modify the configuration data for the device 40 using the file transmission function in IP communications.

In P1 of FIG. 4(a), the intermediary application 14a of the PC 10 performs a process to acquire a contact list based on registration data for other PCs recorded in the registration data storage area 15. Through this process, the intermediary application 14a acquires a contact list for user devices registered in the IP telephone application 14b. In P2 the intermediary application 14a selects the display name for the PC 30 from the contact list acquired in P1 as the destination reception terminal.

In P3 the intermediary application 14a generates a read file instructing the PC 30 to read configuration data for the device 40 connected to the PC 30. In P4 the intermediary application 14a issues a command to the IP telephone application 14b to transmit the read file.

Upon receiving this transmission command, the IP telephone application 14b transmits a file transmission request to the IP telephone application 34b of the PC 30. The file transmission request includes the format of the file to be transferred (txt or jpg, for example) and the size of the file (123,456 bytes, for example).

In P5 the intermediary application 34a of the PC 30 determines whether to transmit a file transmission authorization response authorizing the file transmission. If the intermediary application 34a determines that the file transmission authorization response is to be transmitted to the PC 10, the intermediary application 34a transmits a response command to the IP telephone application 34b for file transmission authorization, and the IP telephone application 34b transmits a response signal to the IP telephone application 14b of the PC 10 authorizing file transmission.

After issuing the response command for authorizing file transmission, in P6 the intermediary application 34a waits for the IP telephone application 34b to receive the read file from the IP telephone application 14b and to transfer this read file.

In the meantime, the IP telephone application 14b receives the response authorizing file transmission from the IP telephone application 34b and in P7 activates the transmission function of the IP telephone application 14b for transmitting the read file. More specifically, the file transmission unit 19 provided in the IP telephone application 14b shown in FIG. 2 is controlled to transmit the read file to a file reception unit 38 provided in the IP telephone application 34b.

In P8 the intermediary application 34a receives the read file transmitted from the IP telephone application 14b of the PC 10 and relayed via the IP telephone application 34b and analyzes the received file. If the intermediary application 34a determines that the read file is instructing the reading of configuration data for the device 40, the intermediary application 34a transmits a command to the device 40 to acquire configuration data.

In P9 the device 40 reads configuration data from the RAM-side configuration data storage area 43a in the RAM 43 or from the configuration data storage area 42b in the NVRAM 42 based on the command received from the intermediary application 34a and transmits this configuration data to the intermediary application 34a.

In P10 the intermediary application 34a generates a response file including the configuration data received from the device 40 and in P11 issues a transmission command to the IP telephone application 34b to transmit this response file. Upon receiving the transmission command, the IP telephone application 34b transmits a file transmission request to the IP telephone application 14b of the PC 10.

In P12 the intermediary application 14a of the PC 10 determines whether to transmit a response authorizing file transmission. If the intermediary application 14a determines to transmit a file transmission authorization response to the PC 30, the intermediary application 14a transmits the response command to the IP telephone application 14b, and the IP telephone application 14b transmits a response signal authorizing file transmission to the IP telephone application 34b of the PC 30.

After issuing the response command authorizing file transmission, in P13 the intermediary application 14a waits for the IP telephone application 14b to receive a response file from the IP telephone application 34b and to relay this response file.

In the meantime, the intermediary application 34a receives the response authorizing file transmission from the IP telephone application 14b and in P14 activates the transmission function of the IP telephone application 34b to transmit the response file. Specifically, a file transmission unit 39 provided in the IP telephone application 34b shown in FIG. 2 is controlled to transmit the response file to the file reception unit 18 in the IP telephone application 14b.

In P15 the intermediary application 14a receives the response file transferred from the IP telephone application 34b of the PC 30 and relayed by the IP telephone application 14b and analyzes the configuration data included in the file.

In P16 the intermediary application 14a generates a write file including instructions for writing new configuration data with modifications or additions to the existing configuration data and for reading the updated configuration data. Then, as shown in FIG. 4(b), in P17 the intermediary application 14a issues a transmission command to the IP telephone application 14b to transmit this write file. Upon receiving the transmission command, the IP telephone application 14b transmits a file transmission request to the IP telephone application 34b of the PC 30.

As in P5, the intermediary application 34a of the PC 30 determines in P18 whether to transmit a file transmission authorization response authorizing file transmission and transmits a response command to the IP telephone application 34b authorizing file transmission upon reaching a positive determination, and the IP telephone application 34b transmits a response signal authorizing file transmission to the IP telephone application 14b. In P19 the intermediary application 34a waits until the IP telephone application 34b receives the write file from the IP telephone application 14b and relays this file.

In the meantime, the IP telephone application 14b receives the response from the IP telephone application 34b authorizing file transmission and in P20 activates the transmission function for transmitting the write file.

In P21 the intermediary application 34a receives the write file transmitted from the IP telephone application 14b and relayed from the IP telephone application 34b and analyzes this file.

When the intermediary application 34a determines by analyzing the received file that the file is a write file including instructions to write configuration data in the device 40, the intermediary application 34a transmits an update command for updating configuration data together with the new configuration data to the device 40.

In P22 the device 40 executes a process to update the configuration data in the configuration data storage area 42b in the NVRAM 42 to the new data received from the intermediary application 34a, to copy the new data thus written in the configuration data storage area 42b into the RAM-side configuration data storage area 43a in the RAM 43, to read the configuration data thus newly stored in the configuration data storage area 42b or the RAM-side configuration data storage area 43a (updated configuration data), and to subsequently transmit the updated configuration data to the intermediary application 34a.

In P23 the intermediary application 34a generates a response file including the updated configuration data received from the device 40 and in P24 issues a transmission command to the IP telephone application 34b to transmit this response file. Upon receiving the transmission command, the IP telephone application 34b transmits a file transmission request to the IP telephone application 14b of the PC 10.

As in P12, the intermediary application 14a of the PC 10 determines in P25 whether to transmit a file transmission authorization response authorizing file transmission. Upon determining to transmit a response to the PC 30 authorizing file transmission, the intermediary application 14a transmits a response command to the IP telephone application 14b, and the IP telephone application 14b transmits a response signal authorizing file transmission to the IP telephone application 34b. In P26 the intermediary application 14a waits for a response file to be transmitted from the IP telephone application 34b and relayed from the IP telephone application 14b.

In the meantime, in P27 the IP telephone application 14b receives the file transmission authorization response and activates the transmission function to transmit the response file.

In P28 the intermediary application 14a receives the response file transmitted from the IP telephone application 34b and relayed by the IP telephone application 14b and verifies the updated configuration data included in the response file. The process ends after the intermediary application 34a confirms that configuration data in the device 40 has been updated successfully.

Figure 5:
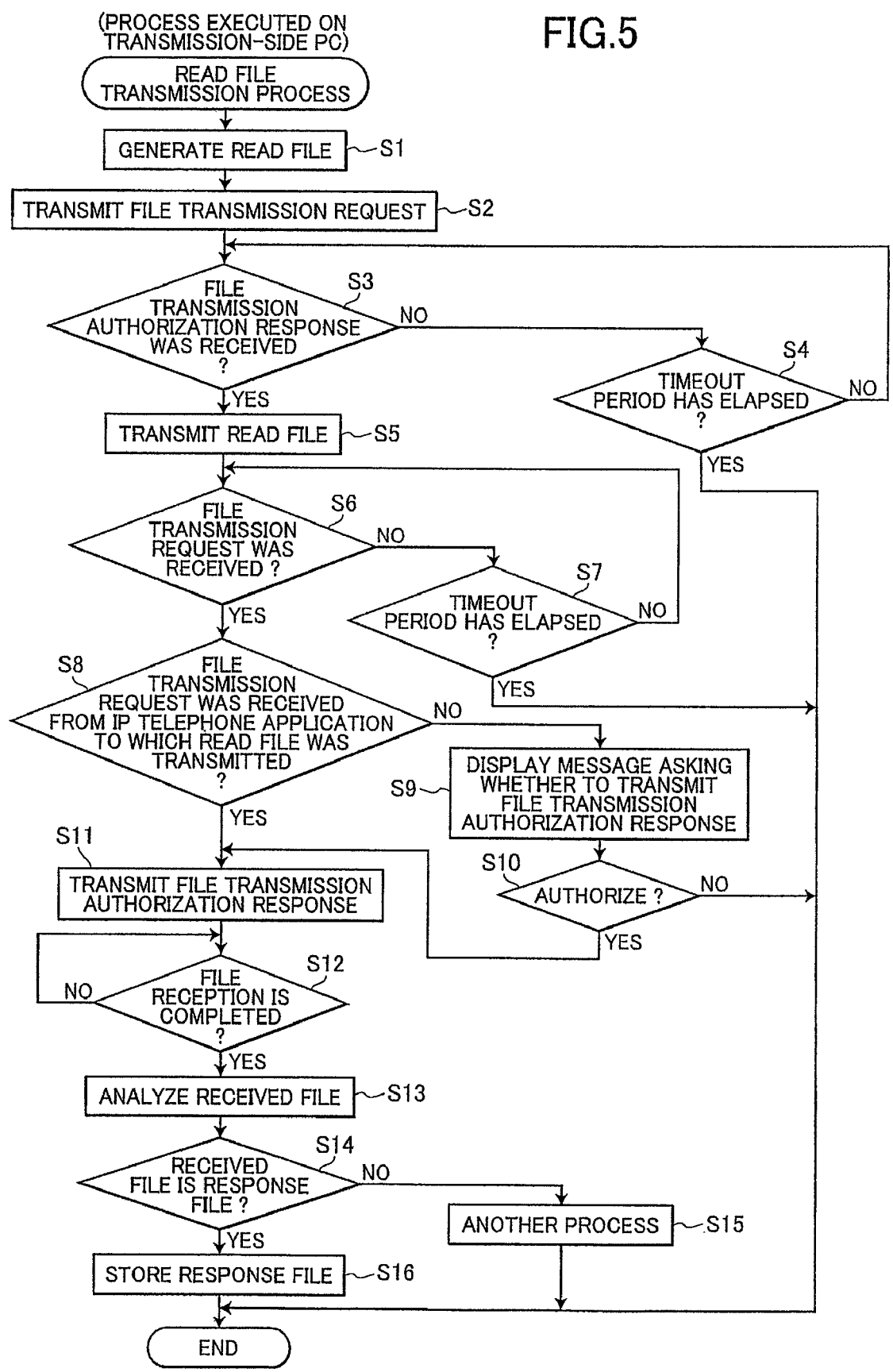
FIG. 5 is a flowchart illustrating steps in a read file transmission process executed on a transmission-side PC.
Figure 7A:
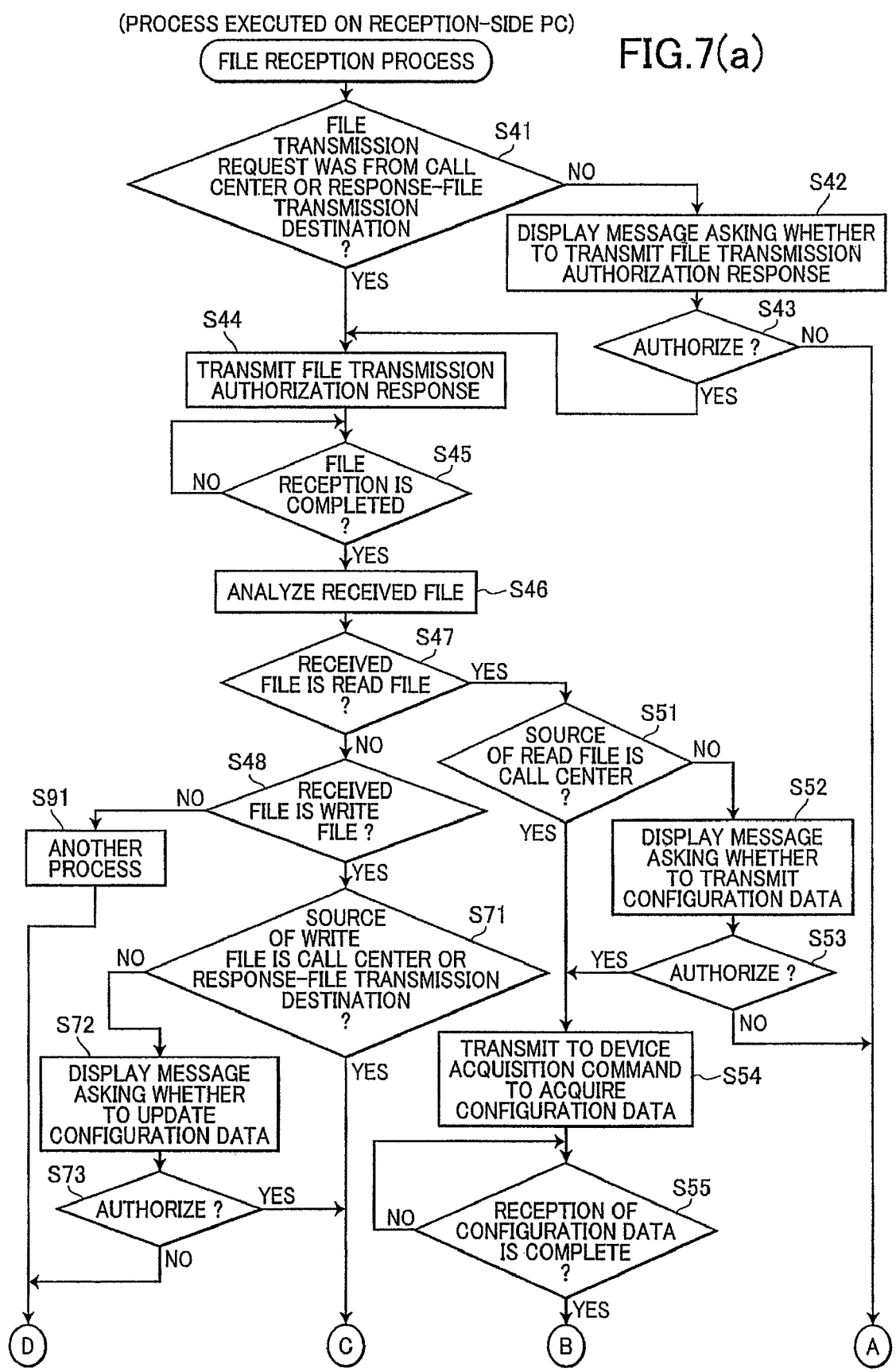
FIG. 7(a) is a part of a flowchart illustrating steps in a file reception process executed on a reception-side PC.
Figure 7B:
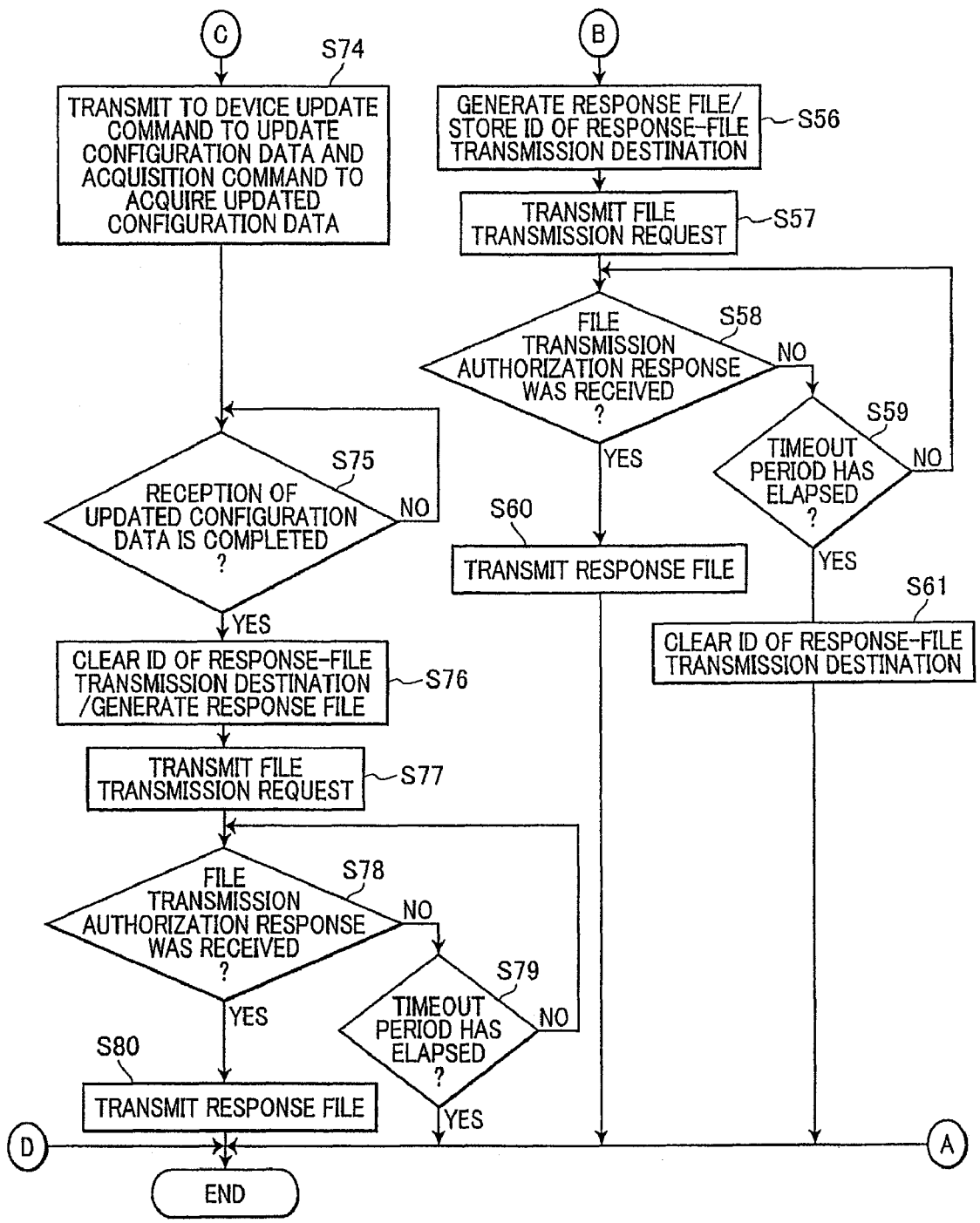
FIG. 7(b) is a remaining part of the flowchart illustrating steps in the file reception process.
Figure 8C:
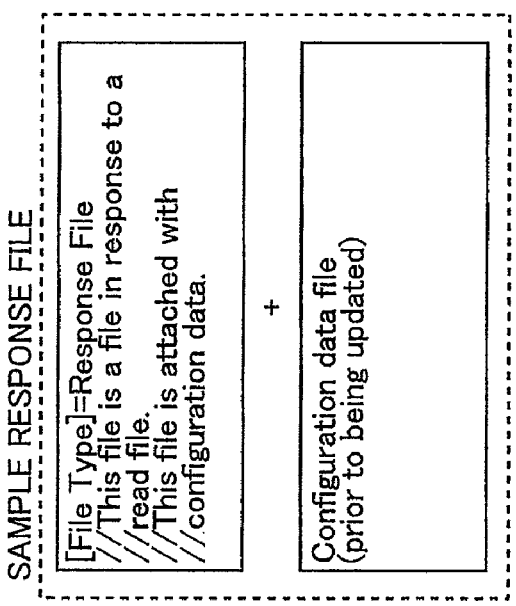
FIG. 8(c) shows a sample response file responding to the read file.
Figure 8D:
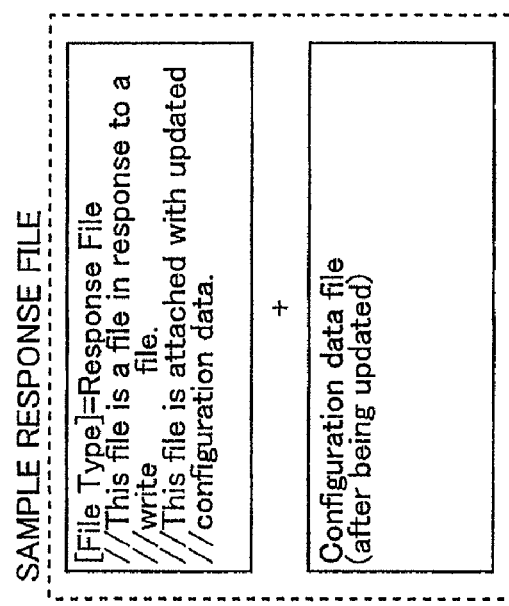
FIG. 8(d) shows a sample response file responding to the write file.
Figure 8A:
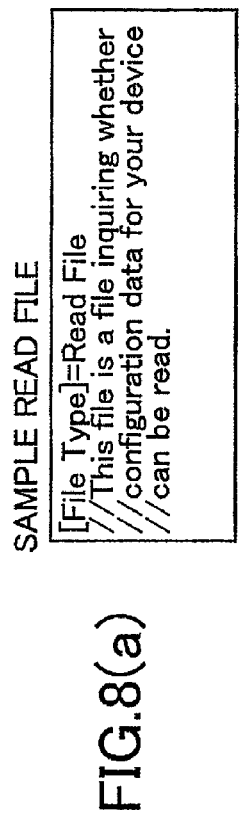
FIG. 8(a) shows a sample read file.
Figure 8B:
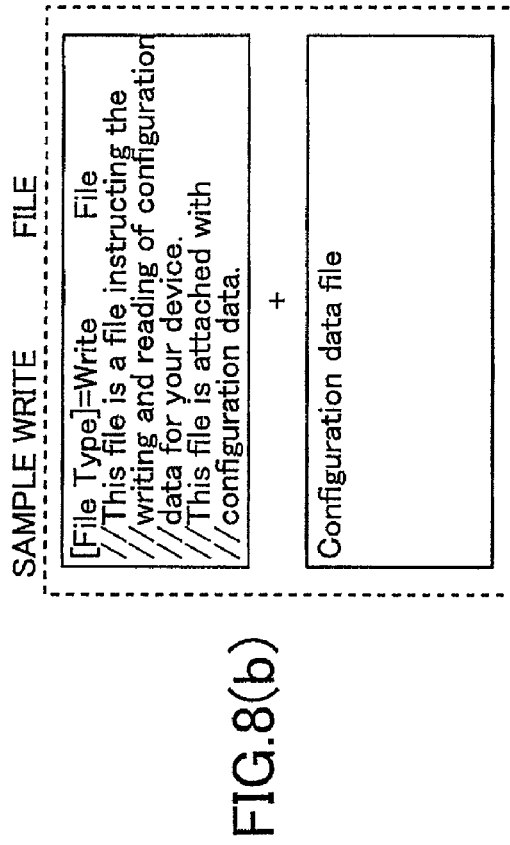
FIG. 8(b) shows a sample write file.

Next, the processes executed on the PCs 10 and 30 will be described in greater detail with reference to FIGS. 5 through 8(d). FIG. 5 is a flowchart illustrating steps in the read file transmission process executed on the transmission-side PC according to the intermediary application and the IP telephone application. FIG. 6 is a flowchart illustrating steps in the write file transmission process executed on the transmission-side PC according to the intermediary application and the IP telephone application. FIGS. 7(a) and 7(b) show a flowchart illustrating steps in the file reception process executed on the reception-side PC according to the intermediary application and the IP telephone application. FIG. 8(a) shows a sample read file. FIG. 8(b) shows a sample write file. FIG. 8(c) shows a sample response file. FIG. 8(d) shows another sample response file In the following description given with reference to FIGS. 5 through 8(d), the PC 10 serves as the transmission-side PC and the PC 30 as the reception-side PC.

The read file transmission process shown in FIG. 5 is executed by the PC 10 when transmitting a read file to an external terminal instructing the external terminal to read configuration data for the device in the external terminal. For example, the call center PC 10 executes this process when instructed to implement a function for reading configuration data on an external device.

In S1 at the beginning of the read file transmission process, the PC 10 generates a read file in a text file format.

As described above, the read file includes instructions for reading configuration data on the device 40 connected to the external PC 30. FIG. 8(a) shows a sample read file.

As shown in FIG. 8(a), the read file has "Read File" listed as the file type in the first line. In addition to the file type, the read file includes the text data "This file is a file inquiring whether configuration data for your device can be read." The intermediary application 34a of the PC 30 can recognize a read command to read configuration data for the device 40 by reading this text data (at least the text data for the file type). The PC 30 may also notify the user of the received file by displaying this text data.

In S2 the PC 10 transmits a file transmission request to the IP telephone application 34b of the PC 30 requesting permission to transmit the read file. In S3 the PC 10 determines whether a response authorizing file transmission was received from the IP telephone application 34b to which the request was transmitted.

If a file transmission authorization response has not been received in S3 (S3: NO), in S4 the PC 10 determines whether a timeout period has elapsed. If the timeout period has not elapsed (S4: NO), the PC 10 returns to S3 and again determines whether a file transmission authorization response was received.

If the PC 10 determines in S4 that the timeout period has elapsed (S4: YES), then it is likely that either the connection with the IP telephone application 34b was interrupted or the user of the IP telephone application 34b refused file transmission. Accordingly, the PC 10 ends the current process.

However, if a file transmission authorization response was received (S3: YES), in S5 the PC 10 transmits the read file generated in S1 to the IP telephone application 34b.

Subsequently, the PC 10 repeatedly performs the processes in S6 and S7 to determine whether a file transmission request was received from the IP telephone application 34b in order to wait for a response file specified by the read file transmitted in S5.

More specifically, in S6 the CPU 11 determines whether a file transmission request was received. If a file transmission request was not received (S6: NO), in S7 the PC 10 determines whether a timeout period has elapsed. If the timeout period has elapsed (S7: YES), the PC 10 ends the current process.

The PC 10 ends the process when determining in S7 that the timeout period has elapsed since a file transmission request to transmit the response file has not been received from the IP telephone application 34b during this time period despite transmitting the read file to the IP telephone application 34b. Accordingly, it is likely that the user of the PC 30 cancelled transmission of the response file or the connection itself was interrupted.

However, if the PC 10 determines in S6 that a file transmission request was received (S6: YES), in S8 the PC 10 confirms that the source of the file transmission request is the IP telephone application 34b to which the read file was transmitted. If the file transmission request was received from this IP telephone application 34b (S8: YES), the PC 10 advances to S11.

However, if the PC 10 determines that the file transmission request was not received from the IP telephone application 34b to which the read file was transmitted (S8: NO), in S9 the PC 10 displays a message asking the user whether to transmit a file transmission authorization response. In S10 the PC 10 determines whether the user has given authorization to transmit the file transmission authorization response.

Here, the process may be configured so that the PC 10 simply ends the current process without displaying a message to the user when determining in S8 that the source of the file transmission request is not the IP telephone application 34b to which the read file was transmitted (S8: NO).

The PC 10 ends the current process if the user does not give authorization to transmit the file transmission authorization response (S10: NO) and advances to S11 if the user gives authorization (S10: YES).

In S11 the PC 10 transmits a file transmission authorization response to the IP telephone application 34b or the other IP telephone application.

Subsequently, in S12 the PC 10 confirms whether the file is received from the IP telephone application to which the file transmission authorization response was transmitted and waits while file reception is not complete (S12: NO).

Once reception is complete (S12: YES), in S13 the PC 10 analyzes the received file and in S14 determines whether the received file is a response file to the read file transmitted in S5.

The PC 10 performs the determination in S14 by referencing text data included in the response file (see the example in FIG. 8(c)) generated by the PC 30 on the reception side, as will be described later.

If the PC 10 determines that the received file is not a response file (S14: NO), in S15 the PC 10 executes another process corresponding to the received file. However, if the received file is a response file (S14: YES), in S16 the PC 10 stores the response file in a prescribed area of the RAM 13 or HDD 14, and subsequently ends the current process.

Here, after the PC 10 executes the other process corresponding to the received file in S15, the PC 10 may be configured to return to S6 to await reception of the file transmission request in order to receive the response file.

Thereafter, the call center operator using the PC 10 references the response file stored in S16 to analyze configuration data for the device 40 connected to the external PC 30. The PC 10 stores new configuration data in a prescribed area of the RAM 13 or HDD 14 for resolving problematic points in the configuration data for the device 40.

After creating the new configuration data, the call center operator using the PC 10 implements a function for transmitting the new configuration data to the external PC 30 and for updating the configuration data in the device 40 to the new data. When activating this function, the PC 10 executes the write file transmission process shown in FIG. 6.

In S21 at the beginning of the write file transmission process shown in FIG. 6, the PC 10 generates a write file in a text file format. The write file includes new configuration data created by the call center operator using the PC 10, and instruction data instructing the PC 30 to update the configuration data of the device 40 connected to the external PC 30. FIG. 8(b) shows a sample write file.

As shown in FIG. 8(b), the write file includes the file type data, and configuration data. The file type data is "Write File" located in the first line. In addition to the file type data, the write file includes the text data "This file is a file instructing the writing and reading of configuration data for your device. This file is attached with configuration data."

As with the read file described above, the intermediary application 34a of the PC 30 can recognize an instruction for writing configuration data in the device 40 and for reading the updated configuration data and can recognize that configuration data for updating the device 40 has been attached by reading the text data in the write file (at least the file type text data).

Since the process performed in S22-S36 is identical to that in S2-S16 of the read file transmission process described above, this process will only be briefly described.

In S22 the PC 10 transmits a file transmission request to transmit a write file to the external IP telephone application 34b and in S23 determines whether a file transmission authorization response was received from the IP telephone application 34b to which the request was transmitted. In S24 the PC 10 determines whether a timeout period has elapsed.

If a file transmission authorization response is received (S23: YES), in S25 the PC 10 transmits the write file to the IP telephone application 34b, in S26 determines whether a file transmission request was received, and in S27 determines whether a timeout period has elapsed.

If the PC 10 determines in S27 that the timeout period has elapsed (S27: YES), the PC 10 ends the current process. If the PC 10 determines in S26 that a file transmission request was received (S26: YES), in S28 the PC 10 determines whether the source of the file transmission request was the IP telephone application 34b to which the write file was transmitted. If the file transmission request was received from this IP telephone application 34b (S28: YES), in S31 the PC 10 transmits a file transmission authorization response.

However, if the PC 10 determines that the source of the file transmission request is not the IP telephone application 34b to which the write file was transmitted (S28: NO), in S29 the PC 10 displays a message prompting the user whether to transmit a file transmission authorization response. In S30 the PC 10 determines whether the user authorized transmission of the file transmission authorization response.

The PC 10 ends the current process if transmission was not authorized in S30 (S30: NO) and in S31 transmits the file transmission authorization response if the user authorized transmission (S30: YES).

In S32 the PC 10 determines whether a file has been received from the IP telephone application to which the file transmission authorization response was transmitted. If reception is complete (S32: YES), in S33 the PC 10 analyzes the received file.

In S34 the PC 10 determines whether the received file is a response file to the write file (see the example in FIG. 8(d)). If the received file is not a response file to the write file (S34: NO), in S35 the PC 10 executes another process based on the received file.

After executing the other process in response to the received file in S35, the PC 10 may be configured to return to S26 and to wait for a file transmission request in order to receive a response file.

However, if the received file is a response file to the write file (S34: YES), then in S36 the PC 10 stores the response file in a prescribed area of the RAM 13 or HDD 14 and in S37 verifies the updated configuration data included in the response file.

The PC 10 performs the process in S37 by comparing the new configuration data that was newly created and that was included in the write file with the updated configuration data that was included in the response file saved in S36 to verify that the configuration data for the external device 40 was properly updated.

In S38 the PC 10 stores the results of the verification in S37 in association with identification data of the PC 30 that performed the update, in a prescribed area of the RAM 13 and the verification results storage area 14f of the HDD 14, and subsequently ends the current process. The verification results stored in S38 include data indicating the verification results, and the updated configuration data, which was included in the response file received in S32, and will be used by being displayed on the output unit 10d such as a display when updating configuration data for the device 40 again or when analyzing data difficult to set by the user of the device 40.

Next, the process executed on the reception-side PC 30 will be described.

The PC 30 executes the file reception process shown in FIGS. 7(a) and 7(b) when receiving a file transmission request from an external IP telephone application.

It is noted that as described later, when the intermediary application 34a generates a response file responding to a read file, the intermediary application 34a stores, in the RAM 33, identification data of a destination to which the response file is to be transmitted (response-file transmission destination).

In S41 at the beginning of the file reception process in FIG. 7, the PC 30 determines whether the file transmission request was received from the call center (the PC 10 in this example) or the response-file transmission destination. The PC 30 can determine whether the file transmission request was received from the response-file transmission destination by referring to the RAM 33. If the file transmission request was received from the call center or the response-file transmission destination (S41: YES), the PC 30 advances to S44.

However, if the file transmission request was received from an external PC other than the call center or the response-file transmission destination (S41: NO), in S42 the PC 30 displays a message prompting the user to indicate whether to transmit a file transmission authorization response. In S43 the PC 30 confirms whether the user has authorized transmission of this file transmission authorization response.

The PC 30 ends the current process if the user did not authorize transmission of the file transmission authorization response (S43: NO) and advances to S44 if the user authorized transmission of the file transmission authorization response (S43: YES).

In S44 the PC 30 transmits the file transmission authorization response to the IP telephone application 14b or the external IP telephone application from which the file transmission request was received. Subsequently, the PC 30 waits until a file has been received (S45: NO).

When a file has been completely received from the IP telephone application to which the file transmission authorization response was transmitted (S45: YES), in S46 the PC 30 analyzes the received file and determines in S47 whether the received file is a read file and in S48 whether the received file is a write file.

The PC 30 advances to S51 if the received file is a read file (S47: YES) and advances to S71 if the received file is a write file (S47: NO, S48: YES). If the received file is neither a read file nor a write file (S47: NO), S48: NO), in S91 the PC 30 executes another process based on the received file and subsequently ends the current process.

After executing the other process in response to the received file in S91, the PC 30 may be configured to return to S41 and wait to receive a file transmission request in order to receive the read file or write file.

Next, the process of S51-S61 performed when a read file is received will be described.

In S51 the PC 30 confirms that the source of the read file is the call center. The PC 30 advances to S54 if the read file was transmitted from the call center (S51: YES) and in S52 displays a message prompting the user whether to transmit configuration data if the source of the read file is not the call center (S51: NO).

In S52 the PC 30 prompts the user to determine whether or not to transmit configuration data, by displaying the message to the user on the output unit 30d (display), when the read file was received from a source other than the call center, in order to improve security.

In S53 the PC 30 determines whether the user authorized transmission of configuration data. The PC 30 ends the current process if the user did not authorize transmission (S53: NO) and advances to S54 if the user authorized transmission (S53: YES).

In S54 the PC 30 transmits an acquisition command to the device 40 to acquire configuration data from the RAM-side configuration data storage area 43a in the RAM 43 of the device 40 or from the configuration data storage area 42b in the NVRAM 42 of the device 40, and in S55 waits while reception of configuration data from the device 40 is not complete (S55: NO). Once reception of configuration data from the device 40 is complete (S55: YES), in S56 the PC 30 generates a response file including the acquired configuration data (FIG. 7(b)). It is noted that the configuration data is stored in the RAM-side configuration data storage area 43a and the configuration data storage area 42b in a format suitable for being stored in the RAM-side configuration data storage area 43a and the configuration data storage area 42b. Accordingly, in S56, the intermediary application 34a converts the configuration data from the format suitable for being stored in the RAM-side configuration data storage area 43a and the configuration data storage area 42b, into the text file format, and generates the response file to include the text file formatted configuration data. In S56, the PC 30 further stores, in the RAM 33, identification data of the destination (response-file transmission destination), to which the response file is to be transmitted. It is noted that the response-file transmission destination is the same as the source of the read file.

As shown in FIG. 8(c), the response file generated in S56 is in a text file format, and includes data indicating the file type and the configuration data in the text file format. Data indicating the file type is "Response File" provided in the top line. In addition to the file type data, the response file includes the text data "This file is a file in response to a read file. This file is attached with configuration data." The intermediary application 14a can recognize that a response file to the read file was received and that configuration data for the device 40 is attached by reading this text data (at least the file type). The PC 10 can also display the text data read from the response file to notify the user about the received file.

In S57 the PC 30 transmits a file transmission request to the IP telephone application 14b or other IP telephone application from which the read file was received in order to transmit the response file. In S58 the PC 30 determines whether a file transmission authorization response was received.

If a file transmission authorization response was not received (S58: NO), in S59 the PC 30 determines whether a timeout period has elapsed. If the timeout period has elapsed (S59: YES), the PC 30 cannot transmit the response file. So, in S61, the PC 30 clears, from the RAM 33, the identification data of the response-file transmission destination which has been stored in S56, and ends the current process. However, if the timeout period has not elapsed (S59: NO), the PC 30 returns to S58 and again determines whether a file transmission authorization response was received.

When the PC 30 determines that a file transmission authorization response was received (S58: YES), in S60 the PC 30 transmits the response file and subsequently ends the current process.

Next, the process in S71-S80 performed when a write file is received will be described.

Steps in this process similar to those in the process beginning from S51 will be described only briefly.

In S71 the PC 30 confirms whether the source of the write file is the call center or the response-file transmission destination.

As shown in FIG. 7(b), the PC 30 advances to S74 if the call center or the response-file transmission destination transmitted the write file (S71: YES) and in S72 displays a message prompting the user whether to transmit configuration data if the source of the file is not the call center or the response-file transmission destination (S71: NO).

Next, the PC 30 ends the current process if the user does not authorize update of the configuration data (S73: NO) and advances to S74 if the user authorized update of the configuration data (S73: YES).

In S74 the PC 30 (intermediary application 34*a*) converts the new configuration data in the write file from the text file format into the format suitable for being stored in the configuration data storage area 42*b*, and transmits, to the device 40, an update command for updating the configuration data in the configuration data storage area 42*b* in the NVRAM 42 based on the suitably-formatted new configuration data and transmits an acquisition command to the device 40 to acquire the updated configuration data.

In response, the device 40 performs a process to update the configuration data in the configuration data storage area 42*b* with the new configuration data, to copy the resultant, updated configuration data obtained in the configuration data storage area 42*b* into the RAM-side configuration data storage area 43*a*, and to transmit the resultant, updated configuration data obtained in the RAM-side configuration data storage area 43*a* or the configuration data storage area 42*b* to the PC 30.

The PC 30 continues to wait while the updated configuration data has not been completely received from the device 40 (S75: NO). Once reception of the updated configuration data is completed (S75: YES), in S76 the PC 30 clears the identification information of the response-file transmission destination from the RAM 33, converts the updated configuration data from the format suitable for the configuration data storage area 42*b* or the RAM-side configuration data storage area 43*a* into the text file format, and generates a response file including the text file formatted, updated configuration data.

As shown in FIG. 8(d), the response file generated in S76 is in a text file format, and includes data indicating the file type and the configuration data. Data indicating the file type is "Response File" located in the first line. In addition to this file type data, the response file includes the text data saying "This file is a file in response to a write file. This file is attached with updated configuration data." The intermediary application 14*a* can recognize that a response file to the write file was received and that the updated configuration data for the device 40 is attached by reading the text data (at least the file type). Further, the intermediary application 14*a* can also notify the user that the file was received by displaying the text data read from the response file.

In S77 the PC 30 transmits a file transmission request to the IP telephone application 14*b* or other IP telephone application from which the write file was received in order to transmit the response file. In S78 the PC 30 determines whether a file transmission authorization response was received and in S79 determines whether a timeout period has elapsed.

If the timeout period has elapsed (S79: YES), the PC 30 ends the current process. However, if a file transmission authorization response was received (S78: YES), in S80 the PC 30 transmits the response file and subsequently ends the current process.

In the IP telephone system 1 according to the present embodiment, the reception-side PC (the PC 30 in this example) acquires configuration data for the device 40 upon receiving a read file and transmits a response file including the configuration data to the source of the read file transmission. After receiving a write file including new configuration data from the transmission source of the read file, the reception-side PC can update the configuration data in the device 40 based on the new configuration data. Hence, the reception-side PC can overwrite configuration data with the new configuration data transmitted from the transmission-side PC, even when the user of the device 40 does not understand the details of settings for the device 40 or how to modify them. Accordingly, the IP telephone system 1 prevents such problems as an inability to implement the various functions possessed by the device 40 caused by not being able to modify settings for the device 40, thereby improving user-friendliness.

The configuration data in the device in each IP telephone terminal can be acquired and updated not only by the call center but also any other external IP telephone terminals if the user of the IP telephone terminal accepts the transmittance of the read file and the write file generated at the external IP telephone terminals.

If the PC 30 receives a file transmission request from the call center (the PC 10), the reception-side PC 30 transmits a file transmission authorization response to the call center without asking the user for authorization. This method relieves the user of performing complex operations when the contact is known and stability is assured, thereby improving user-friendliness.

If the PC 30 receives a file transmission request for the write file from the destination, to which the PC 30 transmitted the response file responding to the read file (response-file transmission destination), the reception-side PC 30 transmits a file transmission authorization response to the response-file transmission destination without asking the user for authorization. This method relieves the user of performing complex operations when the contact is known and stability is assured, thereby improving user-friendliness.

Since the contact list for the call center is stored in the call center data storage areas 22*a*, 44*a*, and 64*a* of the respective devices 20, 40, and 60 during the manufacturing stage, the IP telephone system 1 reduces the operation load on the user of each device for searching this contact list.

Further, the call center can easily acquire configuration data for external PCs and devices from response files received in response to read files and, hence, can check the configuration data and issue instructions to the users of the external PCs and devices to modify this configuration data.

The call center also receives response files in response to write files and can verify updated configuration data on the external PCs and devices, thereby confirming that the configuration data on these external PCs and devices was updated successfully. If the configuration data was not updated successfully, the call center can notify the users of these devices and repeat the transmission of configuration data.

Converting configuration data to a text file format makes data transfers easier and facilitates the operator of the external IP telephone terminal to view and edit the configuration data in a text editor or the like.

<First Modification of the First Embodiment>

Next, a first modification of the first embodiment will be described with reference to FIGS. 9(a) to 10(b).

Figure 9A:
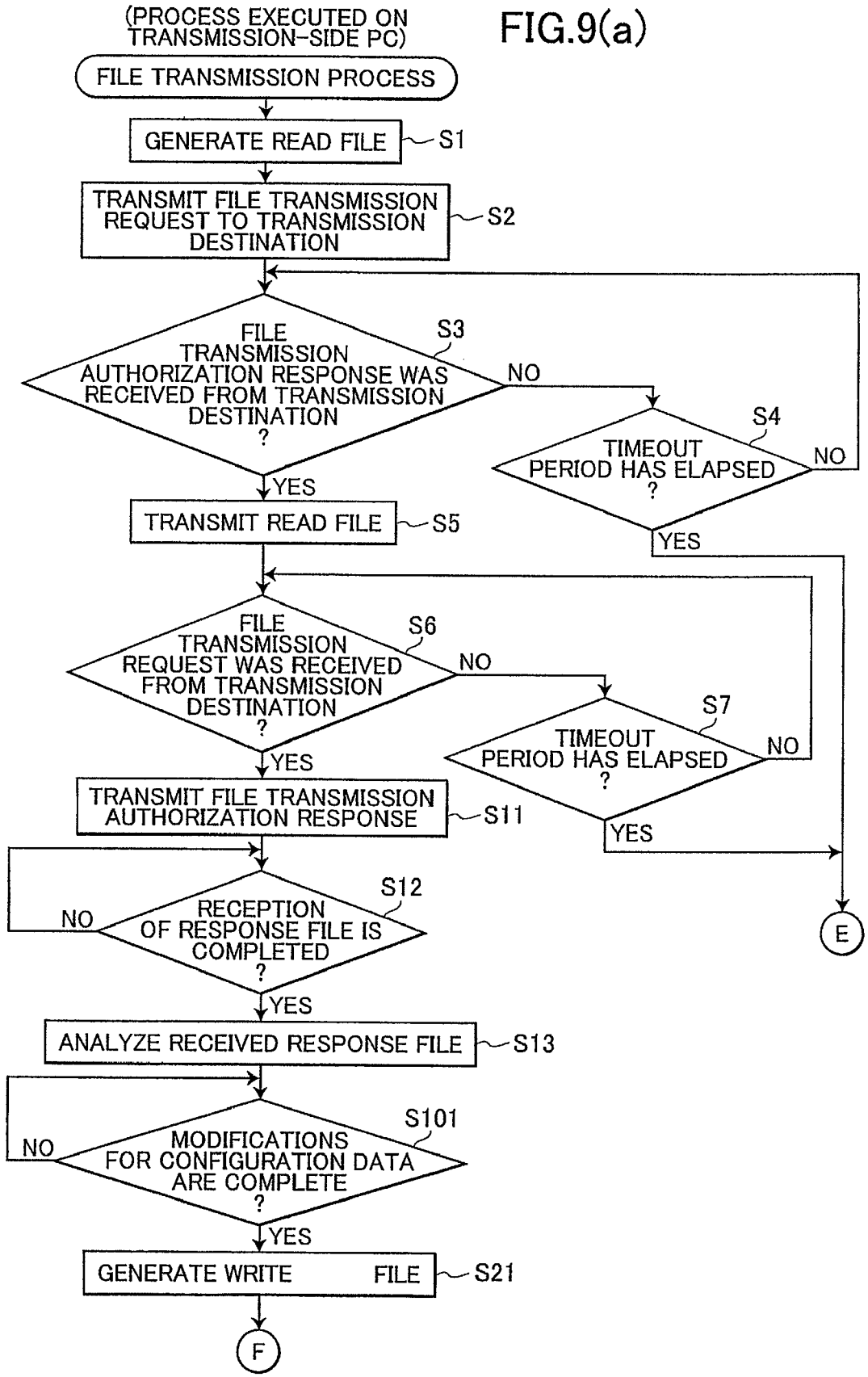
FIG. 9(a) is a part of a flowchart illustrating steps in a file transmission process executed on a transmission-side PC according to a first modification of the first embodiment.
Figure 9B:
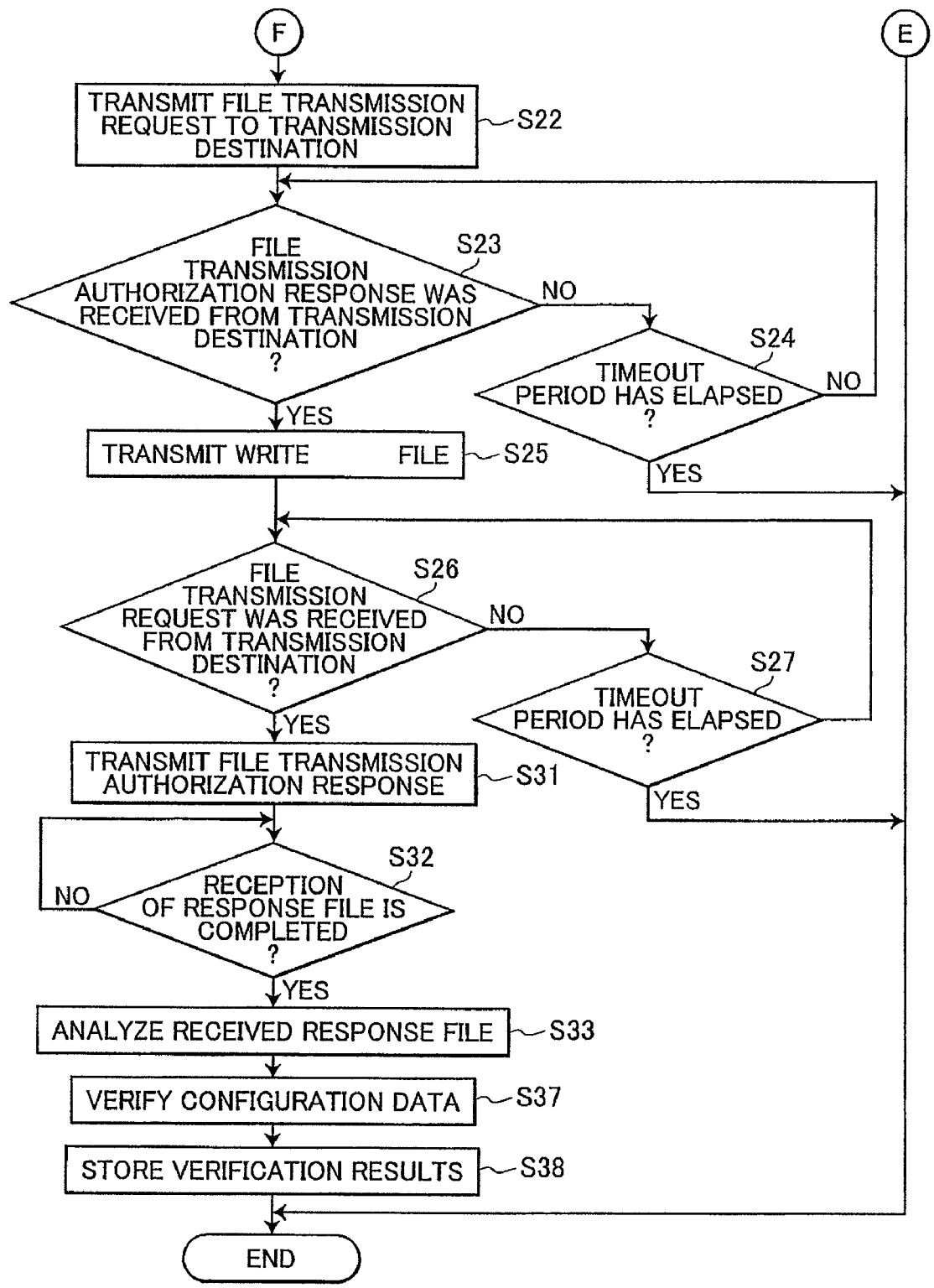
FIG. 9(b) is a remaining part of the flowchart illustrating steps in the file transmission process according to the first modification of the first embodiment.

FIGS. 9(a) and 9(b) show a flowchart illustrating steps in a file transmission process executed on a transmission-side PC according to the first modification of the first embodiment.

Figure 10A:
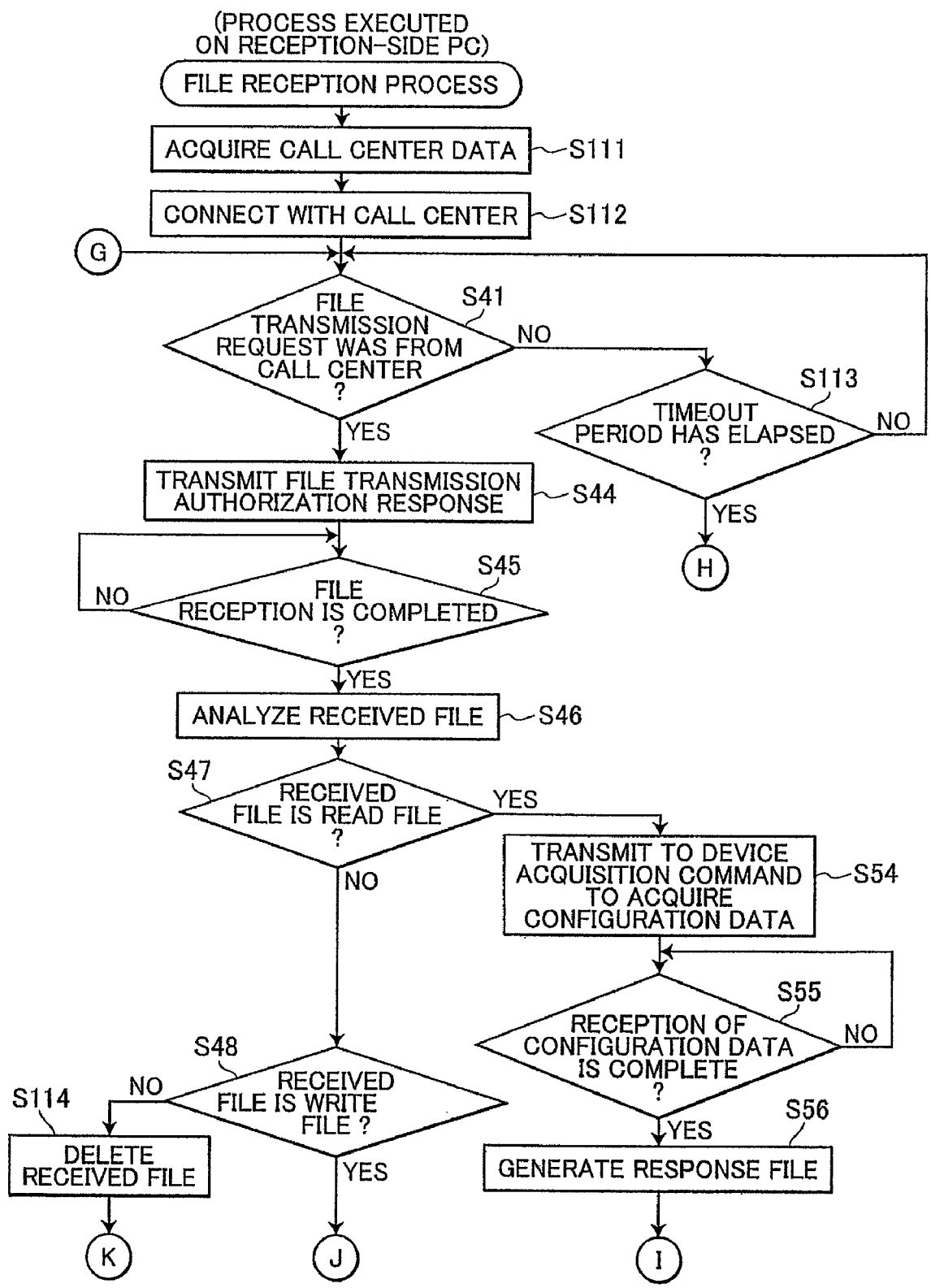
FIG. 10(a) is a part of a flowchart illustrating steps in a file reception process executed on a reception-side PC according to the first modification of the first embodiment.
Figure 10B:
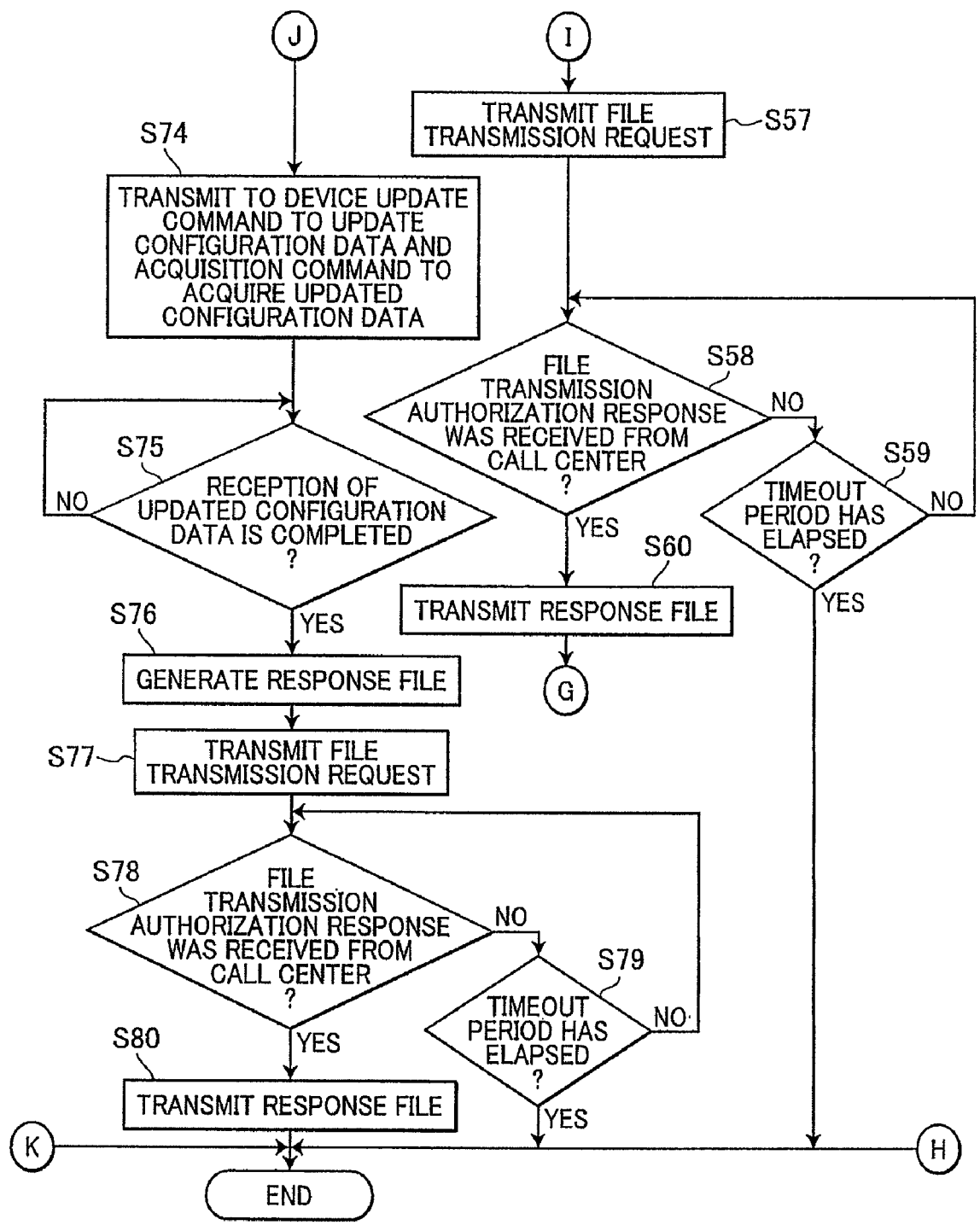
FIG. 10(b) is a remaining part of the flowchart illustrating steps in the file reception process according to the first modification of the first embodiment.

FIGS. 10(a) and 10(b) show a flowchart illustrating steps in a file reception process executed on a reception-side PC according to the present modification.

The file transmission and file reception processes according to the present modification are performed when the PC 10 serving as the call center is connected to the external PC 30 so that the network between the PCs 10 and 30 is occupied by the connection between the PCs 10 and 30 and access to the PCs 10 and 30 from other terminals are not- permitted. While the PCs 10 and 30 are thus being connected with each other, the read file and the write file are transmitted in succession from the PC 10 side to the PC 30 side. Steps similar to or identical to those described in the first embodiment are designated with the same step numbers to avoid duplicating description.

When the PC 10 starts the file transmission process as shown in FIG. 9(a), the PC 10 first generates a read file in S1, transmits a file transmission request to a read file transmission destination in S2, and, upon receiving a file transmission authorization response from the transmission destination (S3: YES), transmits the read file in S5. When the PC 10 receives a file transmission request from the transmission destination (S6: YES), in S11 the PC 10 transmits a file transmission authorization response to the transmission destination, without prompting the user for authorization.

This is because the PC 10 is in a mode for not accepting reception while executing the present file transmission process, even when a file transmission request or file transmission authorization response is received from an IP telephone application other than the transmission destination for the read file. In this mode of the present modification, the PC 10 accepts only the reception of signals from the IP telephone application at the read-file transmission destination and is not required to prompt the user of the PC 10 for file transmission authorization.

Once reception of the response file is complete after transmitting the file transmission authorization response (S12: YES), in S13 the PC 10 analyzes the response file and in S101 prompts the user of the PC 10 to confirm that modifications for the configuration data are complete. The user checks the configuration data displayed on the PC 10 and, after making any necessary modifications, selects the "OK" button with a cursor. At this time, the PC 10 determines that modification data (new configuration data) is complete.

After determining that modification data (new configuration data) is complete (S101: YES), the PC 10 generates a write file in S21. Then, as shown in FIG. 9(b), the PC 10 transmits a file transmission request to the destination in S22, and, upon receiving a file transmission authorization response from the destination (S23: YES), transmits the write file in S25. Upon receiving a file transmission request from the destination (S26: YES), in S31 the PC 10 transmits a file transmission authorization response to the destination without prompting the user for authorization.

When reception of a response file is complete after transmitting the file transmission authorization response to the destination (S32: YES), the PC 10 analyzes the response file in S33, verifies the updated configuration data in S37, and stores verification results in S38. Subsequently, the PC 10 ends the current process.

In S111 at the beginning of the file reception process shown in FIG. 10(a), the PC 30 acquires identification data for the call center's IP telephone application (call center data) from the call center data storage area 34d. In S112 the PC 30 transmits a call request to the call center based on the identification data acquired in S111 and connects to the IP telephone application 14b of the call center responding to this request to conduct voice communications.

In this way, the operator of the PC 30 can request a configuration update while in the middle of a conversation, such as while relating the status of the PC 30 or device 40 to the call center operator. The PC 30 may also be configured to connect to the call center in chat mode rather than as a telephone call.

After the PC 30 connects to the call center in S112, the call center (the PC 10) begins executing the file transmission process of FIG. 9(a) described above.

Hence, in S41 the PC 30 determines whether a file transmission request has been received from the call center and, if not (S41: NO), confirms in S113 whether a timeout period has elapsed.

The determination in S113 is performed to deny file transmission requests from sources other than the call center. If the PC 30 has not received a file transmission request from the call center within the prescribed timeout period (S113: YES), the PC 30 ends the current process. It is noted that the PC 30 is connected to the call center and is in a mode for checking only signals transmitted from the call center and for not prompting the user of the PC 30 whether to respond to a file transmission request.

On the other hand, if a file transmission request is received from the call center (S41: YES), the PC 30 transmits a file transmission authorization response in S44 and, when file reception is complete (S45: YES), analyzes the received file in S46 to determine whether the received file is a read file or a write file (S47, S48).

If the PC 30 determines that the received file is neither a read file nor a write file (S47: NO, S48: NO), indicating that the PC 30 received a file not pertinent to the present file reception process, in S114 the PC 30 deletes the received file and ends the current process.

On the other hand, if the received file is a read file (S47: YES), then, without prompting the user for confirmation, the PC 30 transmits an acquisition command to the device 40 in S54 for acquiring configuration data, generates a response file in S56 after configuration data has been acquired (S55: YES). Then, as shown in FIG. 10(b), the PC 30 transmits a file transmission request to the call center in S57, and, upon receiving a file transmission authorization response from the call center (S58: YES), transmits the response file in S60. Subsequently, the process returns to S41 to wait for a write file coming from the call center.

It is noted that in S58, the PC 30 determines whether a file transmission authorization response has been received from the call center and, if not (S58: NO), confirms in S59 whether a timeout period has elapsed. The determination in S59 is performed to deny file transmission authorization responses from sources other than the call center. If the PC 30 has not received a file transmission authorization response from the call center within the prescribed timeout period (S59: YES), the PC 30 ends the current process.

Further, as shown in FIG. 10(*a*), when a write file is received (S41: YES, S44, S45:YES, S46, S47:NO, S48: YES), then, without prompting the user for confirmation, the PC 30 transmits commands to the device 40 in S74 to update configuration data and to acquire the updated configuration data as shown in FIG. 10(*b*). The PC 30 then generates a response file in S76 after the updated configuration data has been acquired (S75: YES), transmits a file transmission request to the call center in S77, and, upon receiving a file transmission authorization response from the call center (S78:YES), transmits the response file in S80. Subsequently, the PC 30 ends the current process.

It is noted that in S78, the PC 30 determines whether a file transmission authorization response has been received from the call center and, if not (S78: NO), confirms in S79 whether a timeout period has elapsed. The determination in S79 is performed to deny file transmission authorization responses from sources other than the call center. If the PC 30 has not received a file transmission authorization response from the call center within the prescribed timeout period (S79: YES), the PC 30 ends the current process.

In the first modification of the first embodiment described above, the IP telephone system is configured to enable a connection only between the PC 10, serving as the call center, and the PC 30, serving as the external PC, and to not check file transmission requests or files transmitted from other PCs or devices. Further, when the PC 30 receives a file other than a read file or a write file from the call center, the PC 30 deletes the received file rather than executing a separate process related to the received file. Accordingly, since the PC 30 only executes processes related to changes in configuration data in the device 40, the system simplifies operations, reducing the operational load on the user of the PC 30 or device 40.

In the first embodiment, the reception-side PC 30 transmits a file transmission authorization response without querying the user upon receiving a file transmission request from the call center (the PC 10) or from the destination to which the PC 30 has transmitted a response file responding to a read file. In the first modification of the first embodiment, the reception-side PC 30 transmits a file transmission authorization response without querying the user upon receiving a file transmission request from the call center (the PC 10). However, the PC 30 may be provided with a function for setting a "respond automatically" mode to automatically transmit a file transmission authorization response and, thus, may transmit a file transmission authorization response without querying the user when the "respond automatically" mode is set and a file transmission request is received from an external IP telephone application. With this construction, the reception-side PC can automatically transmit a file transmission authorization response, even when a file transmission request is received from an external telephone application other than the call center or the response file destination, thereby relieving the user of performing complex operations and thereby improving user-friendliness.

In addition, in the first embodiment, the process of S41 in FIG. 7(*a*), which the reception-side PC 30 executes, may be modified to determine whether the user of the PC 30 is currently being engaged in an IP telephone call or a chat session with a remote IP telephone terminal and to determine whether a file transmission request is received from the remote IP telephone terminal, with which the user of the PC 30 is now performing the IP telephone call or the chat session. When the file transmission request is received from the remote IP telephone terminal, with which the user of the PC 30 is currently engaged in the IP telephone call or the chat session, the judgment process of S41 is made positive, and the reception-side PC transmits the file transmission authorization response in S44, without querying the user. This configuration relieves the user of performing complex operations when the contact is thus known and stability is assured, thereby improving user-friendliness.

Similarly, the process of S8 and S28 in FIGS. 5 and 6, which the transmission-side PC 10 executes, may be modified to determine whether the user of the PC 10 is currently being engaged in an IP telephone call or a chat session with a remote IP telephone terminal and to determine whether a file transmission request is received from the remote IP telephone terminal, with which the user of the PC 10 is now performing the IP telephone call or the chat session. When the file transmission request is received from the remote IP telephone terminal, with which the user of the PC 10 is currently engaged in the IP telephone call or the chat session, the judgment processes of S8 and S28 are made positive, and the transmission-side PC transmits the file transmission authorization response in S11 and S31 without querying the user. This configuration relieves the user of performing complex operations when the contact is thus known and stability is assured, thereby improving user-friendliness.

Conversely, the PC 30 may be configured to query the user in response to all file transmission requests, regardless of whether the request was received from the call center or the destination of the response file responding to the read file. This configuration enhances security.

In the above description, the call center is configured to transmit read files and write files, but the call center may be modified to read configuration data for an external PC or device according to a read file and not to transmit write files. With this configuration, the call center operator can modify configuration data of an external device by instructing a user of the external device to update configuration data through an IP telephone call.

Further, the write file may be modified only to instruct the writing of configuration data, but not to instruct the reading of the updated configuration data.

In the above description, the character strings describing the functions of the PC and devices (PC data and device data), are added to the profile, but the character strings may be added to the display name instead. In this example, the display name will become "pc_yamada_3devices_d1_Br_mfc_Ink_ 330_Print Scan Card FAX Color Ink_d2_Br_dcp_Ink_ 420_Print Scan Card Color Ink_d3_Br_mfc_laser_ 480_Print Scan FAX Mono Laser_Pc=Win_XP, OCR, Read-Write", and the profile will become "Device1=Br_mfc_Ink_ 330,Device2=Br_dcp_Ink_420,Device3=Br_mf c_laser_ 480." By adding the character strings indicating functions of the PC and devices to the display name of the IP telephone terminal, a user of an external IP telephone terminal can be easily made aware of the functions available on the IP telephone terminal in question.

In the above description, the PC 10 serving as the call center acquires and updates configuration data for the device 40. However, it should be apparent that the PC 10 may also be configured to acquire and update configuration data for the PC 30. In other words, the call center may be configured to update configuration data for any device provided in an IP telephone terminal, on which an IP telephone application is installed.

In the above description, read files, write files, and response files are exchanged between the IP telephone terminals in order to update configuration data for a device. However, it is also possible to exchange files for the purposes of processing image data, (adding decorative elements and the like or improving image quality, for example), correcting documents such as tests, and the like. In such a case, processes for the files are executed in S15 (FIG. 5), S35 (FIG. 6) or S91 (FIG. 7(a)). More specifically, if a received file is a function-execution file that includes an instruction to execute a desired function of the device (printing, for example) and data desired to be subjected to the function of the device 20 (image data, for example), the intermediary application controls the device to execute the function of the device specified by the function-execution file by using the data to be subjected to the function and by using the configuration data stored in the RAM-side configuration data storage area 23a. If the function-execution file includes various settings, by which the desired function is desired to be executed, the intermediary application changes the configuration data in the RAM-side configuration data storage area 23a into the desired settings, while retaining the configuration data in the configuration data storage area 22b to be unchanged.

In the above description, the PC 10 serving as the call center can select a function available on the PC 30 or device 40 and can issue an instruction to implement this function. However, the PC 10 may be configured to select a function available on the PC 30 or device 40, acquire only configuration data related to the selected function, and update only configuration data related to the selected function.

<Second Modification of First Embodiment>

Next, a second modification of the first embodiment of the present invention will be described while referring to FIG. 1(b) and FIG. 11(a)-FIG. 15(b).

According to the present modification, the IP telephone system 1 of the first embodiment is modified so that an IP telephone terminal can confirm whether or not a desired function (printing data or storing data in RAM or on an HDD, for example) can be implemented on a destination IP telephone terminal and transmit, to the destination IP telephone terminal, a file for implementing the desired function on the destination IP telephone terminal when it is confirmed that the desired function can be implemented on the destination IP telephone terminal.

According to the present modification, the HDD 14 is further provided with a transmission job history storage area 14g and a reception job history storage area 14h, as indicated in parenthesis in FIG. 1(b).

The transmission job history storage area 14g is for storing execution results obtained at a remote IP telephone terminal (reception-side IP telephone terminal) when the PC 10, serving as a transmission-side IP telephone terminal, instructs the remote IP telephone terminal to implement a desired function, such as printing data or storing data in RAM or on the HDD.

The reception job history storage area 14h is for storing execution results obtained at the present IP telephone terminal 2 (reception-side) when the present IP telephone terminal 2 executes a function instructed by a remote IP telephone terminal (transmission-side).

The PCs 30 and 50 have the same structures as the PC 10, and therefore a description of these PCs will not be repeated.

In the present modification, the intermediary application 14a not only handles the read files, response files, and write files as described above, but also operates to acquire a file to be processed (which will be referred to as "process file") from the device 20 and to generate a job file including an instruction to execute a process on an external PC or device based on the process file acquired from the device 20.

The intermediary application 14a further operates to analyze a job execution feasibility file received from an external PC to determine whether the function specified by the job file can be executed at the external PC or device, and to analyze a job execution results file and stores the results as to whether the external PC or device has executed this function based on the process file.

The intermediary application 14a can further operate to analyze a job file when the job file is received from an external IP telephone terminal, to determine whether the function specified by the job file can be executed at the PC 10 or device 20 in the present IP telephone terminal 2, and to generate a job execution feasibility file including the determination results.

The intermediary application 14a can further control the PC 10 or device 20 in the present IP telephone terminal 2 to execute a process on the PC 10 or device 20 in the present IP telephone terminal based on a process file and based on instructions included in the job file when the process file is received from the external IP telephone terminal.

Now assume that the user of the PC 10 would like to use the scanner 24 of the device 20 at the terminal 2 to scan an image, and to use the device 40 connected to the PC 30 at the IP telephone terminal 4 to print out the scanned image. For example, the user at the PC 10 serving as the call center may desire to scan an image related to the device 40, for example, and to control the device 40 to print out the scanned image.

In such a case, after acquiring image data generated by the scanner 24 of the device 20, the intermediary application 14a generates a process file based on the image data. Next, the intermediary application 14a references registration data stored in the registration data storage area 15 of the IP telephone application 14b, selects an external IP telephone application 34b to connect to, and establishes a connection between the IP telephone application 14b and the IP telephone application 34b. Subsequently, the intermediary application 14a transmits a job file, instructing a printer 45 in the device 40 to print the image data acquired by the scanner 24, to the file reception unit 38 of the PC 30 via the file transmission unit 19.

The intermediary application 34a of the PC 30 analyzes the job file received via the file reception unit 38 of the IP telephone application 34b, determines whether the printer 45 can print the image data acquired by the scanner 24, and transmits a job execution feasibility file including the determination results to the file reception unit 18 of the PC 10 via the file transmission unit 39.

In the meantime, the intermediary application 14a of the PC 10 receives and analyzes the job execution feasibility file. If it is known that the printer 45 of the device 40 can print the image, the intermediary application 14a transmits the process file to the file reception unit 38 of the PC 30 via the file reception unit 18.

After receiving the process file, the intermediary application 34a of the PC 30 issues a print command to the printer 45 and transfers print data thereto. Upon receiving the print command and print data, the device 40 performs a printing operation based on the received print data.

This process will be described later in greater detail.

It is noted that in this modification, while the IP telephone application in one IP telephone terminal (first IP telephone terminal) is engaged in voice communications or a chat session with the IP telephone application in another IP telephone terminal (second IP telephone terminal), the intermediary application in the first IP telephone terminal stores identification data for the second IP telephone terminal, and the intermediary application in the second IP telephone terminal stores identification data for the first IP telephone terminal.

The identification data for the IP telephone terminal may be data identifying the IP telephone application provided in the IP telephone terminal, and may be in the form of an address of the IP telephone application. However, the identification data for the IP telephone terminal may be identification data identifying the intermediary application provided in the IP telephone terminal, or identification data identifying the PC or device provided in the IP telephone terminal.

When the intermediary application issues a command to transmit a job file, the intermediary application operates to store identification data for a job file destination, to which the intermediary application transmits the job file.

According to the present modification, the user can set a response setting in the intermediary application to "respond automatically" or "prompt before responding." When the user has selected "respond automatically," the intermediary application always transmits a file transmission authorization response when the IP telephone application receives a file transmission request without prompting the user for instructions. However, if the user has selected the "prompt before responding" setting, the intermediary application prompts the user to indicate whether to transmit a file transmission authorization response when the IP telephone application receives a file transmission request and transmits the file transmission authorization response only when the user authorizes the transmission. However, the intermediary application transmits a file transmission authorization response without prompting the user for instructions even when the user has selected the "prompt before responding" setting if identification data for the source of the request attached to the file transmission request is stored in the intermediary application. In other words, the intermediary application transmits the file transmission authorization response without prompting the user when the request was received from a contact with which the corresponding IP telephone application is engaged in voice communications or a chat session or when the file transmission request was received from the transmission destination of a job file.

First, a sequence of steps in the process performed on the IP telephone system 1 according to the present modification will be described with reference to FIG. 11(*a*), FIG. 11(*b*), and FIG. 11(*c*). It is noted that according to the present modification, the IP telephone system 1 can perform not only the process described above with reference to FIGS. 4(*a*) and 4(*b*) but also the process of FIG. 11(*a*)-FIG. 11(*c*) described below.

In this example, the PC 10 in the IP telephone terminal 2 issues an instruction to the IP telephone terminal 4 to execute a function possessed by the device 40 in the IP telephone terminal 4, and the IP telephone terminal 4 executes the function. Accordingly, the PC 10 serves as a transmission-side PC and the PC 30 as a reception-side PC. However, any PC, and not just the PC 10 serving as the call center, can issue an instruction to any other IP telephone terminal to execute a function.

In Q1 of FIG. 11(*a*), the intermediary application 14*a* of the PC 10 performs a process to acquire a contact list based on registration data for other IP telephone terminals recorded in the registration data storage area 15. Through this process, the intermediary application 14*a* acquires a contact list for user devices registered in the IP telephone application 14*b*.

In Q2 the intermediary application 14*a* selects the display name for the PC 30 from the contact list acquired in Q1 as the destination reception terminal.

Subsequently, the intermediary application 14*a* issues a command to the device 20 to acquire a process file. In Q3 the device 20 acquires the process file indicated by the acquisition command (scanned data, for example) and transfers this process file to the PC 10.

In Q4 the intermediary application 14*a* generates a job file, including: instruction data indicating a process to be executed on the device 40 based on the process file acquired from the device 20; and type data indicating the type of the process file acquired from the device 20 (the data format in the file, data size, printing resolution, and number of pages to be printed, for example).

In Q5 the intermediary application 14*a* issues a transmission command to the IP telephone application 14*b* to transmit the generated job file. The intermediary application 14*a* also stores identification data for the destination of the job file in the RAM 13.

Upon receiving the transmission command for transmitting the job file from the intermediary application 14*a*, the IP telephone application 14*b* transmits a file transmission request to the IP telephone application 34*b* of the PC 30. The format (txt or jpg, for example), size (123,456 bytes, for example), and identification data of the source of the file transmission request (address of the IP telephone application 14*b*, in this example) are also included in the file transmission request.

In Q6 the intermediary application 34*a* of the PC 30 determines whether to transmit a file transmission authorization response authorizing the file transmission.

More specifically, if the user of the intermediary application 34*a* has selected the "prompt before responding" setting, the intermediary application 34*a* displays a message indicating the file transmission request and the identification data for the source of the request included in the request on the display unit 30*d* and prompts the user to indicate whether or not to authorize file transmission. The intermediary application 34*a* determines to transmit a file transmission authorization response only when the user indicates authorization through operations on an input unit.

The intermediary application 34*a* determines to transmit the file transmission authorization response without prompting the user when identification data for the source of the request is currently stored in the RAM 33 by the intermediary application 34*a*, even when the user has selected the "prompt before responding" setting. Accordingly, if the file transmission request was received from another user or device with which the user is currently engaged in voice communications or chatting, since the identification data for the source of the file transmission request is currently stored in the RAM 33 by the intermediary application 34*a*, the intermediary application 34*a* determines to transmit a file transmission authorization response without prompting the user for instructions, even when the user has selected the "prompt before responding" setting. The intermediary application 34*a* also determines to transmit a file transmission authorization response without prompting the user when the user has selected the "respond automatically" setting.

After determining to transmit a file transmission authorization response to the PC 10, the intermediary application 34*a* transmits a response command to the IP telephone application 34*b* instructing the IP telephone application 34*b* to transmit the file transmission authorization response, and the IP telephone application 34*b* transmits a signal authorizing file transmission to the IP telephone application 14*b* of the PC 10.

After issuing the response command authorizing file transmission, in Q7 the intermediary application 34*a* waits for the IP telephone application 34*b* to receive the job file from the IP telephone application 14*b* and to relay this job file.

In the meantime, after receiving the file transmission authorization response from the IP telephone application 34*b*, in Q8 the IP telephone application 14*b* executes a job file transmission function. That is, the file transmission unit 19 provided in the IP telephone application 14b is instructed to transmit a job file to the file reception unit 38 provided in the IP telephone application 34b.

In Q9 the intermediary application 34a receives the job file from the IP telephone application 34b, analyzes the job file, and generates a job execution feasibility file based on the results of this analysis.

It is noted that if the results of this analysis indicate that the device 40 connected to the PC 30 can execute the function indicated in the job file, the intermediary application 34a is brought into a standby mode to wait for implementation of a job indicated by the job file until the intermediary application 34a receives the process file for the subject job.

In Q10 the intermediary application 34a issues a transmission command to the IP telephone application 34b to transmit the job execution feasibility file generated in Q9, and the IP telephone application 34b transmits a file transmission request to the IP telephone application 14b of the PC 10.

In Q11 the intermediary application 14a determines whether to transmit a file transmission authorization response authorizing file transmission. As in Q6 performed by the intermediary application 34a, the intermediary application 14a determines whether to respond automatically or to prompt the user for instructions based on the user setting.

The intermediary application 14a determines to transmit the file transmission authorization response without prompting the user when identification data for the source of the request is currently stored in the RAM 13 by the intermediary application 14a, even when the user has selected the "prompt before responding" setting. If the file transmission request was received from the job file destination, into which the job file was transmitted, then the identification data for the job file destination is currently stored in the RAM 13. Similarly, if the file transmission request was received from another user or device with which the user is currently engaged in voice communications or chatting, the identification data for the source of the file transmission request is currently stored in the RAM 13. Accordingly, in such cases, the intermediary application 14a determines to transmit a file transmission authorization response without prompting the user for instructions, even when the user has selected the "prompt before responding" setting.

When determining to transmit a file transmission authorization response to the PC 30, the intermediary application 14a transmits a response command to the IP telephone application 14b for issuing a file transmission authorization response. The IP telephone application 14b then transmits a signal authorizing file transmission to the IP telephone application 34b of the PC 30.

After transmitting a command to issue a file transmission authorization response, in Q12 the intermediary application 14a waits until the IP telephone application 14b receives the job execution feasibility file from the IP telephone application 34b and relays this file.

In the meantime, as shown in FIG. 11(b), upon receiving the file transmission authorization response from the IP telephone application 14b, in Q13 the IP telephone application 34b executes a transmission function to transmit the job execution feasibility file. Specifically, the file transmission unit 39 provided in the IP telephone application 34b is instructed to transmit the job execution feasibility file to the file reception unit 18 provided in the IP telephone application 14b.

In Q14 the intermediary application 14a receives and analyzes the job execution feasibility file from the IP telephone application 14b after the IP telephone application 14b receives the file from the IP telephone application 34b.

If the results of this analysis indicate that the device 40 connected to the PC 30 can execute the function indicated in the job file, in Q15 the intermediary application 14a issues a transmission command to the IP telephone application 14b to transmit the process file. After receiving the command to transmit the process file, the IP telephone application 14b transmits a file transmission request to the IP telephone application 34b of the PC 30.

In Q16 the intermediary application 34a determines whether to transmit a file transmission authorization response authorizing this file transmission. When the intermediary application 34a determines to transmit a response to the PC 10 authorizing file transmission, in Q17 the intermediary application 34a transmits a command to the IP telephone application 34b to issue a file transmission authorization response and subsequently waits until the process file is relayed from the IP telephone application 34b.

As in Q6, the intermediary application 34a determines in Q16 whether to issue a response automatically or to prompt the user for instructions based on the user setting. The intermediary application 34a determines to transmit a file transmission authorization response without prompting the user when identification data for the source of the request is currently stored on the RAM 33 by the intermediary application 34a, even when the user has selected the "prompt before responding" setting.

In the meantime, when receiving a file transmission authorization response from the IP telephone application 34b, in Q18 the IP telephone application 14b executes a transmission function for transmitting the process file.

After the IP telephone application 34b receives the process file from the IP telephone application 14b and relays the file, in Q19 the intermediary application 34a instructs the device 40 to execute a process based on this process file and based on the instruction data included in the job file. If the job file includes data of settings different from the configuration data stored in the RAM-side configuration data storage area 43a, the intermediary application 34a instructs the device 40 to change the configuration data in the RAM-side configuration data storage area 43a into the settings included in the job file.

In Q20 the device 40 executes a process according to the process file in response to the execution instruction received from the intermediary application 34a and transfers the results of the process to the intermediary application 34a.

In Q21 the intermediary application 34a generates a job execution results file based on the execution results received from the device 40.

Figure 11A:
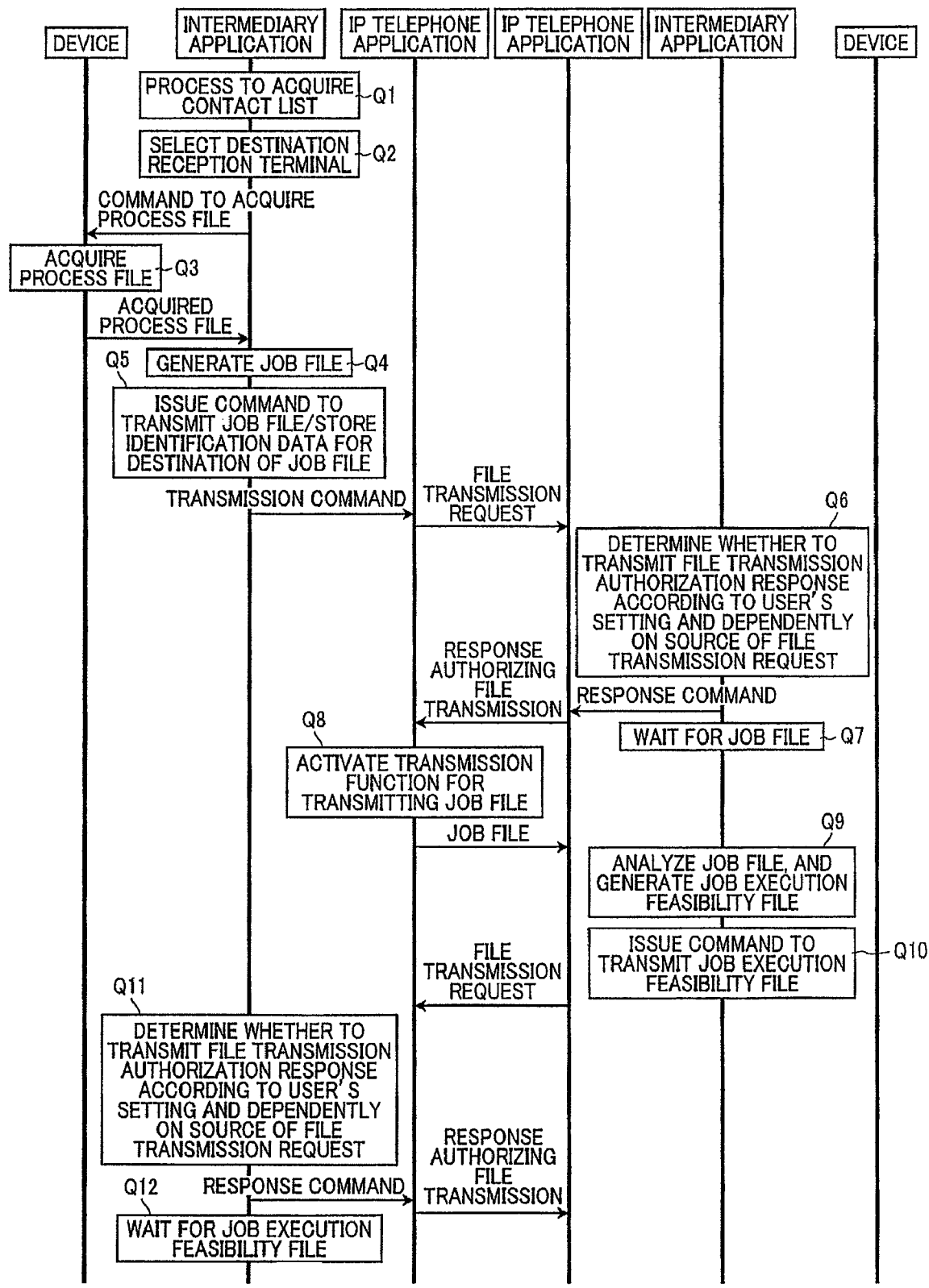
FIG. 11(a) is a first part of a sequence chart showing steps of a process implemented by programs running on IP telephone terminals of an IP telephone system according to a second modification of the first embodiment.
Figure 11C:
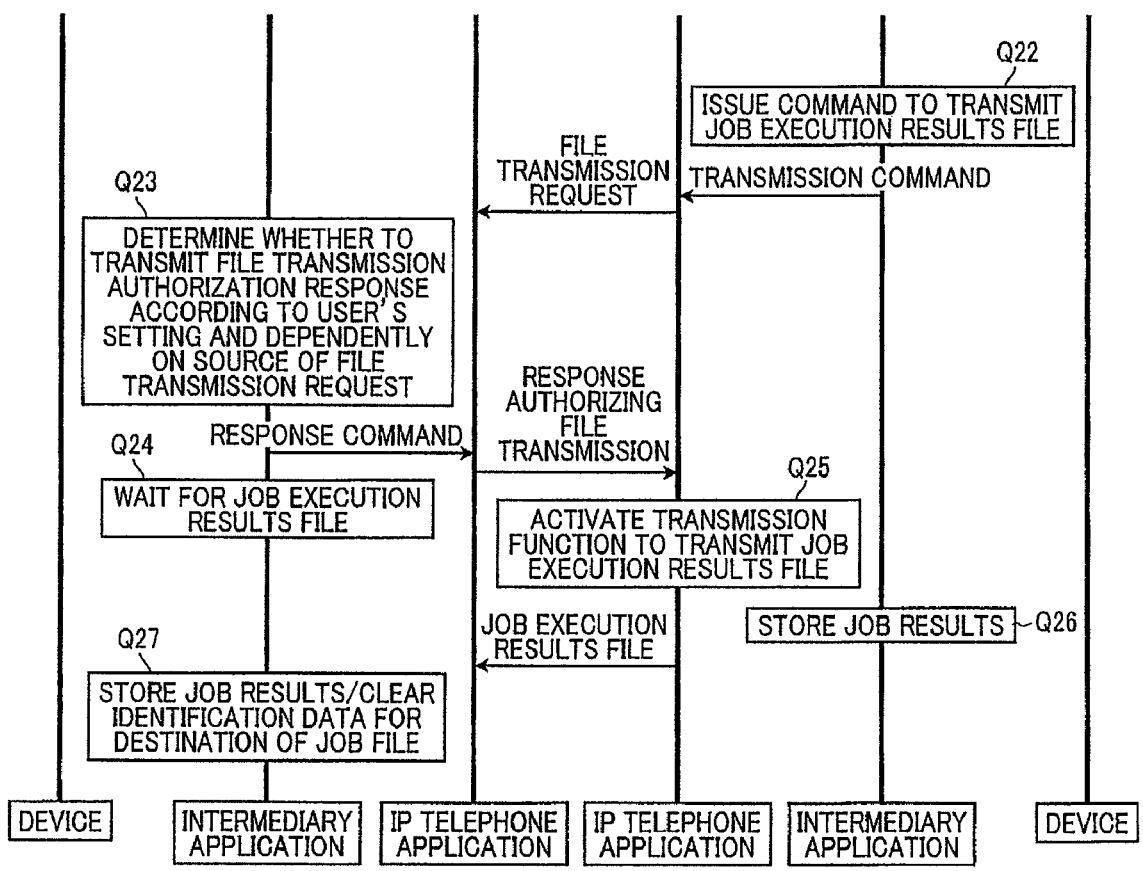
FIG. 11(c) is a third part of the sequence chart showing steps of the process according to the second modification of the first embodiment.

Then, as shown in FIG. 11(c), in Q22 the intermediary application 34a issues a transmission command to the IP telephone application 34b to transmit this job execution results file. After receiving the transmission command, the IP telephone application 34b transmits a file transmission request to the IP telephone application 14b.

In Q23 the intermediary application 14a of the PC 10 determines whether to transmit a file transmission authorization response authorizing this file transmission. When the intermediary application 14a determines to transmit a file transmission authorization response to the PC 30, the intermediary application 14a transfers a response command to the IP telephone application 14b instructing the IP telephone application 14b to issue a file transmission authorization response, and subsequently waits for the job execution results file to be relayed from the IP telephone application 14b in Q24. As described in Q11, the intermediary application 14a determines in Q23 whether to respond automatically or to prompt the user for instructions based on the user setting for responding and whether the identification data for the source of the request is currently stored in the RAM 13 by the intermediary application 14*a*.

In the meantime, after receiving a file transmission authorization response from the IP telephone application 14*b*, in Q25 the IP telephone application 34*b* executes a transmission function for transmitting the job execution results file. In Q26 the intermediary application 34*a* stores the process results for the job in the reception job history storage area 34*h* of the HDD 34.

After the IP telephone application 14*b* receives the job execution results file from the IP telephone application 34*b* and relays this file to the intermediary application 14*a*, in Q27 the intermediary application 14*a* stores process results included in the job execution results file in the transmission job history storage area 14*g*. In Q27 the intermediary application 14*a* also clears identification data for the destination of the job file stored in Q5. Subsequently, the series of processes ends.

Figure 12A:
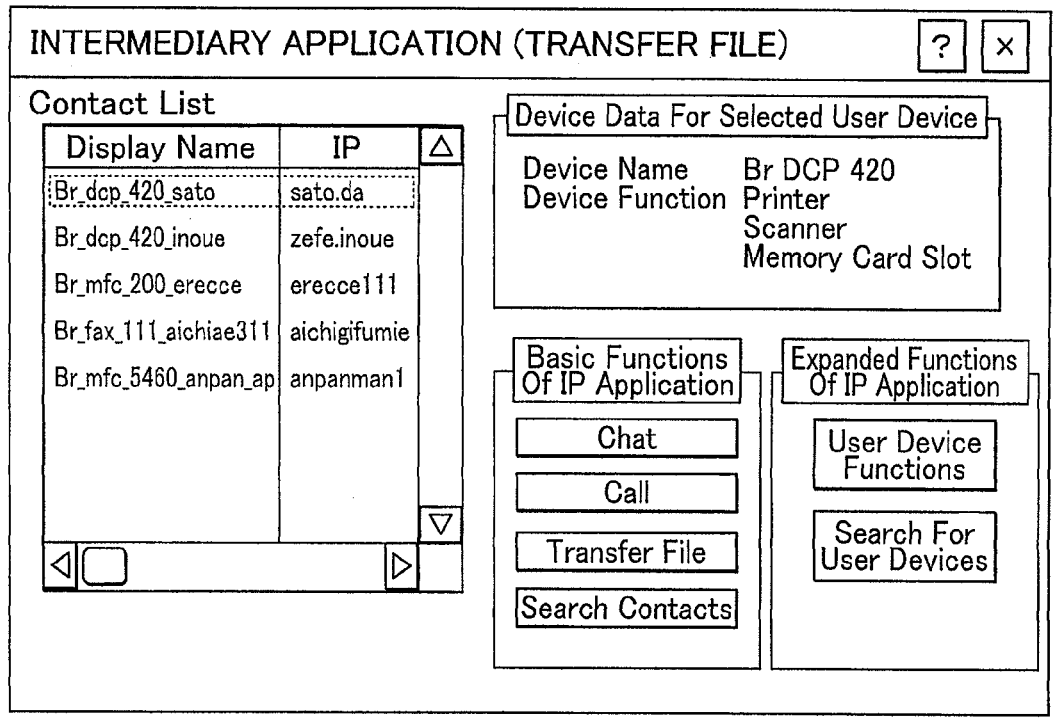
FIG. 12(a) shows a sample display screen for a user interface provided by the intermediary application on a transmission-side PC in the second modification of the first embodiment.
Figure 12B:
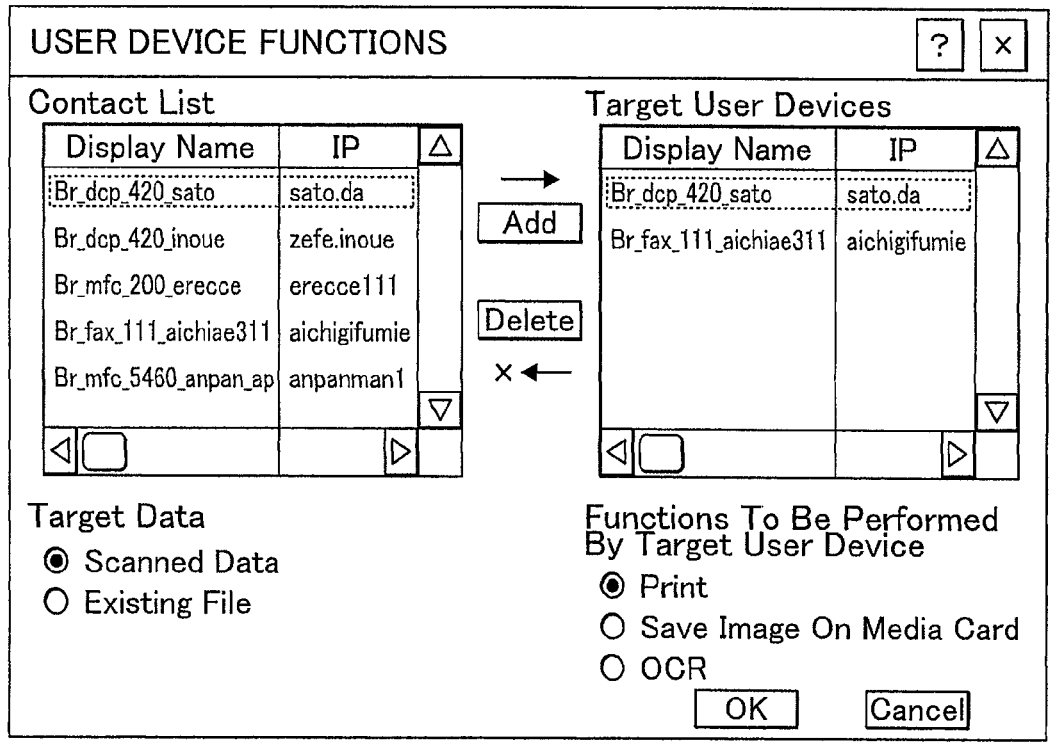
FIG. 12(b) shows another sample display screen for the user interface on the transmission-side PC in the second modification of the first embodiment.

Next, processes executed on the PCs 10 and 30 will be described in greater detail with reference to FIG. 12(*a*) through FIG. 15(*b*). FIG. 12(*a*) and FIG. 12(*b*) show sample display screens for the user interface (hereinafter abbreviated as "UI") provided by the intermediary application on the transmission-side PC. FIG. 13 is a sample display screen on the transmission-side PC. FIG. 14(*a*) shows a sample job file, FIG. 14(*b*) shows a sample job execution feasibility file, and FIG. 14(*c*) shows another sample job execution feasibility file. FIG. 15(*a*) shows a sample job execution results file, and FIG. 15(*b*) shows another sample job execution results file.

First, a method in which the user selects an external IP telephone application, such as the IP telephone application 34*b* or 54*b*, from the contact list and a method in which the user selects a function (process) to be implemented on an external IP telephone terminal, such as the device 40 or 60, will be described with reference to FIG. 12(*a*) and FIG. 12(*b*). It is noted that the PC 10 serves as the transmission-side PC and the PC 30 as the reception-side PC.

When the intermediary application 14*a* is launched on the transmission-side PC 10, the intermediary application 14*a* acquires registration data from the registration data storage area 15 via the IP telephone application 14*b* (Q1 in FIG. 11(*a*)) and displays this data on the display unit 10*d* of the PC 10 as a contact list, as shown in FIG. 12(*a*).

Function identification data is displayed in the "Device data for the selected user device" box for the display name highlighted in the "Contact list" by a dotted line. In this example, the device name "Br DCP 420" and the device functions "printer, scanner, memory card slot" are displayed for the user device "Br_dcp_420_sato" encircled by the dotted line.

Displayed under "Basic functions of the IP telephone application" in FIG. 12(*a*) are various buttons for "Chat," "Call," "Transfer file," and "Search contacts." The user can execute one of these basic functions of the IP telephone application by selecting the corresponding button with a cursor or the like.

Beneath the "Expanded functions of the IP telephone application" are displayed buttons for "User device functions" for implementing functions on another PC or device, and "Search for user devices" for acquiring data registered in an IP telephone application installed on an external PC or device. The user can use a function on another user device or search for user devices by selecting one of these buttons with the cursor, for example. FIG. 12(*b*) shows a sample UI displayed when the user has selected the "User device functions" button.

The UI for user device functions shown in FIG. 12(*b*) is activated when the user selects the "User device functions" button with the cursor or the like. As shown in FIG. 12(*b*), the UI for "User device functions" is provided with a "Contact list," "Target user devices," the buttons "Add" and "Delete" for adding devices to or deleting devices from "Target user devices," target data radio buttons specifying target data desired to be processed by a target device selected from the contact list (for selecting either "Scanned data" or "Existing file" in this example), radio buttons for functions to be performed by the target device (for selecting one of "Print," "Save image on media card," or "OCR" in this example), an "OK" button for executing the specified function, and a "Cancel" button for canceling the operation.

A target user device is a user device that will be instructed to perform a process according to a function possessed by the device. One or more target user devices may be specified. In the example of FIG. 12(*b*), two target user devices "Br_dcp_420_sato" and "Br_fax_111_aichiae311" are specified from among the user devices listed in the contact list. To add a user device to "Target user devices," the user selects a target user to be added from "Contact list" and clicks on the "Add" button. To delete a user device from "Target user devices," the user selects one of the devices in "Target user devices" and clicks the "Delete" button to remove the user device from the list of the target user devices. The UI may be configured to prevent the user from selecting a function to be performed by the target device when the function is not possessed by all the selected target user devices.

After the user selects a target user device, target data, and a function to be performed by the target device with the target data in the UI shown in FIG. 12(*b*) and subsequently selects the "Transfer file" button with the cursor in the UI shown in FIG. 12(*a*) (Q2 of FIG. 11(*a*)), the intermediary application 14*a* transmits an acquisition command to the device 20 to acquire the process file (scanned data, for example) selected by the user under "Target data" in the UI shown in FIG. 12(*b*).

If the user performs a selection in the UI that requires data stored on the PC 10, in this case the process file is acquired from the RAM 13 or HDD 14 of the PC 10 in the process of Q3.

After the process file is acquired in Q3, the intermediary application 14*a* references the acquired process file and generates a job file (Q4). A message prompting the user whether to transmit the job is also displayed in Q4.

FIG. 13 shows a screen displayed in the process of Q4 when prompting the user whether to transfer the job. As shown in FIG. 13, the display screen includes "Image file: read by scanner," "Paper size: A4," "Monochrome/color: color," "Resolution: 300 dpi," "Pages: 1," "Copies: 1," and "Cancel" and "Send" buttons for the process selected by the user. At this time, the user can modify the values displayed for each item as desired. Data indicative of the settings are included in the job file.

Hence, the user can determine whether to transmit the job after confirming settings for processing the process file acquired from the device 20 and modifying the settings as desired. The user selects the "Send" button with the cursor or the like to transmit the job or selects the "Cancel" button to cancel the job transmission.

Once the message is displayed in the process of Q4, prompting the user to indicate whether to transmit the job, and the user makes a selection, the intermediary application 14*a* determines whether the user selected the option to transmit the job. If the user canceled the job transmission, the process ends.

However, if the user selected the option to transmit the job, the intermediary application 14*a* advances to the process in Q5 described above.

FIG. 14(*a*) shows a sample job file generated in Q4. In this example, "jobfile" is listed as the file type in the top line. In addition to the file type, the job file includes the text data "This file is a file inquiring whether the following process can be executed by your IP telephone terminal when your IP telephone terminal supports a printer function. No action is taken when the printer function is not supported." By reading and analyzing this text data, the PC 30 can recognize that the file is a job file. By displaying text corresponding to this text data, the PC 30 can notify the user of the received file.

The job file also includes the data "Taro2008_01_25_12_30_44" as the job ID, "color printing" as the function, "JPG" as the file format, "123,456 bytes" as the file size, "A4" as the paper size, "300 dpi" as the resolution, "1" as the number of pages, and "1" as the number of copies. Here, settings displayed and modified in the UI shown in FIG. 13 are reflected in the job file.

The asterisks "*" in the job file are included to produce a uniform file size for each file and are added when the intermediary application 14*a* generates the file based on the amount of data already included in the file.

In Q9 the intermediary application 34*a* acquires device data including functions and the like that can be implemented on the device 40 from the device data storage area 34*e*, compares this acquired device data with data for functions, file format, paper size, resolution, and the like included in the job file to determine whether the job indicated in the job file can be implemented on the device 40, and generates a job execution feasibility file based on this determination.

FIG. 14(*b*) shows a sample job execution feasibility file for a case in which the job can be executed. This file includes "job execution feasibility" as the file type in the top line. In addition to the file type, the file includes "Taro2008_01_25_12_30_44" as the job ID, "execution possible" as the response, and the text data "The following function can be executed."

Hence, if the job indicated in the job file can be executed, the intermediary application 34*a* creates text data, indicating that the job can be executed, based on the text data included in the job file, and returns this data in the job execution feasibility file. By reading and analyzing this text data, the PC 10, the transmission source of the job file, can both recognize that the file is a job execution feasibility file and learn the content of the file. The intermediary application 14*a* on the PC 10 determines in Q14 whether the job can be executed by referencing the response included in the job execution feasibility file.

The job execution feasibility file in the example of FIG. 14(*b*) also includes the data "color printing" as the function, "JPG" as the file format, "123,456 bytes" as the file size, "A4" as the paper size, "300 dpi" as the resolution, "1" as the number of pages, "1" as the number of copies, and asterisks "*" of a suitable number to achieve a uniform file size.

FIG. 14(*c*) shows a sample job execution feasibility file when the job cannot be executed. This file includes the description "job execution feasibility" as the file type in the top line. In addition to the file type, the file includes "Taro2008_01_25_12_30_44" as the job ID, "execution not possible" as the response, and the text data "The job cannot be executed for the following reason."

The job execution feasibility file in the example of FIG. 14(*c*) also includes the data "monochrome printing" as the printing function. Since the function in the job file specifies color printing, including the above data in the job execution feasibility file indicates that the job cannot be executed because the device 40 does not support color printing.

Accordingly, if the job indicated in the job file cannot be executed, the PC 30 can create text data indicating the reason that the file cannot be executed, based on text included in the job file, and can return this text data in the job execution feasibility file. By reading and analyzing this text data, the PC 10 that transmitted the job file can both recognize that the file is a job execution feasibility file and learn the content of the file.

In Q19 the intermediary application 34*a* instructs the device 40 to execute the process indicated by the job file on the process file. Specifically, the intermediary application 34*a* performs a process to output an instruction to the device 40 for printing an image, as indicated by the job file, and to transmit image data included in the process file to the device 40. The intermediary application 34*a* also transmits an acquisition command to the device 40 to acquire the results of job execution. If the job file includes some data indicating settings different from the configuration data stored in the RAM-side configuration data storage area 43*a*, the intermediary application 34*a* instructs the device 40 to change the configuration data in the RAM-side configuration data storage area 43*a* into the settings included in the job file.

The job execution results are data indicating whether the device 40 successfully executed the job or the job failed due to some error in the device 40 (a paper jam, out-of-paper error, or out-of-ink error, for example). In Q21 the intermediary application 34*a* generates a job execution results file based on the execution results acquired from the device 40.

FIG. 15(*a*) shows a sample job execution results file generated in Q21 when the execution was a success. In the file shown in FIG. 15(*a*), "job execution results" is indicated in the top line as the file type. In addition to the file type, the job execution results file includes "Taro2008_01_25_12_30_44" as the job ID, "success" as the response, and the text data "Execution of the following function was successful."

The job execution results file in this example also includes the data "color printing" as the function, "JPG" as the file format, "A4" as the paper size, "300 dpi" as the resolution, "1" as the number of pages, "1" as the number of copies, and asterisks "*" of a suitable number to achieve a uniform file size.

By reading and analyzing this text data, the PC 10 that transmitted the job file can both recognize that the file is a job execution results file and learn the content of the file.

FIG. 15(*b*) shows a sample job execution results file when the execution failed. In this file, "job execution results" is indicated in the top line as the file type. In addition to the file type, the job execution results file includes "Taro2008_01_25_12_30_44" as the job ID, "failure" as the response, and the text data "Execution failed due to the following reason."

In this example, the job execution results file also includes "paper jam" as the printing status. Accordingly, execution of the function indicated in the job file failed due to a paper jam.

By reading and analyzing this text data, the PC 10 that transmitted the job file can both recognize that the file is a job execution results file and learn the content of the file.

Since the intermediary application 34*a* stores the job execution results in the reception job history storage area 34*h* in Q26, the PC 30 can display a job history based on the job execution results when a user selects a job history button (not shown). The displayed job history includes the date and time that the job file was received, the process indicated for execution in the job file, the name of the external IP telephone terminal running the IP telephone application that issued the command for execution, and the results of execution. Hence, even if the user is not present when the process is executed, the user can later view the job history to determine if the process was executed successfully.

According to the present modification, as described above, when one PC (the PC 30) receives a job file from another PC (the PC 10) commanding the execution of a function, the first reception-side PC transmits a job execution feasibility file to the transmission-side PC indicating whether the function specified in the job file can be executed and, after subsequently receiving a process file from the transmission-side PC including execution data for executing the function, the reception-side PC executes the function based on the process file.

Since the transmission-side PC transmits the process file only when the job execution feasibility file indicates that the function can be executed on the reception-side PC or device, unnecessary file transmissions are prevented when the reception-side PC or device cannot execute the function. Further, when the process file is received, the reception-side PC can reliably execute the function based on this process file.

Further, by exchanging files between the two PCs regarding the feasibility of executing a function on the reception-side PC and transferring the process file from the transmission-side PC only when the reception-side PC can execute the function, the IP telephone system effectively utilizes the file transmission function of the IP telephone.

Further, when a file transmission request is received from an IP telephone application to which the IP telephone is currently engaged in voice or chat communications, the PC 30 transmits a file transmission authorization response without querying the user. Accordingly, the user need not perform complex operations when the caller is known and stability is ensured, thereby improving user-friendliness.

Similarly, when a file transmission request is received from an IP telephone application to which the IP telephone has transmitted a job file, the PC 10 transmits a file transmission authorization response without querying the user. Accordingly, the user need not perform complex operations when the request source is known and stability is ensured, thereby improving user-friendliness.

Further, the job file includes various data, such as the function, file format, file size, paper size, resolution, number of pages, and number of copies, enabling the reception-side PC to determine whether a connected device can execute the function. Hence, the reception-side PC can make an accurate determination.

Each of the job file, job execution feasibility file, job execution results file, and process file comprises text data. Since text data can easily be analyzed by a PC or device, each file can be analyzed through a simple process.

The intermediary application 34a may be modified to store identification data for the transmission source of the job file in Q9 and to clear the identification of the job file transmission source in Q26. In this case, the intermediary application 34a determines in Q16 whether the source of the transmission request is the transmission source of the job file. If the request comes from the transmission source of the job file, the intermediary application 34a transmits a file transmission authorization response to the PC 10 without querying the user, even if the "prompt before responding" setting has been selected. Therefore, the PC 30 transmits a file transmission authorization response without querying the user when a file transmission request is received from the PC 10 that transmitted the job file. This method relieves the user of performing complex operations when the contact is known and stability assured, thereby improving user-friendliness.

It is noted that in Q9, the intermediary application 34a may not only acquire device data from the device data storage area 34e but also acquire PC data including functions and the like that can be implemented on the PC 30 from the PC data storage area 32a. In this case, the intermediary application 34a compares the acquired device data and PC data with data for functions, file format, paper size, resolution, and the like included in the job file, to thereby determine whether the job indicated in the job file can be implemented on the device 40 or the PC 30 and generate a job execution feasibility file based on this determination. In this case, when it is determined that the job indicated in the job file can be executed by at least one of the device 40 or the PC 30, the PC 30 generates the job execution feasibility file indicating that the job can be executed. If the PC 30 determines that the job can be executed on the PC 30, in Q20 the PC 30 implements the job indicated in the job file.

If the user does not wish to allow remote processing from another PC, the user can set options in advance in the intermediary application to deny remote processing. For example, if the user of the PC 30 configures the intermediary application 34a to deny remote processing, in Q9 the intermediary application 34a always generates a job execution feasibility file indicating that the job specified in the job file received from the PC 10 cannot be executed and transmits this job execution feasibility file to the PC 10.

<Third Modification of First Embodiment>

Next, a third modification of the first embodiment of the present invention will be described while referring to FIG. 1(b) and FIG. 16-FIG. 18.

According to the present modification, the IP telephone system 1 of the first embodiment is modified so that an IP telephone terminal can transfer a file via an IP telephone application to another IP telephone terminal (a destination IP telephone terminal) to implement a desired function on the destination IP telephone terminal and to subsequently output a state of execution of the function on the destination IP telephone terminal. The file transmitted to the destination IP telephone terminal includes a command for the function (process) to be implemented on the destination IP telephone terminal, execution data desired to be subjected to the function, and text data for displaying or printing a message indicative of whether the function can be executed.

In the present modification, as indicated in parenthesis in FIG. 1(b), the HDD 14 is further provided with a transmission type table storage area 14i, an execution possible character string storage area 14j, and an execution impossible character string storage area 14k.

The transmission type table storage area 14i stores a transmission type table describing types of functions that are implemented on external IP telephone terminals (such as the PCs 30 and 50 and the devices 40 and 60). The transmission type table will be described later in greater detail with reference to FIG. 16.

The execution possible character string storage area 14j stores character string data for displaying or printing a message when the specified function can be properly executed on the external IP telephone terminal. The execution impossible character string storage area 14k stores character string data for displaying or printing a message when the specified function cannot be properly executed on the external IP telephone terminal. The character string data stored in the execution possible character string storage area 14j and execution impossible character string storage area 14k is in a text format.

The PCs 30 and 50 have the same structures as the PC 10, and therefore a description of these PCs will not be repeated.

Next, the transmission type table stored in the transmission type table storage area 14*i* will be described with reference to FIG. 16. FIG. 16 conceptually illustrates a sample transmission type table.

In FIG. 16, "○" indicates functions that can be selected, "×" indicates functions that cannot be selected, "Δ" indicates functions that can be executed through functions possessed by an external IP telephone terminal, and "X̶" indicates a default setting used as the default when the user has not selected a setting. The transmission type is the type of data that one PC subjects to a function implemented on another PC.

As shown in FIG. 16, the PCs 10, 30, and 50 can select the transmission types "scanned document," "received fax," "external terminal," "memory card," "voice," and "recorded voice." The method of selecting a function for each transmission type is defined in detail in the table.

Each transmission type in the table is also associated with types of functions that can be specified for execution on an external PC or device, including a function for performing a printing operation ("print" in FIG. 16), a function for displaying data on a liquid crystal display (hereinafter referred to as "LCD"; "LCD" in FIG. 16), a function for saving data on a memory card or the like ("memory card" in FIG. 16), a function for saving data in RAM ("device RAM" in FIG. 16), a function for playing back voice ("playback" in FIG. 16), and a function for transferring data to another connected device ("transfer to other device" in FIG. 16).

The transmission type "scanned document" is selected when transmitting print data generated when the scanner 24 of the device 20 scans an image and allows the user to specify the scanned size, resolution, number of pages, color/monochrome setting, and the like. The functions that can be specified for execution on an external PC or device for this transmission type are "print," "LCD," "memory card," "device RAM," and "transfer to other device." The default function set for the transmission type "scanned document" is "print."

The transmission type "received fax" is selected when transmitting received fax data and allows the user to specify select desired fax data in a graphical user interface (hereinafter abbreviated as "GUI"). The functions that can be specified for execution on an external PC or device for this transmission type are "print," "LCD," "memory card," "device RAM," and "transfer to other device." The default function set for the transmission type "received fax" is "print."

The transmission type "external device" is selected when transmitting data from an external device and allows the user to specify data in a digital camera or the like to be temporarily saved and transferred. The functions that can be specified for execution on an external PC or device for this transmission type are "print," "LCD," "memory card," "device RAM," and "transfer to other device." The default function set for the transmission type "external device" is "print."

The transmission type "memory card" is selected when transmitting data read from a memory card (not shown) inserted in the memory card slot 26 and allows the user to select a desired file on the memory card through the GUI. The functions that can be specified for execution on an external PC or device for this transmission type are "print," "LCD," "memory card," "device RAM," and "transfer to other device." The default function set for the transmission type "memory card" is "print."

The transmission type "voice" is selected when transmitting voice data inputted through a handset (not shown), microphone (not shown), or the like. The transmission type "voice" allows the user to specify the start and stop timings of voice recordation through GUI and converts inputted voice data to voice data suitable for transmission. The functions that can be specified for execution on an external PC or device for this transmission type are "memory card," "device RAM," "playback," and "transfer to other device." If the external PC or device possesses a conversion function for converting from voice to print data, the user may also select "print" and "LCD." The default function set for the transmission type "voice" is "device RAM."

The transmission type "recorded voice" is selected when transmitting voice data that has been recorded and allows the user to select recorded voice data through a GUI. The functions that can be specified for execution on an external PC or device for this transmission type are "memory card," "device RAM," "playback," and "transfer to other device." If the external PC or device possesses a conversion function for converting from voice to print data, the user may also select "print" and "LCD." The default function set for the transmission type "recorded voice" is "device RAM."

The execution possible character string storage area 14*j* stores a plurality of sets of character string data in correspondence with a plurality sets of combinations of the transmission types and the plurality of functions corresponding to the transmission types, and each set of character string data indicates a message that should be outputted when the corresponding function for the corresponding transmission type can be properly executed. Similarly, the execution impossible character string storage area 14*k* stores a plurality of sets of character string data in correspondence with a plurality sets of combinations of the transmission types and the plurality of functions corresponding to the transmission types, and each set of character string data indicates a message that should be outputted when the corresponding function for the corresponding transmission type cannot be properly executed.

In the present modification, the intermediary application 14*a* is not only capable of handling read files, response files, write files as described above in the first embodiment, but also is capable of generating a transmission file from data corresponding to the transmission types described above. The intermediary application 14*a* also analyzes a transmission file received from an external PC, issues an instruction to execute the function specified in the transmission file, and issues an instruction to display or print out a message indicative of whether the function can be executed.

Now assume that the user of the PC 10 would like to use the scanner 24 of the device 20 at the terminal 2 to scan an image, and to use the device 40 connected to the PC 30 at the IP telephone terminal 4 to print out the scanned image.

In such a case, after acquiring image data generated by the scanner 24, the intermediary application 14*a* generates a transmission file. Next, the intermediary application 14*a* references registration data stored in the registration data storage area 15 of the IP telephone application 14*b*, selects an external IP telephone application 34*b* to connect to, and establishes a connection between the IP telephone application 14*b* and the IP telephone application 34*b*. Subsequently, the intermediary application 14*a* transmits a transmission file, instructing the printer 45 of the device 40 to print the image data generated by the scanner 24, to the file reception unit 38 of the PC 30 via the file transmission unit 19.

After receiving the transmission file, the intermediary application 34*a* of the PC 30 issues a print command to the printer 45 and transfers the print data thereto. Upon receiving the print command and print data, the device 40 performs the printing operation based on the received print data.

The transmission file includes a file header, execution data, and display/print data.

The header of the transmission file includes: data for an identifier identifying the intermediary application 14a and IP telephone application 14b (source of the transmission file); the above-described transmission type; and a process instruction specifying the process to be executed on data of the transmission type, and the file size indicating the size of the file to be transmitted. The header of the transmission file may include various settings related to the process to be executed.

The execution data is: a TIFF file including fax data; a JPEG file comprising PCC-type (image) data; a CSV file including address book data; a TXT file including text data; or the like. The execution data is a target desired to be processed according to the process instruction included in the file header. The type of the execution data is stored as the transmission type in the file header.

The display/print data in the transmission file includes: character string data (execution possible character string data) to be displayed on the LCD or printed on paper when the process specified for execution on the destination PC or device can be performed successfully; and character string data (execution impossible character string data) to be displayed or printed when the process cannot be performed.

Next, a sequence of steps in a process performed on the IP telephone system 1 of the present modification will be described with reference to FIG. 17. It is noted that according to the present modification, the IP telephone system 1 can perform not only the process described above with reference to FIGS. 4(a) and 4(b) but also the process of FIG. 17 described below.

In this example, the PC 10 in the IP telephone terminal 2 issues an instruction to the IP telephone terminal 4 to execute a function possessed by the PC 30 or the device 40 in the IP telephone terminal 4, and the IP telephone terminal 4 executes the function. The PC 30 displays or prints out either "Process can be executed" message or "Process cannot be executed" message. However, any PC, and not just the PC 10 serving as the call center, can issue an instruction to any other IP telephone terminal to execute a function.

As in the second modification of the first embodiment, the intermediary applications store identification data for contact (remote IP telephone terminal) while engaged in voice communications or a chat session with the contact. Further, the user can set a response setting in the intermediary application to "respond automatically" or "prompt before responding."

Figure 17:
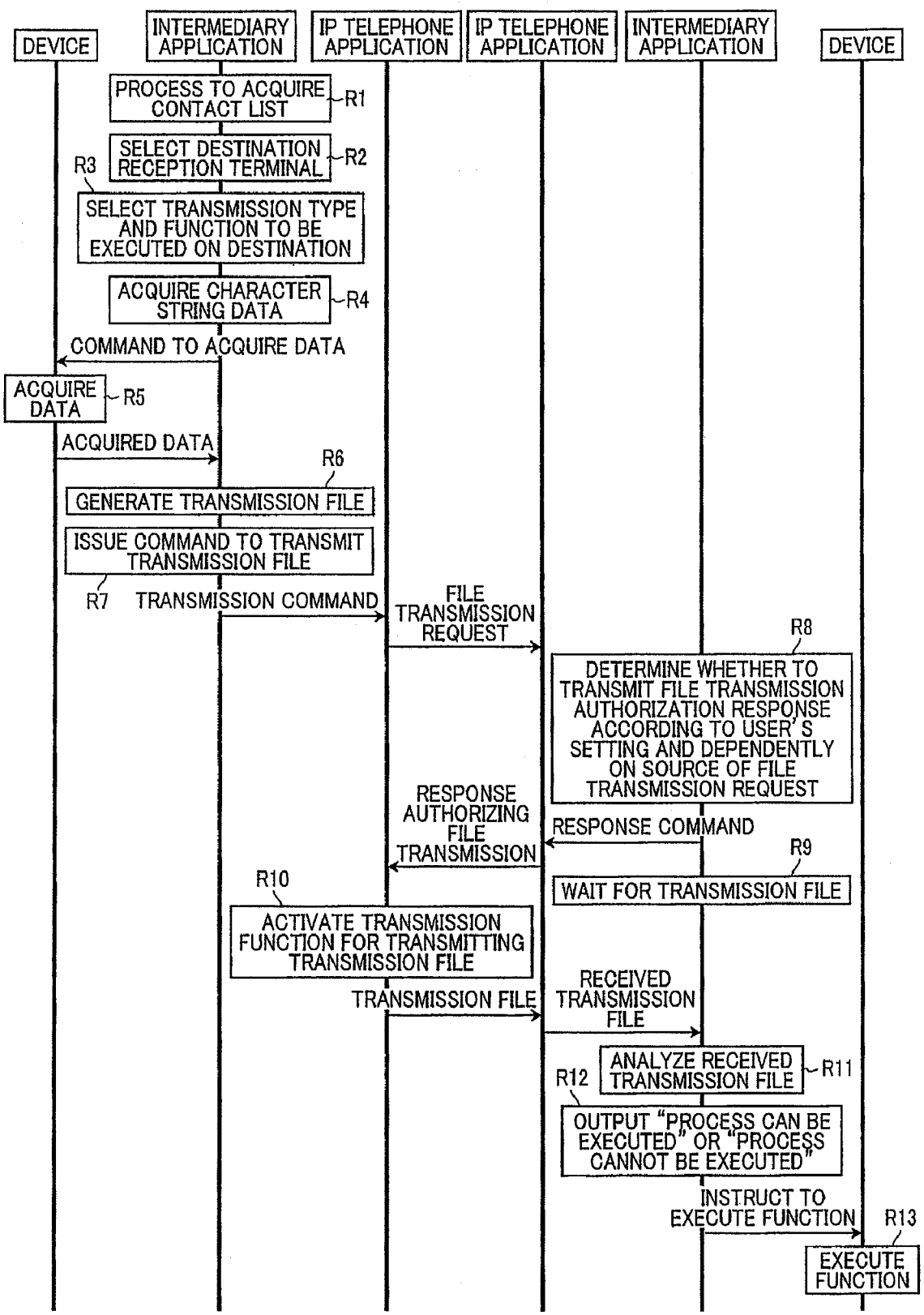
FIG. 17 is a sequence chart showing steps of a process implemented by programs running on IP telephone terminals of an IP telephone system according to a third modification of the first embodiment.

In R1 of FIG. 17, the intermediary application 14a of the PC 10 executes a process to acquire a contact list based on registration data for other IP telephone terminals recorded in the registration data storage area 15. Through this process, the intermediary application 14a acquires a contact list for user devices registered in the IP telephone application 14b. In R2 the intermediary application 14a selects the display name for the PC 30 from the contact list acquired in R1 as the destination reception terminal.

In R3 the intermediary application 14a performs a process to enable the user to select a transmission type and a function of the transmission type to be executed on the external PC 30. In R4 the intermediary application 14a acquires character string data from the execution possible character string storage area 14j for when execution of the selected function of the selected transmission type can be successfully executed on the PC 30 and character string data from the execution impossible character string storage area 14k for when execution of the selected function of the selected transmission type cannot be properly executed.

Subsequently, the PC 10 issues a command to the device 20 to acquire data corresponding to the selected transmission type. In R5 the device 20 acquires the data corresponding to the selected type and transfers the acquired data to the PC 10. The PC 10 acquires data from the device 40 only when it is necessary. For example, if the data of the selected transmission type is stored on the PC 10, the intermediary application 14a may jump to step R6 immediately after completing R4.

In R6 the intermediary application 14a generates a transmission file based on: the selected transmission type; function to be executed on the PC 30; the character string data for both the cases where execution of the process is possible and impossible on the PC 30 or device 40; and the data acquired from the device 20. The transmission file includes the file header, execution data, and display/print data, where the file header stores the selected transmission type and function to be executed on the PC 30, and the file size. The execution data includes the data acquired from the device 20. The display/print data includes the character string data for both the cases where execution of the process is possible and impossible.

After generating the transmission file, in R7 the intermediary application 14a issues a transmission command to the IP telephone application 14b to transmit the transmission file. The IP telephone application 14b transmits a file transmission request to the IP telephone application 34b of the PC 30.

In R8 the intermediary application 34a of the PC 30 determines whether to transmit a file transmission authorization response authorizing the file transmission. After determining to transmit the file transmission authorization response to the PC 10, the intermediary application 34a transmits a response command to the IP telephone application 34b instructing the IP telephone application 34b to transmit the file transmission authorization response, and the IP telephone application 34b transmits a signal authorizing file transmission to the IP telephone application 14b of the PC 10.

As in Q6 of the second modification of the first embodiment, the intermediary application 34a determines whether to respond automatically or to prompt the user before responding based on the user setting described above. However, if identification data for the source of the file transmission request is stored on the intermediary application 34a, the intermediary application 34a determines to transmit a file transmission authorization response to the PC 10 without prompting the user for instructions, even when the user has selected the "prompt before responding" setting.

After issuing a response command to authorize file transmission, in R9 the intermediary application 34a waits for the IP telephone application 34b to receive the transmission file from the IP telephone application 14b and to relay this file.

In the meantime, after receiving the file transmission authorization response from the IP telephone application 34b, in R10 the IP telephone application 14b executes a file transmission function. That is, the file transmission unit 19 provided in the IP telephone application 14b shown in FIG. 16 is instructed to transmit the transmission file to the file reception unit 38 provided in the IP telephone application 34b.

In R11 the intermediary application 34a receives the transmission file from the IP telephone application 34b and analyzes the received file. In analyzing this file in R11, the intermediary application 34a compares the transmission type, function specified for execution, and file size included in the header of the received file with functions of the device 40 stored in the device data storage area 34e or functions of the PC 30 stored in the PC data storage area 32a to determine whether either the device 40 or the PC 30 can successfully execute the process indicated in the received file.

Based on the results of this analysis, in R12 the intermediary application 34a displays or prints out a "Process can be executed" message or a "Process cannot be executed" message based on whether the process can be performed on the PC 30 or device 40 according to the functions available on the PC 30 and the device 40.

It is noted that the intermediary application 34a may query the device 40 to determine whether the function can currently be executed on the device 40. By querying the device 40, the intermediary application 34a can detect whether a failure may occur due to the current status of the device 40, such as when the device 40 is out of paper, out of ink, or out of toner; when a paper jam has occurred; or when a memory card is not inserted.

When the intermediary application 34a determines that the process can be successfully performed on the device 40, the intermediary application 34a issues an execution command to the device 40 to execute the function indicated by the PC 10 on data included in the received file. In R13 the device 40 executes the process, and the series of processes in FIG. 17 ends.

Next, the processes executed on the PC 10 and PC 30 will be described in detail with reference to FIG. 18.

Figure 18:
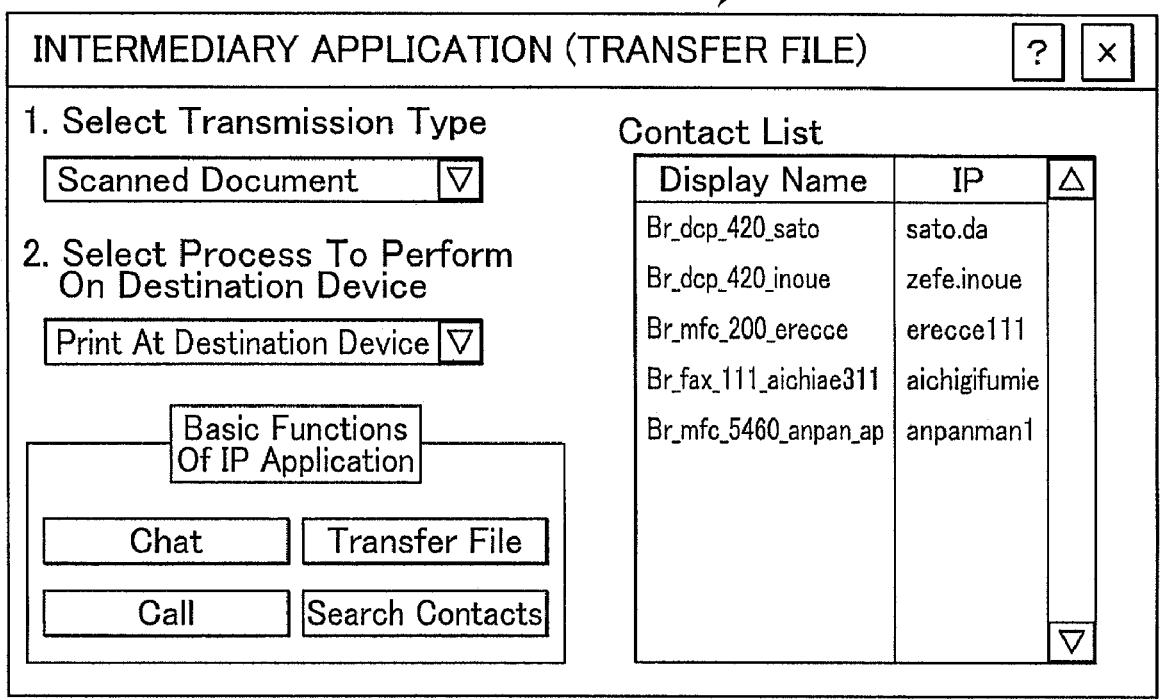
FIG. 18 shows a sample display screen of a user interface on a display unit of a transmission-side PC according to the third modification of the first embodiment.

FIG. 18 shows a sample display screen of a user interface (hereinafter abbreviated as "UI") on the display unit of the transmission-side PC. In this example, the PC 10 serves as the transmission-side PC and the PC 30 as the reception-side PC.

The process shown in FIG. 17 is executed when the user of the PC 10 selects the function for transferring a file to the external PC 30 and, more specifically, when the user launches the UI of the IP telephone application 14b and selects the "Transfer file" function therein. FIG. 18 shows a sample display screen when the user has selected the "Transfer file" function.

First, the UI shown in FIG. 18 will be briefly described. The section "1. Select a transmission type" enables the user to select one of the transmission types described above. By selecting the "∇" on the right end of the pull-down menu with the cursor or the like, the user can display all transmission types and can select one therefrom.

The section "2. Select a process to perform on the destination device" enables the user to select a function to be executed on an external IP telephone terminal (PC or device) with the transmission type described above. By selecting the "∇" with the cursor or the like, the user can display all available functions and can select one therefrom.

Displayed under "Basic functions of the IP telephone application" are various buttons for "Chat," "Call," "Transfer file," and "Search contacts." The user can execute one of these basic functions of the IP telephone application by selecting the corresponding button with the cursor or the like.

The section "Contact list" displays the search results when the user has selected the "Search contacts" button. Here, the user can display a profile for any display name in the contact list by selecting the display name with the cursor or the like. Hence, the user can select a desired contact while viewing the displayed profiles.

When the "Transfer file" function is selected, the intermediary application 14a acquires the contact list (R1) and displays the File Transfer window shown in FIG. 18. In this window, the user selects a desired contact from the contact list (R2) and also selects a transmission type and a function to be executed by the contact.

The intermediary application 14a then acquires character string data for indicating both execution possible and execution impossible for the transmission type and function selected in R3 from the execution possible character string storage area 14j and execution impossible character string storage area 14k (R4). The intermediary application 14a issues an acquisition command to the device 20 to acquire data (R5).

Since the PC 10 is transmitting scanned data generated by the scanner 24 of the device 20 to the PC 30 in this example, the intermediary application 14a issues the acquisition command in R5. However, when acquiring data stored on the PC 10, the intermediary application 14a skips the process in R5 and simply acquires this data from a prescribed area of the ROM 12 or HDD 14 in R6.

Next, the intermediary application 14a generates a transmission file from the transmission type and function to be executed that were selected by the user, character strings for execution possible and execution impossible acquired in R4, and data acquired from the device 20 (R6).

The intermediary application 14a generates the transmission file by first generating a file header from the transmission type, function to be executed, data size, and the like, and subsequently combining the file header with the data acquired from the device 20 (execution data) and the execution possible and execution impossible character strings (display/print data) acquired in R4.

In R11, the intermediary application 34a stores the received file in a prescribed storage area of a RAM 33 or HDD 34, extracts the file header, execution data, and display/print data individually from the stored file, analyzes the extracted file header, and determines whether the process specified in the file header can be executed.

The intermediary application 34a determines whether the function can be executed on the device 40 based on data stored in the device data storage area 34e. The intermediary application 34a may also query the device 40 and update the content of the device data storage area 34e each time the process in R11 is executed. In this way, the intermediary application 34a can make a determination based on the current status of the device 40, such as whether the device 40 is currently out of paper, ink, or toner; whether a paper jam has occurred; or whether a memory card is not inserted in the device 40.

Although the intermediary application 34a determines whether the process indicated in the file header can be executed on the device 40 in R11 described above, if the PC 10 has specified a function to be implemented on the PC 30, the intermediary application 34a can determine whether the process specified in the file header can be executed on the PC 30 based on the PC data stored in the PC data storage area 32a.

The intermediary application 34a may also determine in R11 whether the process specified in the file header can be executed for both the device 40 and PC 30 and can issue an instruction in R13 to execute the process on whichever device is capable of implementing the function.

If the process can be executed on the device 40 or the PC 30, the intermediary application 34a acquires "Process can be executed" character string data from the display/print data in the received file and displays this data on the display unit of the PC 30 or prints out this data on a recording medium, such as paper (R12). The intermediary application 34a then outputs an instruction to the device 40 to execute the process indicated in the file header (R13) by using the configuration data stored in the RAM-side configuration data storage area 43a.

It is noted that the file header of the transmission file may include various settings related to the function to be executed. If the various settings are different from the configuration data stored in the RAM-side configuration data storage area 43a, the intermediary application 34a instructs the device 40 to change the configuration data in the RAM-side configuration data storage area 43a into the settings included in the file header of the transmission file.

Examples of character strings displayed or printed out in R12 when the process can be executed are "Print data was received through an IP telephone file transfer and can be printed," "Fax data was received through an IP telephone file transfer. Press the View Only button to view the fax," "An image file was received through an IP telephone file transfer and stored in USB memory," "A voice file was received through IP telephone file transfer and stored at C:voice," and the like depending on the function implemented.

However, if the intermediary application 34a determines in R11 that the process cannot be implemented on the device, in R12 the intermediary application 34a acquires the character string data for an execution impossible from the display/print data of the received file and displays this data on the display unit of the PC 30 or prints out this data. Examples of character strings displayed or printed out in R12 when the process cannot be executed are "Print data was received through an IP telephone file transfer, but cannot be printed," "An image file was received through an IP telephone file transfer. Please connect USB memory to store the image file," "Print data was received through an IP telephone file transfer. Please reload paper to print the paper," and the like depending on the function implemented.

In the process described above, one IP telephone terminal generates a transmission file that includes a file header indicating the function specified for execution on another IP telephone terminal, execution data to be used when executing the function, and display/print data for displaying or printing a message corresponding to the results of executing the function, and transfers this transmission file to the other IP telephone terminal. In this way, the other IP telephone terminal can execute the function specified by the first IP telephone terminal and display or print a message based on the execution results. Accordingly, the file transmission function is effectively utilized on the IP telephone system 1.

Further, since the other IP telephone terminal displays or prints out whether the function specified by the first IP telephone terminal can be executed, the user of the other IP telephone terminal can reliably confirm whether the function can be executed normally. When the function cannot be executed normally, the terminal displays the reason (such as a memory card not being inserted or the like, as described above), thereby improving user-friendliness by enabling the user to easily resolve the problem.

Further, since the display/print data transmitted from the first IP telephone terminal is configured of text data, any common PC or device can read the display/print data without requiring special software. By eliminating the need for such special software, it is possible to lower the cost of the device.

Further, since the display/print data transmitted by the first IP telephone terminal is selected based on the selected transmission type and function to be executed, the first IP telephone terminal can generate a transmission file with the minimum data size, thereby transferring files more efficiently between IP telephone terminals.

The intermediary application 14a may add the transmission type, function to be executed, and file size included in the header of the transmission file generated in R6 to the transmission command issued in R7 for transmitting the transmission file. In this case, the IP telephone application 14b includes the transmission type, function to be executed, and file size in the file transmission request. In R8 the intermediary application 34a compares the data added to the file transmission request with functions of the device 40 stored in the device data storage area 34e or functions of the PC 30 stored in the PC data storage area 32a to determine whether the device 40 or PC 30 can successfully execute the process indicated in the received file. When it is known that the device 40 or PC 30 can successfully perform the process, the intermediary application 34a transmits a response command to the IP telephone application 34b to issue a file transmission authorization response.

In the above description, if the user has selected the "prompt before responding" setting on the intermediary application 34a, the intermediary application 34a transfers in R8 a command to issue a file transmission authorization response when the IP telephone applications 14b and 34b are connected to perform voice communication or chat session and therefore the user is present to operate the IP telephone terminal 4. However, if the user has selected the "respond automatically" setting, the intermediary application 34a transfers a command to issue the file transmission authorization response, even when the user is not present. In this case, if the intermediary application 34a determines in R11 that the process can be executed on the device 40 and if the user is not present at that time, the intermediary application 34a may transfer in R13 the data included in the received file to the device 40 but instruct the device 40 not to execute the function indicated by the PC 10. Hence, the device 40 does not execute the process at that time. When the user later starts the intermediary application 34a or IP telephone application 34b, the intermediary application 34a or IP telephone application 34b notifies the user that a file was received and prompts the user to indicate whether to execute the function based on this file. If the user indicates a desire to execute the function according to the file, the intermediary application 34a instructs the device 40 to proceed with execution.

In the above description, the "process can be executed" message or the "process cannot be executed" message is displayed or printed before the device 40 is instructed to execute the function. However, if it is determined that the process can be executed, the device 40 is instructed to execute the function before the "process can be executed" message is displayed or printed.

It is noted that in the second and third modifications of the first embodiment described above, the intermediary application always transmits a file transmission authorization response without querying the user when the IP telephone application receives a file transmission request and the user has selected the "respond automatically" setting. However, the intermediary application may be configured to transmit a file transmission authorization response without querying the user only when the user has selected the "respond automatically" setting and identification data for the source of the file transmission request is stored in the intermediary application.

In the second modification of the first embodiment, in Q4 the intermediary application 14a may include, in the job file, data of character strings indicating that the function can be executed and that the function cannot be executed, similarly to the third modification of the first embodiment. In this case, the intermediary application 34a can perform a process, before or after Q26, to display the message "Process can be executed" or "Process cannot be executed" on the display unit or print out the message based on whether the process can be executed or not on the device 40.

<Fourth Modification of First Embodiment>

As shown in FIG. 19(a), the intermediary application 14a may be installed on the device 20, while the IP telephone application 14b remains installed on the PC 10. The intermediary application 14a generates read files, write files, and response files, which are transmitted via the file reception unit 18 and the file transmission unit 19 in the IP telephone application 14b. Although not shown in the drawing, the intermediary application 14a may generate process files, job files, job execution feasibility files, and job execution results files, which are transmitted via the file reception unit 18 and the file transmission unit 19 in the IP telephone application 14b, as in the second modification of the first embodiment. Similarly, although not shown in the drawing, the intermediary application 14a may generate transmission files, which are transmitted via the file reception unit 18 and the file transmission unit 19 in the IP telephone application 14b, as in the third modification of the first embodiment.

<Fifth Modification of First Embodiment>

As shown in FIG. 19(b), both of the intermediary application 14a and the IP telephone application 14b may be installed on the device 20. Hence, the device 20 is configured to directly implement IP telephone calls and file transfers with other PCs and devices.

The intermediary application 14a generates read files, write files, and response files, which are transmitted via the file reception unit 18 and the file transmission unit 19 in the IP telephone application 14b. Although not shown in the drawing, the intermediary application 14a may generate process files, job files, job execution feasibility files, and job execution results files, which are transmitted via the file reception unit 18 and the file transmission unit 19 in the IP telephone application 14b, as in the second modification of the first embodiment. Similarly, although not shown in the drawing, the intermediary application 14a may generate transmission files, which are transmitted via the file reception unit 18 and the file transmission unit 19 in the IP telephone application 14b, as in the third modification of the first embodiment.

<Second Embodiment>

Next, a second embodiment of the present invention will be described with reference to FIG. 20(a)-FIG. 20(c).

In the present embodiment, an IP telephone application 114b having the function of the IP telephone application 14b and the intermediary application 14a according to the first embodiment is installed on the PC 10 in place of the intermediary application 14a and IP telephone application 14b.

Figure 20A:
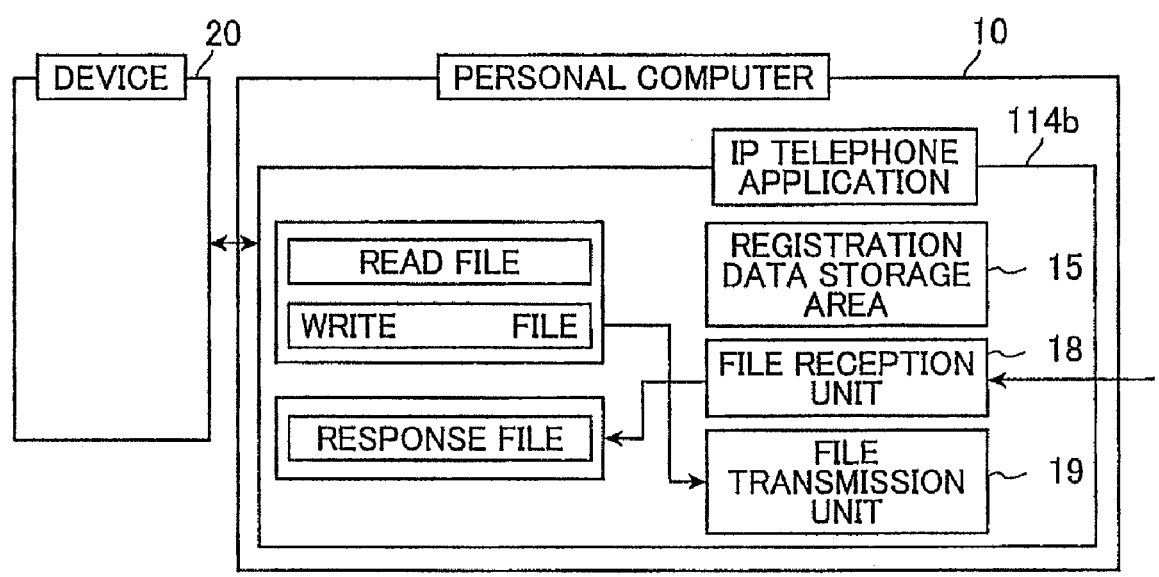
FIG. 20(a) conceptually illustrates the structure of a PC and a device according to a second embodiment.

As shown in FIG. 20(a), the IP telephone application 114b according to the present embodiment includes functions for generating read files, write files, and response files. Specifically, as shown in FIG. 20(b) and FIG. 20(c), processes for generating each of these files, requesting to transmit the generated files, and transmitting the files are executed in the IP telephone application 114b.

On the other hand, the PC 30 connected to the PC 10 is installed with an IP telephone application 134b in place of the intermediary application 34a and IP telephone application 34b according to the first embodiment, and implements processes in the IP telephone application 134b for transmitting a file transmission authorization response, analyzing received files, generating response files, transmitting response files, and issuing instructions to update configuration data in the device 40.

Figure 20B:
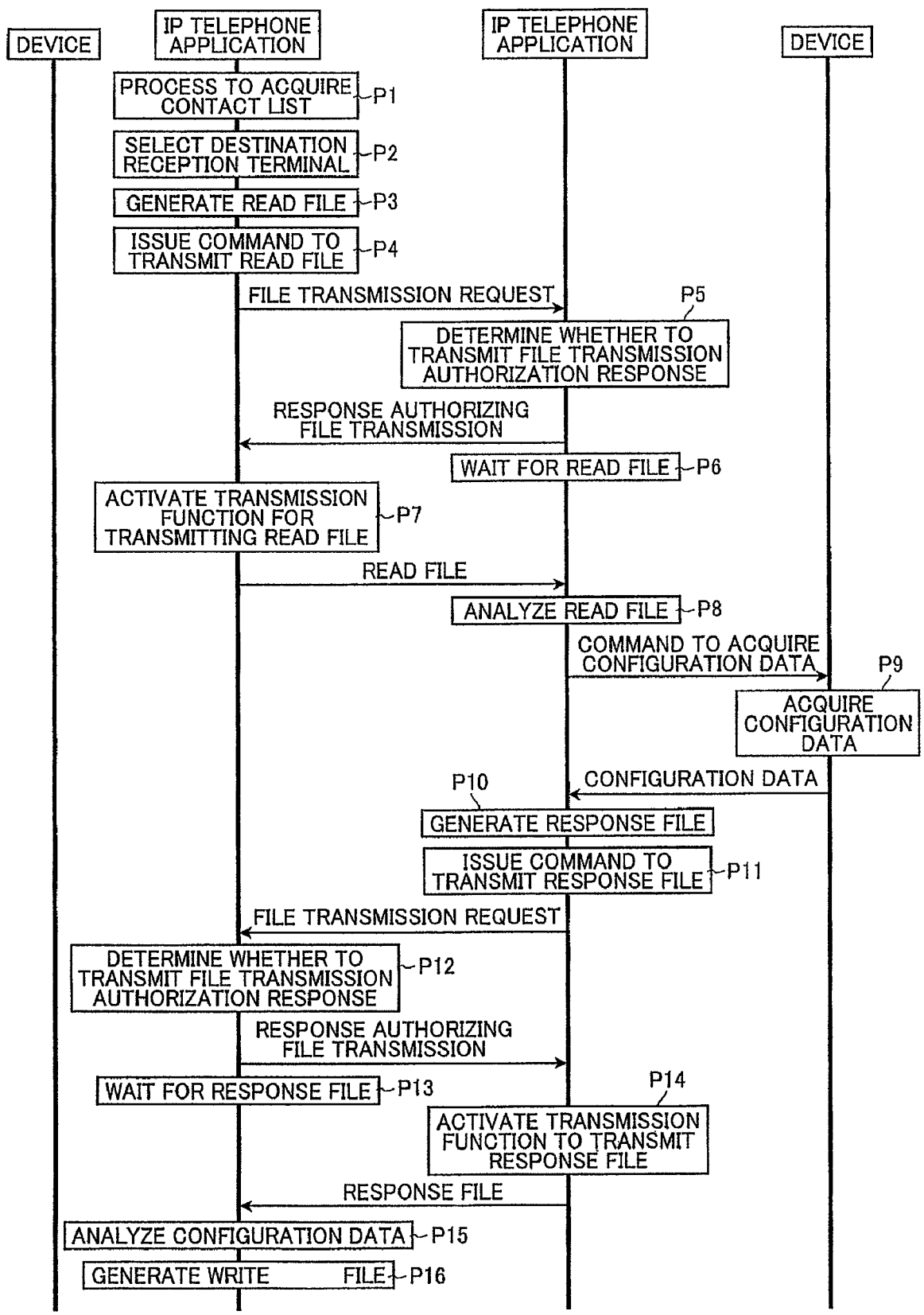
FIG. 20(b) is a part of a sequence chart showing the flow of a process implemented by programs executed on IP telephone terminals in the IP telephone system according to the second embodiment.
Figure 20C:
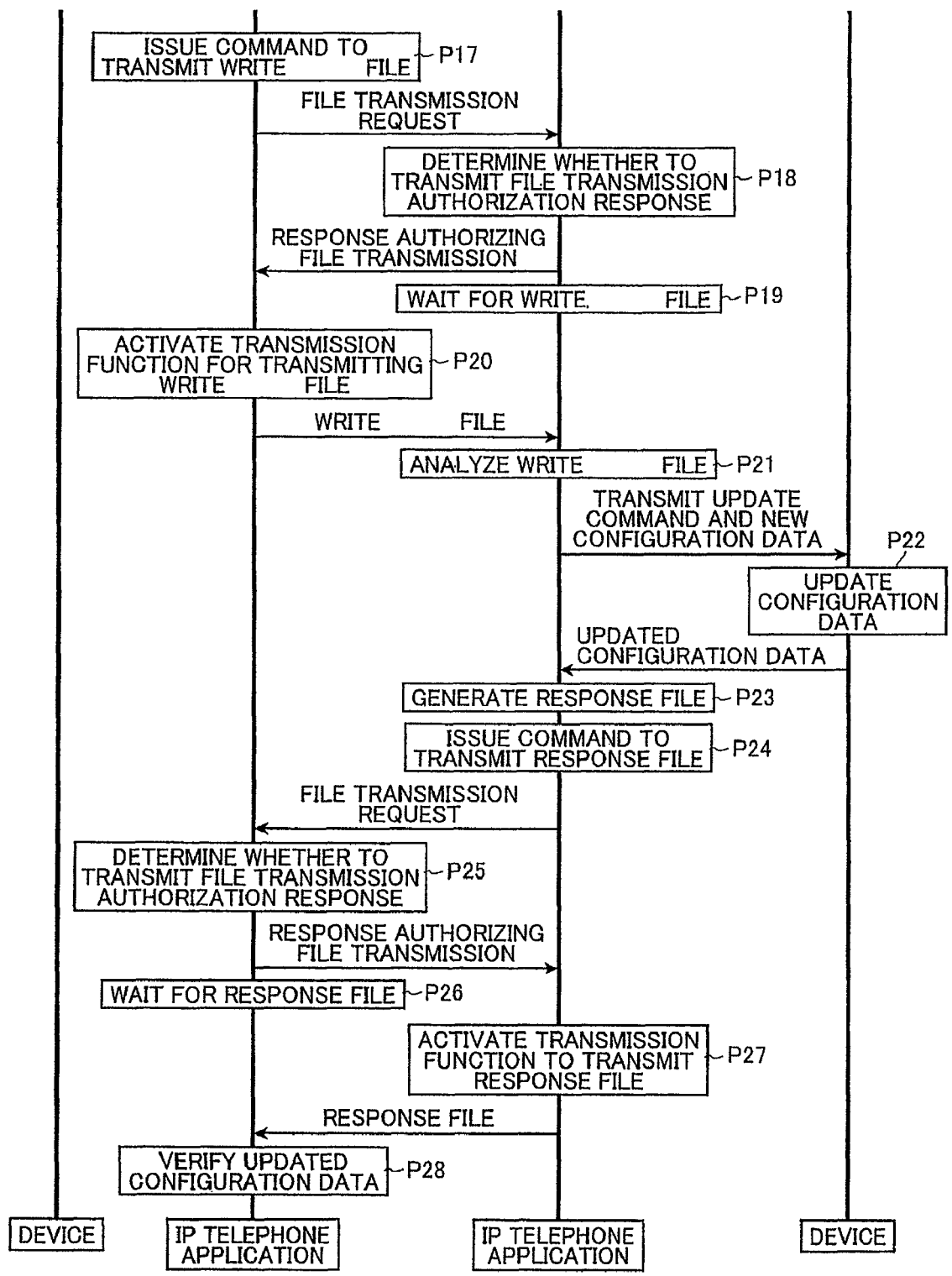
FIG. 20(c) is a remaining part of the sequence chart showing the flow of the process according to the second embodiment.

The processes executed in the present embodiment shown in FIG. 20(b) and FIG. 20(c) are the same as those executed in the first embodiment shown in FIGS. 4(a) and 4(b) except that all the processes executed by the intermediary applications in FIGS. 4(a) and 4(b) are executed by the IP telephone applications in FIG. 20(b) and FIG. 20(c).

In other words, the IP telephone applications 114b and 134b can execute the processes implemented by the intermediary applications 14a and 34a according to the first embodiment.

By accomplishing these processes in a single application, the PC 10 according to the present embodiment eliminates the processes for exchanging data between the intermediary application 14a and IP telephone application 14b performed in the first embodiment, resulting in a smoother process.

<First Modification of the Second Embodiment>

Although not shown in FIG. 20(a), the IP telephone application 114b may further include functions for generating process files, job files, job execution feasibility files, and job execution results files as in the second modification of the first embodiment.

Figure 21A:
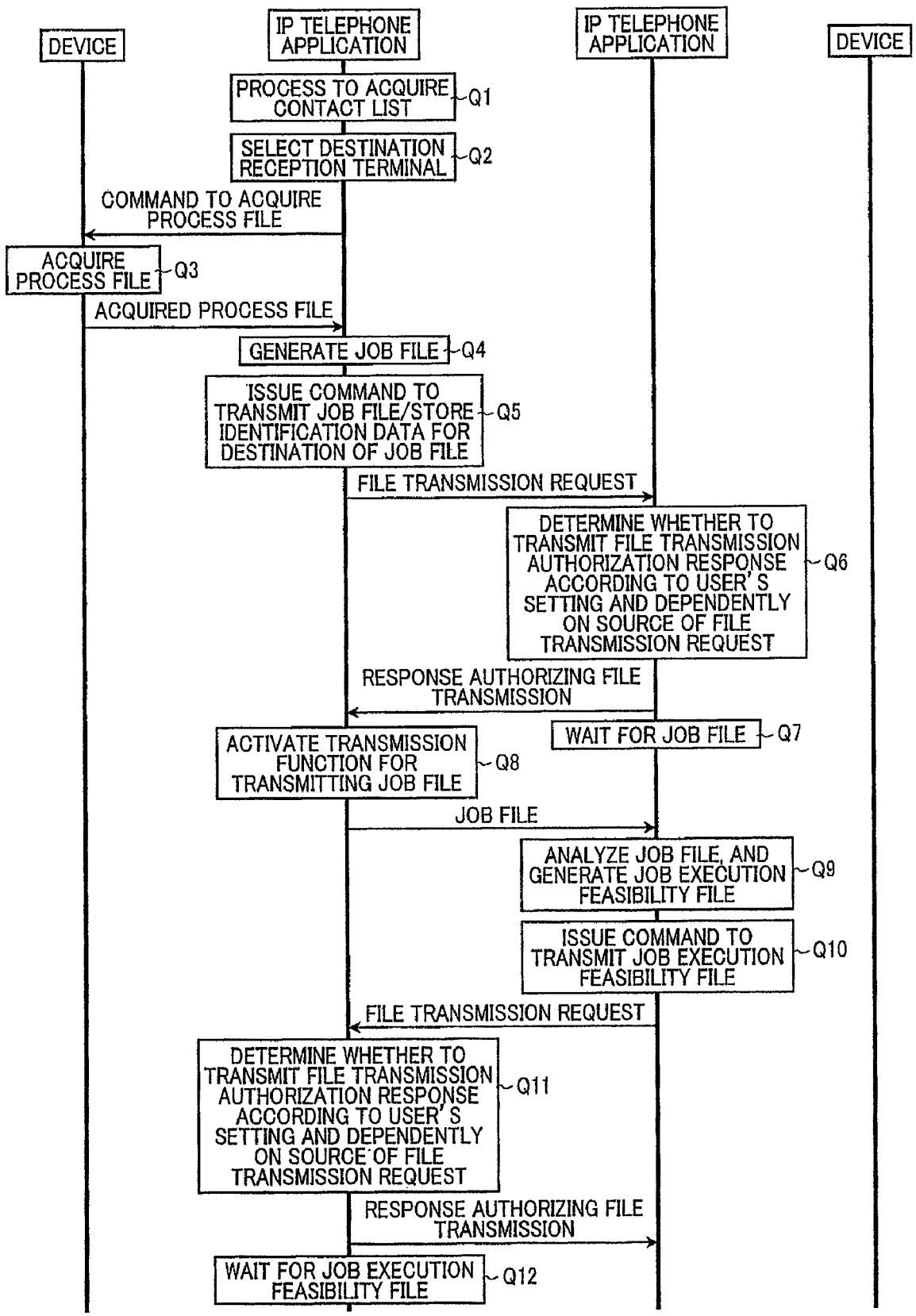
FIG. 21(a) is a first part of a sequence chart showing steps of a process implemented by programs running on IP telephone terminals of an IP telephone system according to a first modification of the second embodiment.
Figure 21B:
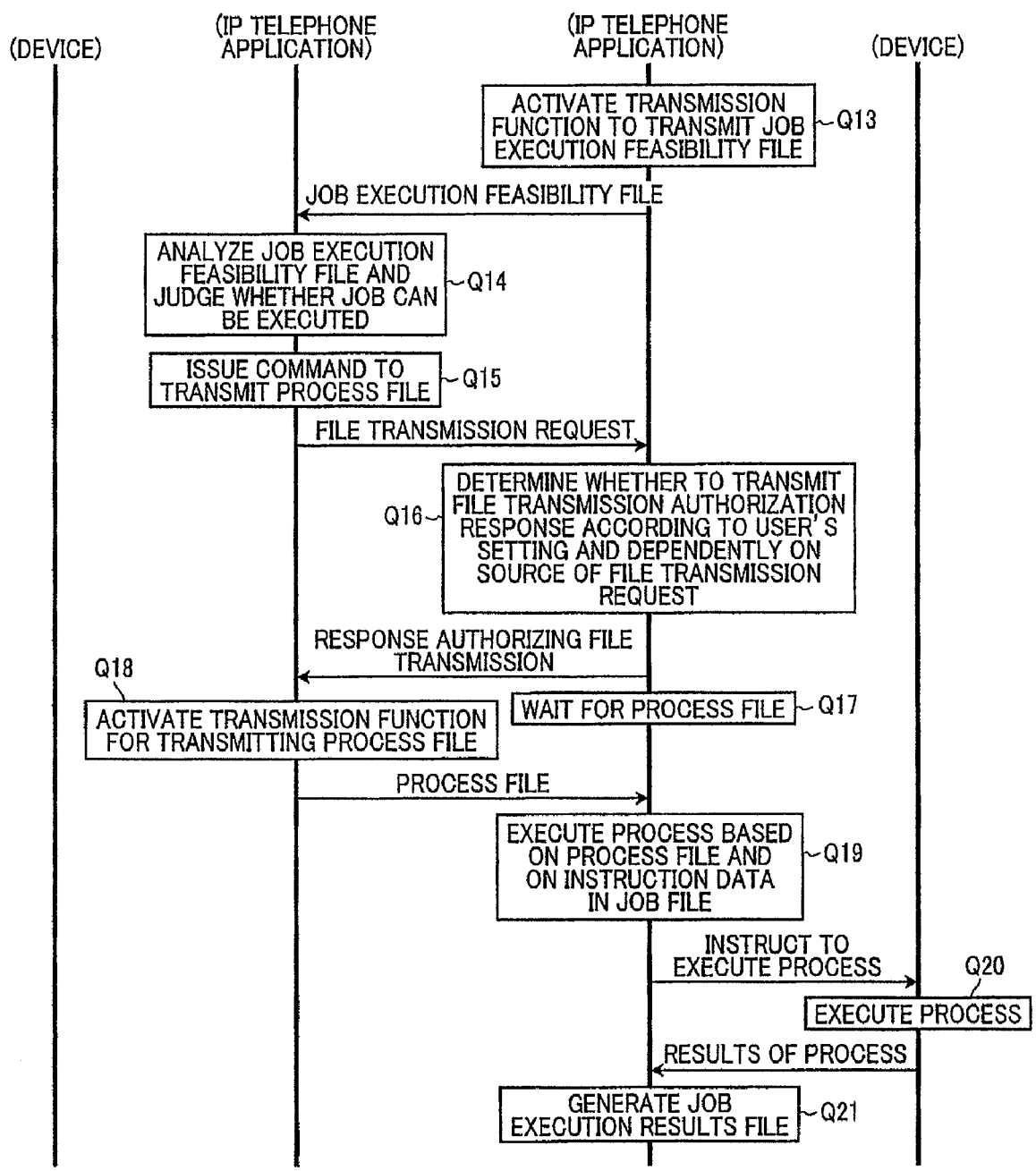
FIG. 21(b) is a second part of the sequence chart showing steps of the process according to the first modification of the second embodiment.
Figure 21C:
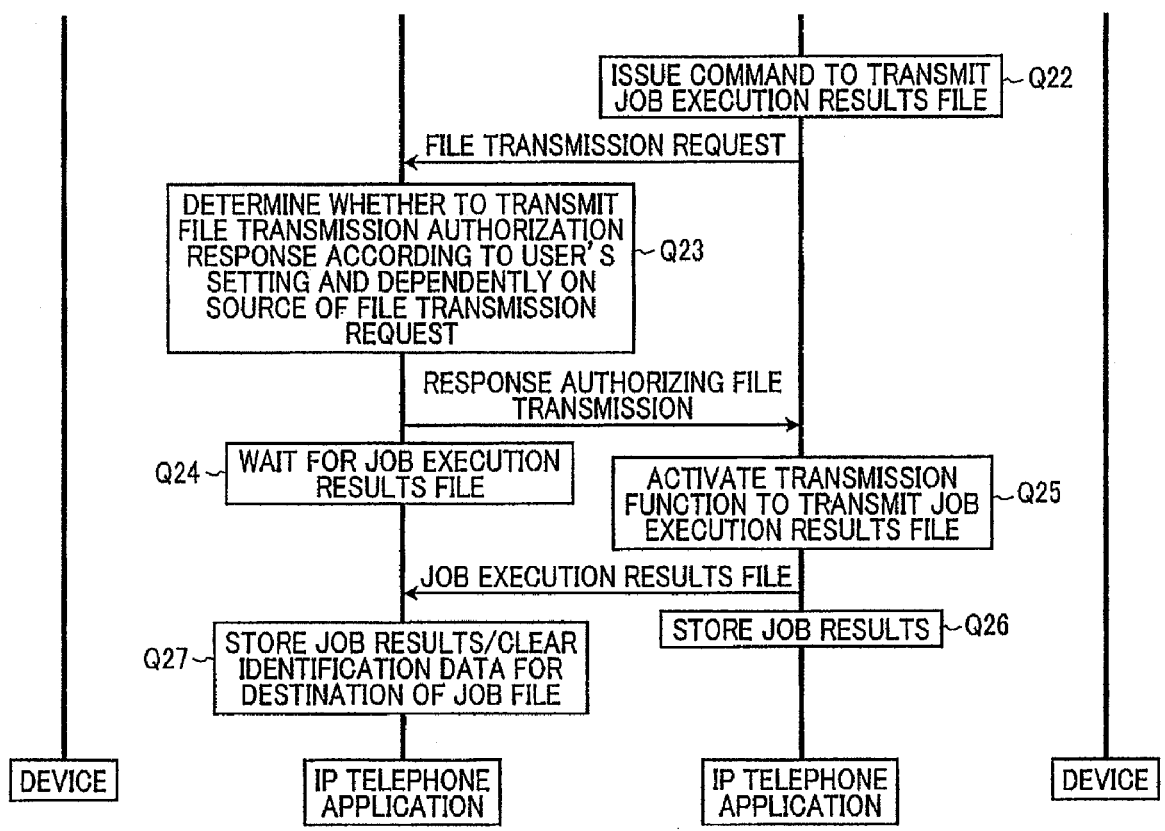
FIG. 21(c) is a third part of the sequence chart showing steps of the process according to the first modification of the second embodiment.

In such a case, the process file, job file, job execution feasibility file, and job execution results file are generated and transmitted as shown in FIG. 21(a), FIG. 21(b), and FIG. 21(c). A smoother process can be attained.

<Second Modification of the Second Embodiment>

Figure 22:
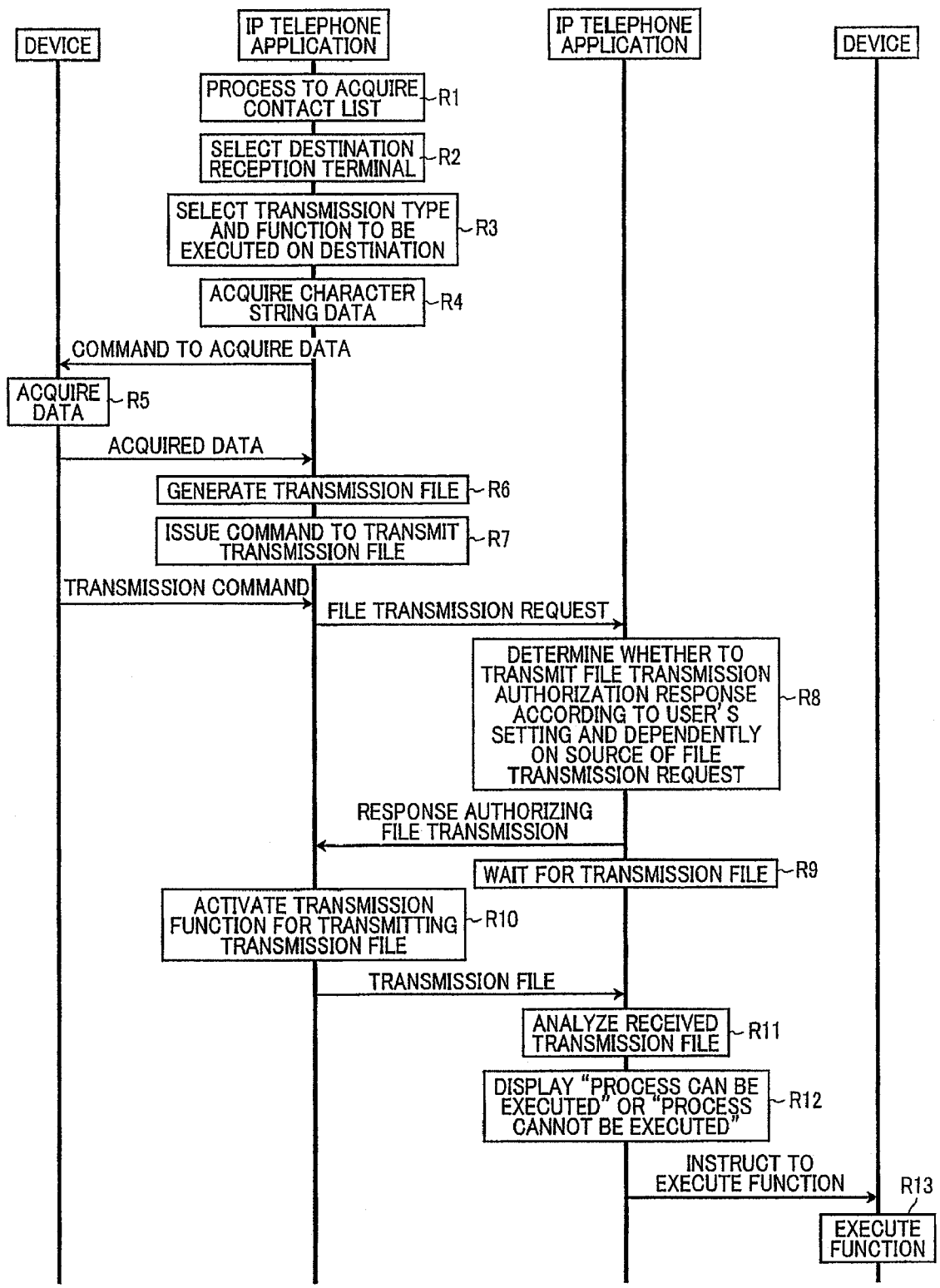
FIG. 22 is a sequence chart showing steps of a process implemented by programs running on IP telephone terminals of an IP telephone system according to a second modification of the second embodiment.

Similarly, although not shown in FIG. 20(a), the IP telephone application 114b may further include functions for generating transmission files as in the third modification of the first embodiment. In such a case, the transmission file is generated and transmitted as shown in FIG. 22. A smoother process can be attained.

<Third Modification of the Second Embodiment>

Figure 23:
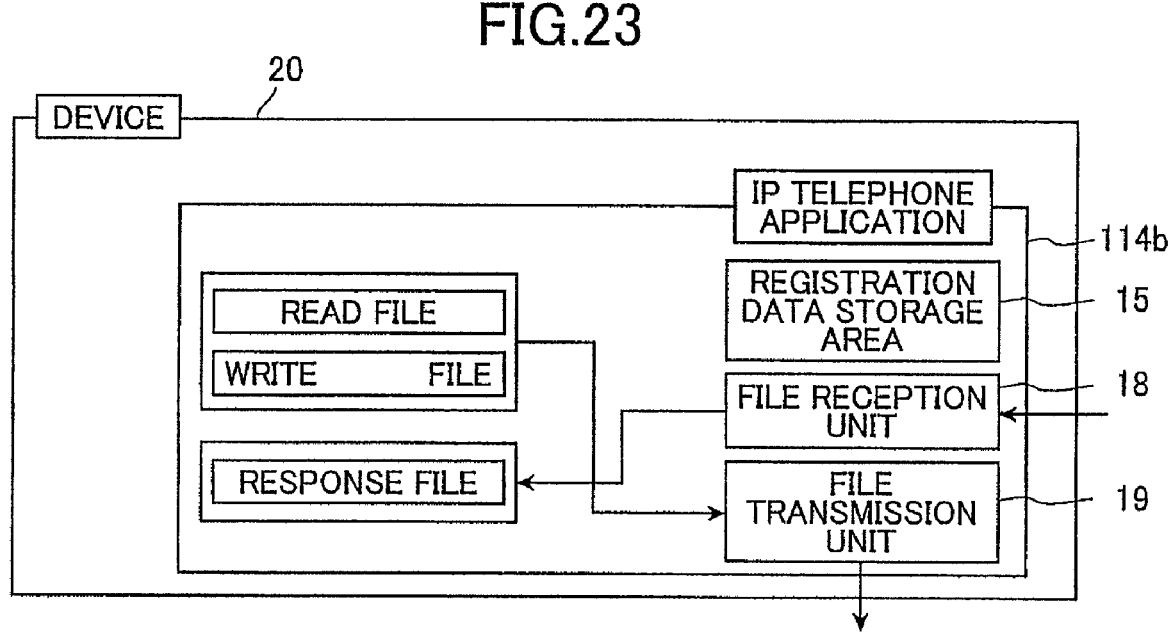
FIG. 23 conceptually illustrates the structure of a device according to a third modification of the second embodiment.

As shown in FIG. 23, the IP telephone application 114b according to the second embodiment may be installed on the device 20 rather than the PC 10. In this case, the IP telephone application 114b on the device 20 executes the functions for generating read files, write files, and response files. The IP telephone application 114b on the device 20 may execute the functions for generating process files, job files, job execution feasibility files, and job execution results files as in the first modification of the second embodiment. The IP telephone application 114b on the device 20 may execute the functions for generating transmission files as in the second modification of the second embodiment.

It is noted that as apparent from the first embodiment and the fourth and fifth modifications of the first embodiment, terminal devices on which the intermediary application and IP telephone application are installed may be: a PC or a device provided in an IP telephone terminal that is configured from a combination of the PC and the device; or a device provided in an IP telephone terminal that is configured from the device only.

Further, as apparent from the second embodiment, an IP telephone application incorporating the function of an intermediary application may be installed on a PC or a device.

While the invention has been described in detail with reference to the embodiments and modifications thereof, it would be apparent to those skilled in the art that various changes and modifications may be made therein without departing from the spirit of the invention.

What is claimed is:

1. An IP telephone terminal comprising:
   a communicating unit that is configured so as to be capable of being connected to an Internet, performing IP telephone communications with an external IP telephone terminal via the Internet, and receiving identification data assigned to an external IP telephone terminal from the Internet;
   an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response;
a function implementation controlling unit that is configured so as to be capable of controlling implementation of a function instructed by a file received via IP telephone communications when the communicating unit receives the file;
a configuration data storing unit that stores configuration data that is used by the function implementation controlling unit to implement the function;
a configuration data acquisition controlling unit that performs control to acquire configuration data from the configuration data storing unit when the communicating unit receives a read file that is transmitted from the external IP telephone terminal;
a response file generation controlling unit that performs control to generate a response file including the configuration data acquired by the configuration data acquisition controlling unit;
a response file transmission controlling unit that controls the communicating unit to transmit the response file generated by the response file generation controlling unit to the external IP telephone terminal that has transmitted the read file; and
an update controlling unit that, when the communicating unit receives a write file, performs control to update the configuration data stored in the configuration data storing unit based on the write file that is transmitted from the external IP telephone terminal that has received the response file.

2. An IP telephone terminal according to claim 1, further comprising:
an operation receiving unit that is configured so as to be capable of receiving operations from an operator of the IP telephone terminal;
an authorization transmission controlling unit that is configured to control the communicating unit to return an authorization response under a condition that the communicating unit has received an authorization request and the operation receiving unit has received an operation authorizing transmission of a file;
a write-file waiting mode setting unit that sets a write-file waiting mode to wait for the write file when the communicating unit has received the read file; and
a write-file-transmission authorization controlling unit that, when the write-file waiting mode setting unit has set the write-file waiting mode, disables the authorization transmission controlling unit and controls the communicating unit to return an authorization response to authorize transmission of the write file, regardless of whether the operation receiving unit has received an operation authorizing transmission of the write file, when the communicating unit has received a request for authorization of transmission of the write file from the external IP telephone terminal that has received the response file.

3. An IP telephone terminal according to claim 1, further comprising:
an operation receiving unit that is configured so as to be capable of receiving operations from an operator of the IP telephone terminal;
an authorization transmission controlling unit that is configured to control the communicating unit to return an authorization response under a condition that the communicating unit has received an authorization request and the operation receiving unit has received an operation authorizing transmission of a file; and
a file transmission authorization controlling unit that disables the authorization transmission controlling unit and controls the communicating unit to return an authorization response to authorize transmission of each of the read file and the write file, regardless of whether the operation receiving unit has received an operation authorizing transmission of each of the read file and the write file, when the communicating unit has received a request for authorization of transmission of each of the read file and the write file from an external IP telephone terminal with which the IP telephone terminal is being currently engaged in voice communications according to IP telephone communications.

4. An IP telephone terminal according to claim 1, further comprising:
an operation receiving unit that is configured so as to be capable of receiving operations from an operator of the IP telephone terminal;
an authorization transmission controlling unit that is configured to control the communicating unit to return an authorization response under a condition that the communicating unit has received an authorization request and the operation receiving unit has received an operation authorizing transmission of a file;
a specific terminal data storing unit that stores identification data identifying a specific IP telephone terminal; and
a specific terminal authorization controlling unit that disables the authorization transmission controlling unit and controls the communicating unit to return an authorization response to authorize transmission of each of the read file and the write file, regardless of whether the operation receiving unit has received an operation authorizing transmission of each of the read file and the write file, when the communicating unit has received a request for authorization of transmission of each of the read file and the write file from an IP telephone terminal whose identification data is stored in the specific terminal data storing unit.

5. An IP telephone terminal according to claim 4, wherein the specific terminal data storing unit is a nonvolatile memory in which the identification data for the specific external IP telephone terminal is stored when the IP telephone terminal is manufactured.

6. An IP telephone terminal according to claim 4, wherein the function implementation controlling unit requires a driver program to be installed on the IP telephone terminal in order to implement the function; and
the identification data for the specific external IP telephone terminal is stored in the specific terminal data storing unit when the driver program is installed.

7. An IP telephone terminal according to claim 1, further comprising:
an additional configuration data acquisition controlling unit that performs control to acquire, from the configuration data storing unit, updated configuration data that is obtained in the configuration data storing unit after the update controlling unit has performed to update the configuration data in the configuration data storing unit;
an additional response file generation controlling unit that performs control to generate an additional response file including the updated configuration data acquired by the additional configuration data acquisition controlling unit; and an additional response file transmission controlling unit that controls the communicating unit to transmit the additional response file generated by the additional response file generation controlling unit to the external IP telephone terminal that has transmitted the write file.

8. An IP telephone terminal according to claim 1, wherein data indicating that the IP telephone terminal has a function for updating configuration data stored in the configuration data storing unit based on the write file transmitted from an external IP telephone terminal is included in identification data identifying the IP telephone terminal itself.

9. An IP telephone terminal according to claim 1, further comprising a converting unit that is configured so as to be capable of converting the configuration data stored in the configuration data storing unit to a text file format and converting configuration data in a text file format to a format capable of being stored in the configuration data storing unit;

wherein the response file generation controlling unit generates the response file by controlling the converting unit to convert the configuration data stored in the configuration data storing unit to the text file format; and the update controlling unit updates the configuration data stored in the configuration data storing unit by controlling the converting unit to convert desired configuration data, which is included in the write file in the text file format, into the format capable of being stored in the configuration data storing unit.

10. An IP telephone terminal according to claim 1, further comprising an identification data storing unit that stores identification data assigned to the IP telephone terminal itself;

wherein the communicating unit is configured so as to be capable of performing IP telephone communications via an internet connection with an external IP telephone terminal that has acquired the identification data of the IP telephone terminal stored in the identification data storing unit;

the IP telephone terminal further comprising:

a function data storing unit that stores function data identifying a function that the function implementation controlling unit can control; and a transmitting unit that transmits the identification data and the function data in a correlated state to the internet connection.

11. An IP telephone terminal according to claim 1, further comprising:

a determining unit that determines whether or not a function specified by a job file can be implemented by the function implementation controlling unit when the communicating unit receives the job file;

an execution feasibility data transmission controlling unit that controls the communicating unit to transmit a job execution feasibility file, indicating whether or not the function can be implemented, to the external IP telephone terminal that has transmitted the job file when the determining unit determines whether or not the function can be implemented; and a process-file-waiting mode setting unit that sets a process-file-waiting mode to wait for a process file when the determining unit determines that the function can be implemented; and wherein the function implementation controlling unit controls implementation of the function specified by the job file based on the process file that has been transmitted from the external IP telephone terminal in response to the job execution feasibility file when the process-file-waiting mode setting unit has set the process-file-waiting mode and the IP telephone terminal has received the process file.

12. An IP telephone terminal according to claim 1, further comprising:

an outputting unit that is configured so as to be capable of outputting data to the operator of the IP telephone terminal; and a determining unit that, when a transmission file transmitted from the external IP telephone terminal is received by the communicating unit and the transmission file includes command data and content data, determines whether or not the function implementation controlling unit can execute a function for processing the content data according to instructions specified by the command data; and a message output controlling unit that controls the outputting unit to output a first message when the determining unit determines that the IP telephone terminal can execute the function for processing the content data according to the instructions specified by the command data, and a second message when the determining unit determines that the IP telephone terminal cannot execute the function for processing the content data according to the instructions specified by the command data, wherein the function implementation controlling unit executes the function to process the content data according to the instructions specified by the command data when the determining unit determines that the function can be executed.

13. A method for controlling an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; a function implementation controlling unit that is configured so as to be capable of controlling implementation of a function instructed by a file received via IP telephone communications when the communicating unit receives the file; and a configuration data storing unit that stores configuration data that is used by the function implementation controlling unit to implement the function, the method comprising:

acquiring configuration data from a configuration data storing unit when the communicating unit receives a read file that is transmitted from the external IP telephone terminal;

generating a response file including the configuration data and outputting the response file;

controlling the communicating unit to transmit the response file to the external IP telephone terminal that has transmitted the read file; and updating, when the communicating unit receives a write file, the configuration data stored in the configuration data storing unit based on the write file that is transmitted from the external IP telephone terminal that has received the response file.

14. A non-transitory computer readable medium storing a set of program instructions executable on an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response; a function implementation controlling unit that is configured so as to be capable of controlling implementation of a function instructed by a file received via IP telephone communications when the communicating unit receives the file; and a configuration data storing unit that stores configuration data that is used by the function implementation controlling unit to implement the function, the instructions comprising:
  acquiring configuration data from a configuration data storing unit when the communicating unit receives a read file that is transmitted from the external IP telephone terminal;
  generating a response file including the configuration data and outputting the response file;
  controlling the communicating unit to transmit the response file to the external IP telephone terminal that has transmitted the read file; and
  updating, when the communicating unit receives a write file, the configuration data stored in the configuration data storing unit based on the write file that is transmitted from the external IP telephone terminal that has received the response file.

15. An IP telephone terminal comprising:
a function implementation controlling unit that is configured so as to be capable of controlling implementation of a function instructed by a file received via IP telephone communications when the communicating unit receives the file;
a configuration data storing unit that stores configuration data that is used by the function implementation controlling unit to implement the function;
a configuration data acquisition controlling unit that performs control to acquire configuration data from the configuration data storing unit upon receipt of a read file that is transmitted from an external IP telephone terminal;
a response file generation controlling unit that performs control to generate a response file including the configuration data acquired by the configuration data acquisition controlling unit and to output the response file; and
an update controlling unit that, upon receipt of a write file, performs control to update the configuration data stored in the configuration data storing unit based on the write file that is transmitted from the external IP telephone terminal that has received the response file.

16. An IP telephone terminal comprising:
a communicating unit that is configured so as to be capable of being connected to an Internet, performing IP telephone communications with an external IP telephone terminal via the Internet, and receiving identification data assigned to an external IP telephone terminal from the Internet;
an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response;
a read file generation controlling unit that performs control to generate a read file including instructions to read configuration data used for implementing a function on the external IP telephone terminal;
a read file transmission controlling unit that controls the communicating unit to transmit the read file generated by the read file generation controlling unit to the external IP telephone terminal; and
a configuration data acquisition controlling unit that performs control to acquire configuration data, which is included in a response file that has been transmitted from the external IP telephone terminal in response to the read file, when the communicating unit receives the response file.

17. An IP telephone terminal according to claim 16, further comprising:
a write file generation controlling unit that performs control to generate a write file, the write file including desired configuration data, into which the configuration data acquired through control by the configuration data acquisition controlling unit is desired to be updated, and an instruction to update the configuration data in the external IP telephone terminal that has transmitted the response file into the desired configuration data; and
a write file transmission controlling unit that controls the communicating unit to transmit the write file generated through control by the write file generation controlling unit to the external IP telephone terminal that has transmitted the response file.

18. An IP telephone terminal according to claim 17, wherein the write file further includes an additional instruction to read updated configuration data that is obtained in the external IP telephone terminal after the external IP telephone terminal updates the configuration data based on the write file.

19. An IP telephone terminal according to claim 17, further comprising:
a verification result storing unit that is configured so as to be capable of storing data of a verification result;
an updated configuration data acquisition controlling unit that performs control to acquire the updated configuration data, which is included in an additional response file that has been transmitted from the external IP telephone terminal in response to the additional read file, when the communicating unit receives the additional response file;

a verifying unit that verifies the updated configuration data by comparing the updated configuration data with the desired configuration data; and a verifying result storage controlling unit that performs control to store data of a verification result obtained by the verifying unit in the verification result storing unit in association with identification data of the external IP telephone terminal that has transmitted the additional response file.

20. An IP telephone terminal according to claim 16, further comprising:

an operation receiving unit that is configured so as to be capable of receiving operations from an operator of the IP telephone terminal;

an authorization transmission controlling unit that is configured to control the communicating unit to return an authorization response under a condition that the communicating unit has received an authorization request and the operation receiving unit has received an operation authorizing transmission of a file; and a response file transmission authorization controlling unit that disables the authorization transmission controlling unit and controls the communicating unit to return an authorization response to authorize transmission of the response file, regardless of whether the operation receiving unit has received an operation authorizing transmission of the response file, when the communicating unit has received a request for authorization of transmission of the response file from the external IP telephone terminal that has received the read file.

21. A method for controlling an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; and an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response;

the method comprising:

generating a read file including instructions to read configuration data used for implementing a function on an external IP telephone terminal and outputting the read file;

controlling a communicating unit to transmit the read file to the external IP telephone terminal; and acquiring configuration data which is included in a response file, upon receipt of the response file that has been transmitted from the external IP telephone terminal in response to the read file.

22. A non-transitory computer readable medium storing a set of program instructions executable on an IP telephone terminal, the IP telephone terminal including: a communicating unit that is configured so as to be capable of being connected to an Internet, performing IP telephone communications with an external IP telephone terminal via the Internet, and receiving identification data assigned to an external IP telephone terminal from the Internet; and an IP telephone function controlling unit that controls implementation of an IP telephone function for conducting voice communications with the external IP telephone terminal identified by the identification data via IP telephone communications, the IP telephone communications employing a communication method in which a reception-side IP telephone terminal receives an authorization request from a transmission-side IP telephone terminal and returns an authorization response for the request, and the transmission-side IP telephone terminal transmits a file to the reception-side IP telephone terminal upon receiving the authorization response;

the instructions comprising:

generating a read file including instructions to read configuration data used for implementing a function on an external IP telephone terminal and outputting the read file;

controlling a communicating unit to transmit the read file to the external IP telephone terminal; and acquiring configuration data which is included in a response file, upon receipt of the response file that has been transmitted from the external IP telephone terminal in response to the read file.

* * * * *